United States Patent [19]

Motoyama et al.

[11] 4,021,856
[45] May 3, 1977

[54] CASSETTE TAPE RECORDER

[75] Inventors: Kazuyasu Motoyama; Toshikazu Kato, both of Hachioji, Japan

[73] Assignee: Olympus Optical Co., Ltd., Tokyo, Japan

[22] Filed: Dec. 8, 1975

[21] Appl. No.: 638,949

[30] Foreign Application Priority Data

Dec. 24, 1974 Japan .................................. 49-3292
Mar. 6, 1975 Japan ........................ 50-30467[U]
Dec. 25, 1974 Japan ............................... 49-2481

[52] U.S. Cl. ................................. 360/74; 242/199; 360/93
[51] Int. Cl.² .................... G11B 15/24; G11B 15/32
[58] Field of Search ......................... 360/69, 74, 93; 242/199

[56] References Cited

UNITED STATES PATENTS

| | | | |
|---|---|---|---|
| 3,620,429 | 11/1971 | Kozu et al. | 360/74 |
| 3,870,248 | 3/1975 | Nara et al. | 360/74 |
| 3,887,943 | 6/1975 | Katsurayama | 360/74 |
| 3,946,436 | 3/1976 | Takashino | 360/74 |
| 3,946,966 | 3/1976 | Seisakusho | 360/74 |

*Primary Examiner*—Daryl W. Cook
*Attorney, Agent, or Firm*—Ostrolenk, Faber, Gerb & Soffen

[57] ABSTRACT

A miniature cassette tape recorder is provided for use with a micro-cassette of a size which is comparable to a small packet of matches, and is constructed and sized so as to be received in a pocket of a suit or shirt. The recorder includes, in selected combinations, an automatic stop mechanism which is adapted to stop the operation of the tape recorder automatically during a recording or playback operation in response to a shift of a shaft associated with a tape supply hub which occurs as a result of the drive on the tape which is transmitted to the tape hub to which a tape end is secured and hence to the shaft when the tape end is reached; a locking device for holding a recording button in its operative position; a detection mechanism for detecting a lug which is provided on the part of the cassette for preventing an inadvertent erasure of a previously recorded magnetic tape; an operating mechanism which permits a rapid advance, rewind, queing or review operation with a single button; an improved support mechanism for a capstan shaft and its associated flywheel; an improved capstan drive mechanism, or a drive transmission mechanism imparting a drive to the flywheel which is fixedly mounted on the capstan which in turn cooperates with a pinch roller to feed the tape at a uniform speed, including an idler support mechanism and its associated adjusting mechanism. The tape recorder is connectible with another electroacoustic instrument.

46 Claims, 50 Drawing Figures

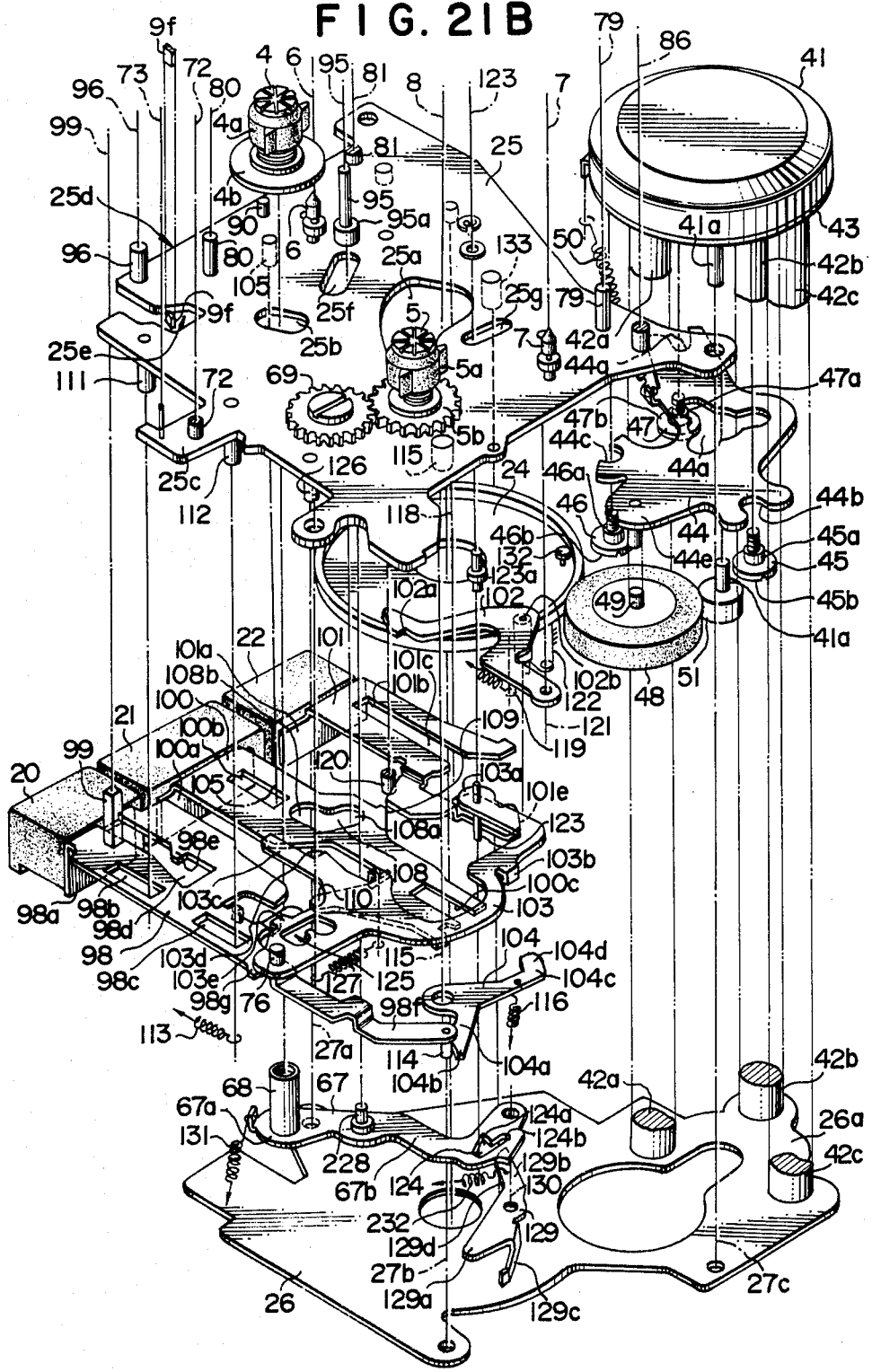

CASSETTE TAPE RECORDER

BACKGROUND OF THE INVENTION

The invention relates to a cassette tape recorder, and more particularly to a cassette tape recorder for use with a tape cassette which internal houses a length of a magnetic tape having its opposite ends secured to a pair of tape hubs rotatably disposed within the cassette. In particular, the invention relates to a miniature cassette tape recorder for use with a micro-cassette tape of a size which is comparable to a packet of matches.

In the operation of tape recorders, it is desirable to stop the operation of the recorder automatically when a tape end is reached, by detecting this condition by some means. A variety of techniques have been heretofore proposed to achieve this end. Specifically, a conductive foil is applied to the terminal end of a magnetic tape so that it can be electrically detected to activate a stop device. Alternatively, a terminal end of the tape may be provided with a portion having a different optical reflectivity or transmittivity from that of the magnetically active surface so that the portion can be optically detected to activate the stop device. In a further alternative, the tape tension applied to a guide roller by the magnetic tape is utilized by mechanically detecting a change in the tension when the tape end is reached, thus activating the stop device.

However, it is extremely difficult and expensive to work the terminal end of a tape which is contained in a tape cassette in order to make it capable of cooperating with the tape recorder. For this reason, mechanical stop means which utilizes the tape tension, sometimes referred to as a mechanical stop, will be advantageous. The cassette tape has its one end secured to one tape hub and the other end to the other tape hub, both contained in the cassette, so that the rotation of tape hub will be interrupted when a tape end is reached. As a result, the tape driving shaft which engages the tape hub will slip relative to the tape hub, resulting in an increased load. Thus, a increase in the load may be detected to activate the mechanical stop.

However, in order to assure an accurate detection of a change in the load of the tape driving shaft, the mechanical stop device will be extremely complex and bulky. While such device may be incorporated into a conventional tape recorder which is used with a conventional tape cassette of a standard size, which is known as a compact cassette, there is no space available for the provision of such device in a miniature tape recorder as contemplated in the present invention, which is of a size such that the entire tape recorder can be received in the pocket of a suit or shirt.

In either micro-cassettes or compact cassettes, the tape hubs on which the magnetic tape is disposed and secured have a certain degree of freedom to be displaced or rattled relative to the cassette in order to facilitate the fitting engagement of the tape hubs on the tape driving shafts when the tape cassette is loaded on a tape recorder. In accordance with the invention, the operation of the tape recorder is automatically stopped when a tape end is reached, by detecting a shift of a tape driving shaft associated with the tape supply hub, as permitted within the tolerance of the clearance between the tape hub and tape driving shaft, which occurs as a result of the tape exerting a drive on the tape supply hub to which its terminal end is secured, and hence on the tape driving shaft also which is associated therewith when the tape end is reached.

Usually, a recording operation of the tape recorder is established by depressing both a record and a playback button to their operative positions where they are maintained. It will be convenient if it is possible to detect, when depressing the record button, whether or not the cassette loaded retains the lug which is usually provided for preventing an inadvertent erasure of a recorded tape.

A conventional tape recorder is designed to permit a rapid advance, rewind, queing or review operation of the tape, in addition to the recording, playback and stop operations. However, in a conventional tape recorder, each of the first mentioned operations is only enabled when its devoted button is depressed, thus resulting in an increase in the number of operating buttons and the space requirement therefor. This presents a serious limitation on the design of a miniature tape recorder which is adapted for use with a micro-cassette. In accordance with the invention, the rapid advance, rewind, queing and review operations are enabled by a single button which is operated in different directions.

Usually, the tape rewind operation is performed by depressing a rewind button. The rewind button may be held depressed manually or locked in the depressed position. For the purpose of the invention, it is preferable to lock the rewind button in the depresed position. The rewind button is reset from the depressed position upon depression of another button, thus simplifying the overall arrangement.

The capstan of the tape recorder is usually provided with an integral flywheel in order to provide a stable rotation of the capstan, and the drive to the capstan is transmitted through the flywheel. In an attempt to provide a compact structure, some tape recorders are constructed without a separate thrust bearing for the capstan shaft. To dispense with it, the flywheel and its drive wheel are disposed at right angles to each recorder so that the drive wheel bears against the end face or the peripheral edge of the flywheel. As a result, the capstan and a motor must be arranged such that the capstan shaft and the motor shaft are disposed at right angles to each other. However, with the recent development of a flat miniature motor, it is necessary that the capstan be disposed in alignment with the motor shaft. In this instance, the drive wheel will have to bear against the peripheral surface of the flywheel, so that the drive wheel cannot provide a thrust bearing for the capstan.

During a recording or playback operation, the capstan is driven by the motor so that it cooperates with an oppositely located pinch roller to feed a magnetic tape disposed therebetween at a uniform speed. Ususally, an idler or an idle roller is disposed between the output shaft of the motor and the flywheel associated with the capstan so as to transmit the drive to the flywheel through the idler. As the overall size of the tape recorder is reduced, the moment of inertia of the motor rotor, capstan and flywheel has a relatively significant influence upon the overall drive system. In particular, with a portable tape recorder, the angular velocity of the rotor and the flywheel will change as an external force is applied as by swinging the tape recorder, and unless such force is compensated for by some means, there results a non-uniformity in the rotation, giving rise to wow or flutter. However, in the conventional arrangement in which the idler is simply located between the output shaft and the flywheel, the rotor of the motor and the flywheel associated with the capstan rotate in the same direction to produce a synergetic effect in terms of the moment of inertia of the rotor and the flywheel, which when combined with an external force, cannot be balanced by the idler alone, thus again resulting in a non-uniformity in the rotation.

The idler which is used to transmit the drive from the motor to the capstan may comprise either a roller or a pulley, either of which is mounted on a rockable support plate so as to be moved into or out of engagement with the flywheel. One of the problems associated wth the idler is the fact that the support plate for the idler occupies a relatively large space within the tape recorder, thus standing in the way of miniaturization of the tape recorder.

If the idler is mounted on a rockable lever, the limited freedom of movement of the rockable lever which results from its pivotal mounting requires a precise adjustment in the location of the rockable lever so that it bears against both the drive wheel and the flywheel with an equal pressure. However, because the available space is limited, it is extremely difficult to provide a sufficiently precise adjustment, usually resulting in a compromise. However, when such an arrangement is employed in a portable or pocket type tape recorder, oscillations may be caused to the rockable lever when the recorder is swung to cause an unbalance in the pressure with which the idler bears against the drive wheel and the flywheel, thus intending to cause a non-uniformity in the rotation of the capstan.

To provide an effective transmission of the drive from the motor to the capstan through the idler, it is necessary that the peripheral surfaces of the idler, the output wheel and the flywheel associated with the capstan be maintained in proper abutting relationship. However, the drive wheel and the flywheel are frequently skewed to a degree depending on the manner of mounting the motor or the capstan. In particular, the motor is mounted with an interpose vibration absorbing resilient member, so that the drive wheel tends to be skewed more strongly to cause an unbalanced bearing or abutting relationship between these members, resulting in a varying axial force applied to the idler. This tends to cause non-uniform rotation, which gives rise to wow or flutter or increases the load and hence the power dissipation of the motor.

It is also known to provide a cassette tape recorder which may be connected with an electroacoustic instrument such as a radio set or sterophonic player so that a recording or playback operation can be performed in combination therewith. The tape recorder itself is usually provided with an auto stop mechanism which automatically interrupts the operation of the tape recorder when the tape running is terminated. One of the problems which arises when such tape recorders are combined with the electroacoustic instrument is that while the operation of the tape recorder may be interrupted by the auto stop mechanism, the electroacoustic instrument which is coupled with the recorder remains in operative condition, resulting in a waste of the electric power.

SUMMARY OF THE INVENTION

It is a first object of the invention to provide a fully mechanical automatic stop mechanism for a cassette tape recorder which utilizes a displaceably located shaft for engagement with a tape supply hub of the cassette so that the shaft is shifted by the tape tension when a tape end is reached, the mechanism being operationally enabled by the cooperation between the shift of the shaft and the rotation of a flywheel which is provided to rotate a capstan at a uniform rate.

It is a second object of the invention to provide a mechanism which comprises a playback actuating member including a playback button which can be locked in its operative position by a locking member, and a record actuating member including a record button which can be locked in its operative position through a member which is displaced in response to a movement of the playback actuating member, and which is interlocked with the record actuating member to activate a detection mechanism including a lug detecting member and which detects a lug provided on the part of the cassette for the purpose of preventing an inadvertent erasure of a recorded cassette tape so as to prevent a movement of the record button when the removal of the lug is detected.

It is a third object of the invention to provide a mechanism which enables a multiple tape operation in a tape recorder including rapid advance, rewind, queing and review operations by operating a single button is different directions and locking it to its rewind position when a tape rewind operation is desired.

It is a fourth object of the invention to provide a novel support mechanism for the capstan and flywheel of a tape recorder in which a capstan shaft has its one end constrained against withdrawal and in which the end face of the flywheel which is located nearer the free end of the capstan is engaged by a plurality of thrust bearing balls disposed at a substantially equal interval, thus providing a thrust bearing for the capstan.

It is a fifth object of the invention to provide a capstan drive mechanism for a tape recorder which comprises an idle pulley located between an output wheel of a motor and a flywheel associated with a capstan, and connected with the output wheel through an endless belt, and wherein either the idle pulley of the endless belt is held in abutting engagement with the flywheel to cause its rotation in the opposite direction from that of the rotor of the motor, thus balancing the moment of inertia between the rotor and the flywheel and eliminating the influence of external forces upon the drive system.

It is a sixth object of the invention to provide an idler support mechanism in which an idler bearing against both the flywheel associated with the capstan and an output wheel of a motor is mounted on an idler support plate which is disposed directly below the motor to minimize the space within a tape recorder which is occupied by the plate, and which is capable of adjusting an idler supporting shaft mounted thereon to an optimum angular position.

It is a seventh object of the invention to provide a cassette tape recorder adapted to be connected with another electroacoustic instrument and including an auto stop mechanism which operates on a switch in conjunction with a playback actuating member of the recorder in a manner such that the switch can be used as a power switch for the instrument.

In accordance with the invention, there is provided a cassette tape recorder which includes, in selected combinations, a fully mechanical automatic stop mechanism which functions by the cooperation of the rotation of a flywheel which is used to rotate a capstan at a uniform rate and a shift of a shaft which engages a tape supply hub in a cassette and occuring when a tape end is reached as a result of a tape tension acting on the hub and hence on the shaft; a mechanism for locking a record actuating member in connection with the operation of a playback actuating member and for detecting the presence or absence of a lug in a tape cassette in cooperation with the operation of the record actuating member; and operating mechanism which permits a selected one of rapid advance, rewind, queing, and review operations of a tape by a single button; a support mechanism for a capstan and its associated flywheel including a novel arrangement of thrust bearing balls; an idler assembly including a support plate therefor which achieves an optimum abutting engagement between an idler on one hand and an output wheel of a motor and a flywheel associated with the capstan on the other hand; and a power switch which may be incorporated into an elelctroacoustic instrument which is adapted to be connected with the cassette tape recorder. The overall arrangement is greatly simplified and effectively interrelated.

BRIEF DESCRIPTION OF THE DRAWINGS

FIGs. 21A and 21B are exploded, respective views of various parts shown in FIGS. 19 and 20;

DETAILED DESCRIPTION OF PREFERRED EMBODIMENTS

EXTERNAL ARRANGEMENT

Figure 1:
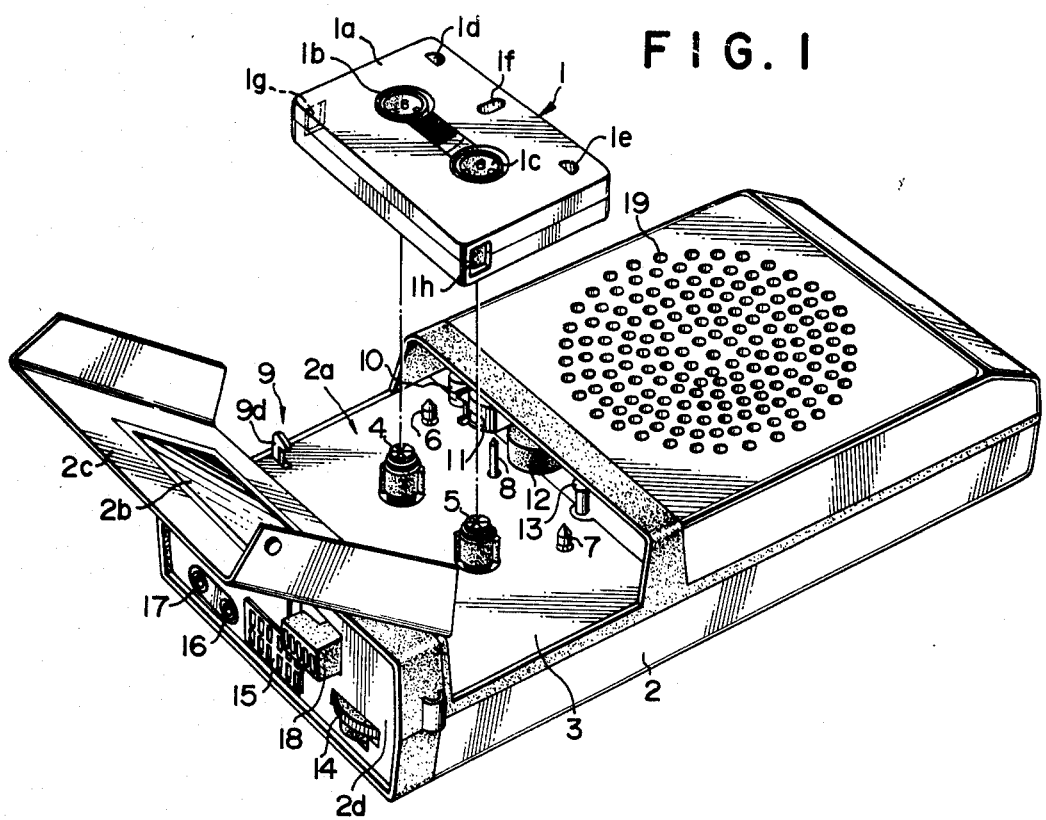
FIG. 1 is a perspective view of a tape recorder for use with a micro-cassette tape which is constructed in accordance with one embodiment of the invention, specifically illustrating a tape cassette and a cassette receiving portion of the recorder.

FIG. 1 is a perspective view of a micro-cassette 1 well known in the art and a miniature tape recorder 2 on which the cassette 1 may be loaded. While in the description to follow, the invention will be described as applied to the miniature tape recorder 2 for use with a micro-cassette 1, it should be understood that the invention is equally applicable to a tape recorder which is adapted to cooperate with a compact cassette.

As viewed in FIG. 1, the left-hand end of the tape recorder 2 represents the front end while the right-hand the rear end. Toward the front end, the tape recorder 2 is provided with a cassette receiving station 2a in its upper portion. The station 2a is defined in part by a panel 3 on which a tape supply shaft 4 and a tape take-up shaft 5 are disposed at given positions. In addition, a pair of positioning pins 6, 7 which correctly locate the tape cassette 1, as well as a capstan 8 extend through the panel 3, the capstan 8 being adapted to feed the tape contained in the cassette at a uniform rate. Toward the forward end of the cassette receiving station 2a and laterally thereof, there is exposed through the panel a lug detecting member 9, which is provided for detecting the presence or absence of a lug which is usually provided in a cassette loaded for the purpose of preventing an inadvertent erasure of a recorded tape, by cooperation with the depression of a record button to be described later.

An erase head 10, a record/playback head 11, a pinch roller 12 and a locking member 13 which loaded cassette against withdrawal are disposed on a stationary base plate to be described later, at positions inwardly of the cassette receiving station 2a or toward the rear end of the tape recorder. The erase head 10 comprises a permanent magnet, and moves into contact with one surface of a magnetic tape contained in the cassette loaded as a record button to be described later is depressed to a given position, thereby erasing unnecessary recorded signals from a recording track thereof. The magnetic head 11 is also moved into contact with the surface of the magnetic tape in the loaded cassette as a playback button to be described later is depressed, thereby enabling a recording or playback operation. When the playback button is depressed, the pinch roller 12 is moved into abutting engagement with the capstan 8 with the magnetic tape interposed or sandwiched therebetween, thus feeding it at a uniform rate.

As is well recognized, the micro-cassette 1 which is loaded into the cassette receiving station 2a has a certain rattling clearance with respect to the body 1a of the cassette, and includes a pair of tape hubs 1b, 1c which are rotatably disposed therein. One of the tape hubs, 1b, is adapted to fit on the tape supply shaft 4 while the other tape hub 1c is adapted to fit on the tape take-up shaft 5, the respective hubs having inwardly extending projections which engage between outwardly extending projections on the shafts 4, 5. When one of the shafts 4, 5 is driven, both hubs 1b, 1c rotate in the same direction, taking up the tape from one of the hubs to the other. In addition, the micro-cassette 1 is formed with a pair of positioning apertures 1d, 1e which are engaged by the positioning pins 6, 7, respectively, as well as an opening 1f for allowing the capstan to pass therethrough. The left- and right-hand sidewalls of the cassette is provided with a pair of lugs 1g, 1h, respectively, which are used for the purpose of preventing an inadvertent erasure of recorded information on the magnetic tape. After the micro-cassette 1 is loaded into the station 2a, the latter is closed by a hinged cover 2c having a transparent window 2b.

Figure 2:
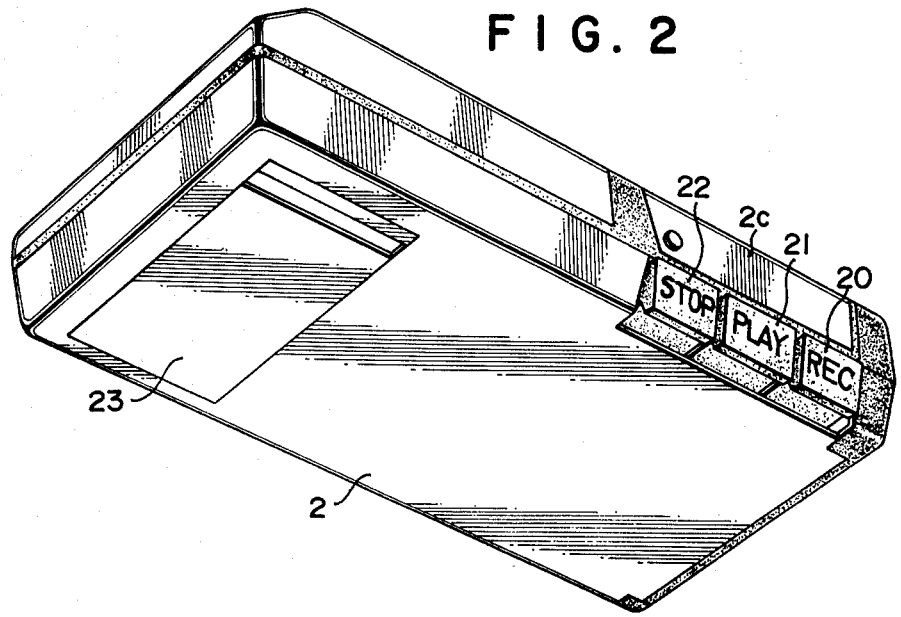
FIG. 2 is a perspective view, as viewed in the opposite direction from FIG. 1.

At its front end, the tape recorder 2 is provided with a control panel 2d on which are disposed a volume control knob 14, a grille 15 facing an internally housed microphone, a jack 16 for connection with an external microphone and a jack 17 for receiving an earphone plug. In addition, a single button 18 which permits a rapid advance, queing, tape rewind or review operation is disposed in the panel 2d. Toward its rear end, the top surface of the tape recorder 2 is formed with a multitude of openings 19 at a position above a loudspeaker (not shown) which is internally housed within the tape recorder. A record button 20, a playback button 21 and a stop button 22 of the tape recorder 2 are provided in the lower portion of the left-hand sidewall of the tape recorder 2, as viewed from its front end, and are specifically shown in FIG. 2, which is a perspective view thereof, as viewed in the opposite direction from that in which it is viewed in FIG. 1. A playback mode of the tape recorder 2 is established by depressing the playback button 21 to a given position. Similarly, a record mode is established by depressing both the record button 20 and the playback button 21. The stop button 22 may be depressed to release the playback or record mode. Numeral 23 shown in FIG. 2 represents a removable lid for a battery receiving chamber.

ARRANGEMENT AND OPERATION OF INTERNAL MECHANISMS

1. Tape drive mechanism

This mechanism comprises the capstan 8 which feeds the tape at uniform rate, a flywheel which serves to rotate the capstan at uniform rate, a drive motor, and a transmission assembly which transmits the drive from the motor to the flywheel.

Figure 16:
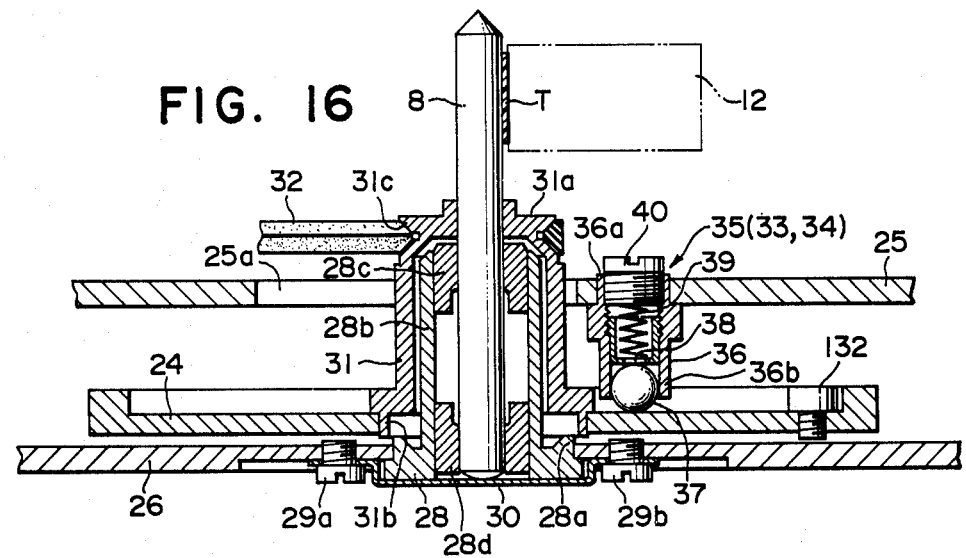
FIG. 16 is an enlarged cross section of a thrust bearing mechanism for a flywheel and a capstan, the section being taken along the line X—X shown in FIG. 18.

Referring to FIGS. 3, 4, 16, 21A and 21B, the capstan 8 is rotatably mounted on a support plate 26 which is disposed below a stationary base plate 25 which is fixedly mounted below the panel 3 of the tape recorder 2 (see FIG. 1). Specifically, the support plate 26 is connected with the stationary base plate 25 by three studs 27a, 27b, 27c shown by phantom lines, which depend from the base plate 25. As shown in FIG. 16 which is an enlarged section, the capstan 8 is rotatably mounted in the support plate 26 by means of a bearing 28, which has its outer member 28a secured to the support plate 26, the lower end face of the outer member 28a resting on a dish-shaped plate 30 which is secured to the lower surface of the support plate 26 by set screws 29a, 29b. The outer member 28a includes a hollow cylindrical bearing portion 28b which extends vertically through an opening 25a centrally formed in the base plate 25. The capstan 8 is rotatably supported within the bearing portion 28b by a pair of bearing members 28c, 28d which are disposed at the upper and lower ends thereof.

The free end of the capstan 8 extends into the cassette receiving station 2a (see FIG. 1). A flywheel 24 is integrally mounted with the capstan 8 intermediate the base plate 25 and the support plate 26, and is driven by a motor to be described later for causing a rotation of the capstan 8 at a uniform rate. Specifically, the bearing portion 28b is surrounded by a cowl member 31 of a greater diameter than the latter, and the top 31a of the cowl member 31 is integrally secured to the capstan 8. The cowl member 31 has an open lower end 31b, to which the flywheel 24 is secured. In this manner, the capstan 8 and the flywheel 24 are connected together by the cowl member 31. The top portion of the cowl member 31 which projects above the base plate 25 is formed as a pulley 31c, which is engaged by a V-belt 32 to be described later. When the capstan 8 is rotatably mounted by the bearing 28 which is secured to the support plate 26 with its lower end abutting against the dish-shaped plate 30, an axial movement of the capstan 8 in the downward direction is effectively prevented, but an axial movement of the capstan 8 in the upward direction is left unrestrained, so that when the tape recorder 2 is turned upside down or swung about, the capstan 8 and the flywheel 24 may be displaced upwardly in the axial direction of the capstan 8, thus causing it to be disengaged from the bearing 28. In order to prevent such difficulty, the axially upward movement of the capstan 8 is prevented by three thrust bearing assemblies 33, 34, 35 which engage the upper surface of the flywheel 24 at three space points. Referring to FIG. 16, one of the thrust bearing assemblies, 35, is shown as comprising a hollow cylindrical body 36 having its one end 36a secured to the base plate 25 and its other end 36b extending toward the upper surface of the flywheel 24, a ball 37 which is received within the cylindrical body 36 and partly projecting therefrom into abutment against the upper surface of the flywheel 24, an urging member 38 received within the cylindrical body 36, a compression spring 39, and a screw 40 which is threadably engaged with the open top of the cylindrical body 36. By returning the screw 40 in either direction, the pressure with which the ball 37 bears against the upper surface of the flywheel 24 can be varied. The remaining two thrust bearing assemblies 33, 34 are similarly constructed.

Figure 17:
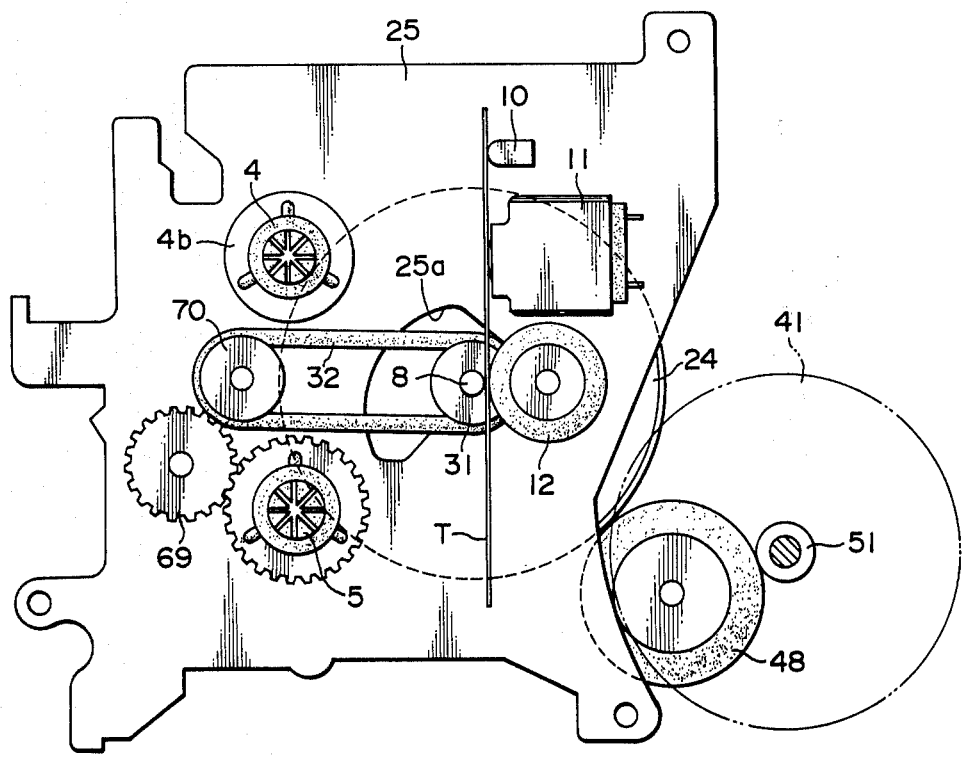
FIGS. 17 and 18 are plan views of a capstan drive mechanism in which the thrust bearing mechanism shown in FIG. 16 is incorporated.
Figure 18:
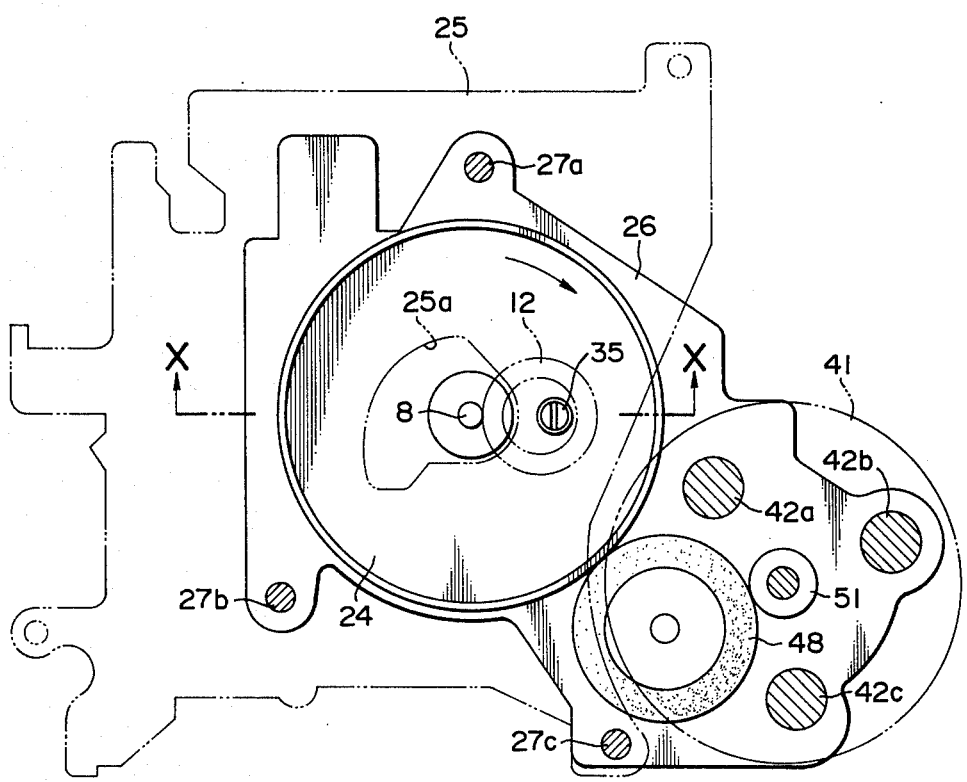

Referring to FIG. 17, it will be seen that the pinch roller 12 which feeds a tape T by cooperation with the capstan 8 bears against the latter in a direction which tends to cause a skewing of the capstan 8 under the action of the V-belt 32 running around the pulley 31c. In order to avoid this, one of the thrust bearing assemblies, for example, 35, is located substantially in vertical alignment with the point of abutting engagement between the pinch roller 12 and the capstan 8, and displaced a small distance to the right thereof, as illustrated in FIG. 18. Specifically, the ball 37 of the thrust bearing assembly 35 which engages against the flywheel 24 to urge it downward produces a bias which urges the capstan 8 into abutting engagement with the pinch roller 12 and which thus tends to resist the combined effect of the tension in the V-belt 32 and the pressure from the pinch roller 12 which tend to move the capstan 8 away from the pinch roller 12, thus effectively preventing a skewing of the capstan 8.

Figure 3:
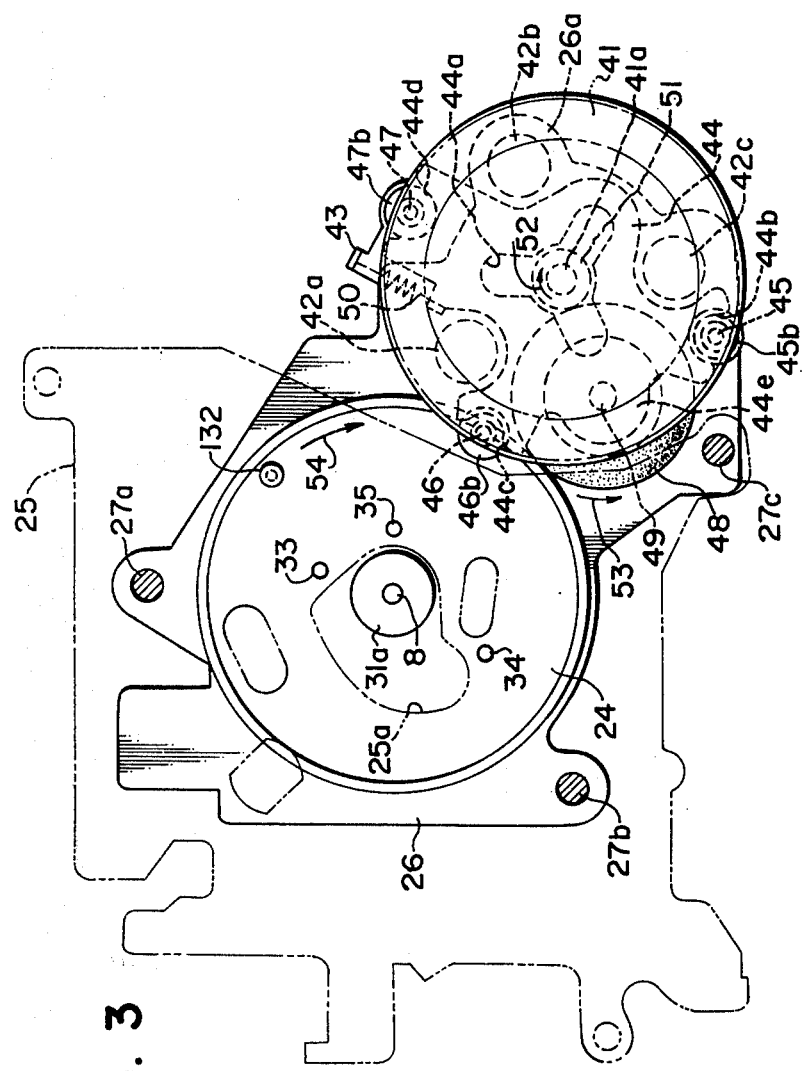
FIG. 3 is a top view of an idler support mechanism which is disposed directly below a motor housed within a tape recorder.
Figure 4:
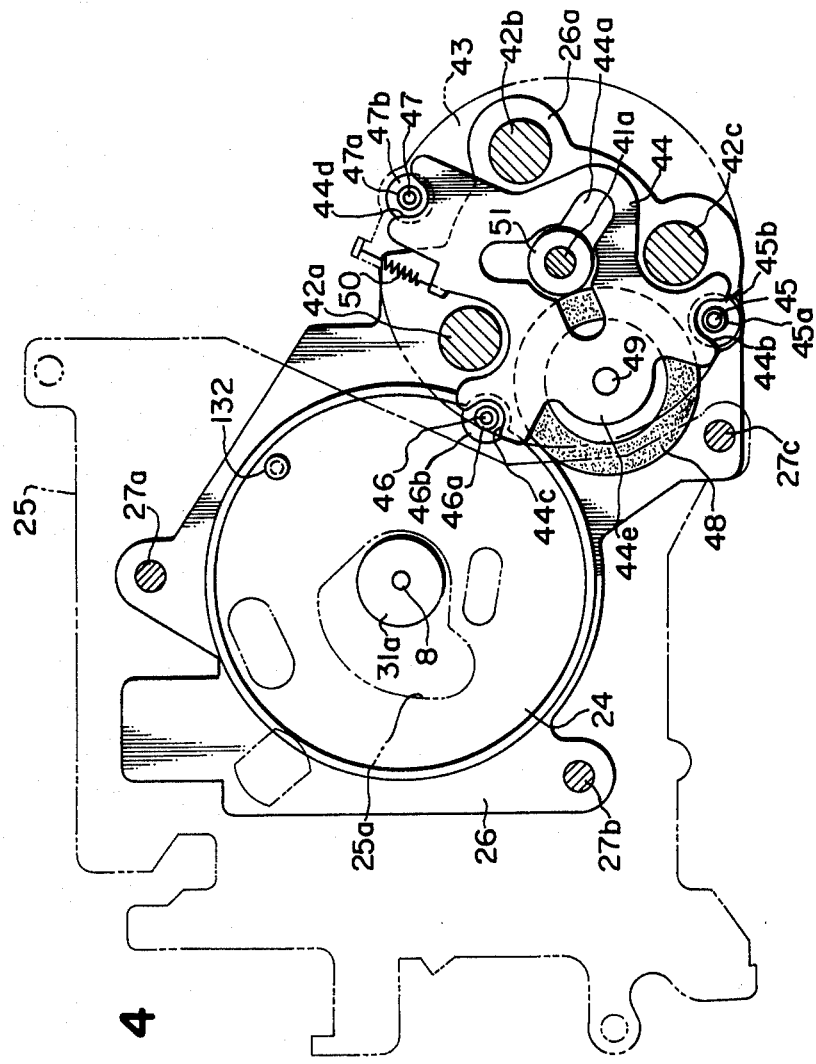
FIG. 4 is a plan view similar to FIG. 3, removing the motor to illustrate an idler support plate.
Figure 5:
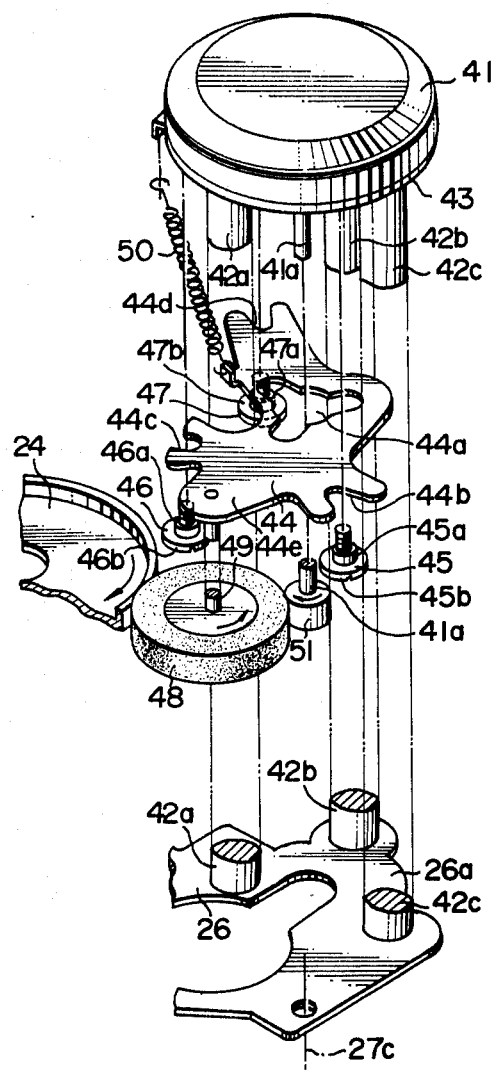
FIG. 5 is an exploded, perspective view of the idler support mechanism shown in FIG. 3.

The drive from the motor is transmitted to the flywheel 24 integrally secured to the capstan 8 through a transmission assembly which will be described later. Referring to FIGS. 3, 5, 21A and 21B, a flat miniature motor 41 for driving the flywheel 24 is of a conventional design but has a considerably reduced thickness because of its coreless construction. A rearward extension 26a of the support plate 26 has three studs 42a, 42b, 42c fixedly mounted thereon, which are secured to a motor mounting plate 43, on which the motor 41 is mounted. The mounting plate 43 is in the form of a flat disc having a configuration similar to that of the upper surface of the motor 41, and the motor is mounted thereon so that its output shaft 41a extends in the downward direction through a central opening 44a formed in an idler support plate 44 which is mounted on the mounting plate 43 in a floating manner. The idler support plate 44 is loosely fitted, at a position below the mounting plate 43, on three stepped screws 45, 46, 47 which are inserted through notches 44b, 44c, 44d of the plate 44 to be threadably engaged with the motor mounting plate 43. More specifically, the idler support plate 44 is configured so as to be relieved around the studs 42a to 42c, and steps 45a, 46a, 47a of the screws freely pass through the recesses 44b to 44d while the plate 44 rests on the heads 45b, 46b, 47b of the respective screws on account of its gravity so as to be freely movable below the motor mounting plate 43. Such mounting of the idler support plate 44 is best shown in FIG. 4, with the motor 41 removed. A transmission element or idler 48 is rotatably mounted on a pivot 49 which is fixedly mounted on and depends downwardly from an extension 44e of the plate 44, which is located between the notches 44b and 44c. In the embodiment shown, the idler 48 is in the form of a rubber roller. The plate 44 is biased toward one of the stepped screws, 47, by a coiled tension spring 50 which extends between the plate 44 and the motor mounting plate 43, whereby the idler 48 is maintained in abutting relationship with the outer periphery of the flywheel 24 as well as an output pulley 51 which is fixedly mounted on the output shaft 41a of the motor 41, thus effectively transmitting the rotation of the motor 41 to the flywheel 24. When the support plate 44 for the idler 48 is movably disposed in this manner, the idler 48 is enabled to assume an arbitrary position intermediate the flywheel 24 and the output pulley 51 in which it bears against the peripheral surfaces of the latter with an equal pressure, thus greatly improving the efficiency of transmission of the drive. If the idler were mounted on an idler support plate which is rockable or swingable about a pivot, the point of engagement between the idler on one hand and the output pulley and the flywheel on the other hand will be fixed, tending to increase the pressure of engagement at either position, thereby resulting in a reduced transmission efficiency. However, with the above described arrangement for the idler support plate 44, if the position or attitude of the tape recorder varies, the idler 48 is free to change its point of contact with the output pulley 51 and the flywheel 24 so as to bear against them with an equal pressure, thus smoothly transmitting the drive therebetween. It will be also appreciated that the location of the support plate 44 of the 48 at a position which overlaps the motor 41 reduces the space requirement within the tape recorder and also improves the operational efficiency of the idler.

The provision of the idler 48 between the output pulley 51 and the flywheel 24 results in the same direction of rotation for the pulley 51 and the flywheel 44. Thus, FIG. 3 illustrates that when the output pulley 51 rotates clockwise, as indicated by an arrow 52, the idler 48 will rotate counter-clockwise as indicated by an arrow 53, while the flywheel 24 will rotate in the same direction as the output pulley 51, as indicated by an arrow 54. This presents a problem in connection with the moment of inertia of the motor 41 and the flywheel 24. As is well recognized, the moment of inertia of a body is represented by the mass of the body multiplied by the square of radius of rotation, In one example, the flat miniature motor 41 has a rotor having a diameter of 26.7mm while the flywheel 24 has a diameter of 35mm, so that both of these components have an increased moment of inertia. The problem arises because the components having an increased moment of inertia rotate in the same direction. Since the contemplated miniature tape recorder is for portable use and thus is gripped by hand during a recording operation, if it is swung by hand, the influence of an external force may add to the moment of inertia of the rotor of the motor and the flywheel 24. For this reason, these moments of inertia must be minimized or cancelled in order to assure a favourable recording performance. However, it is difficult to cancel them with the idler 48 of a reduced diameter along which rotates in the opposite direction. The cancellation of the moment of inertia may be achieved by having the rotor and the flywheel rotating in the opposite directions, which may be accomplished by the provision of a pair of idlers. However, this requires an increased space for their provision and also degrades the transmission efficiency.

Figure 6:
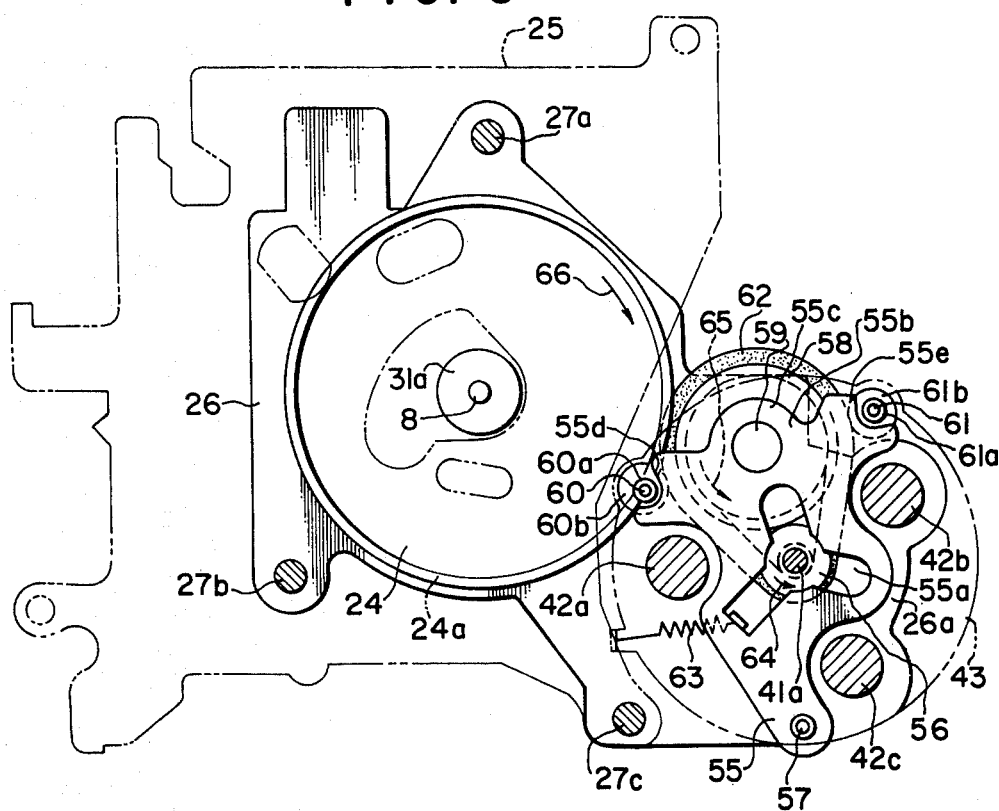
FIG. 6 is a top plan view of another example of the idler support mechanism, with the motor being removed.
Figure 7:
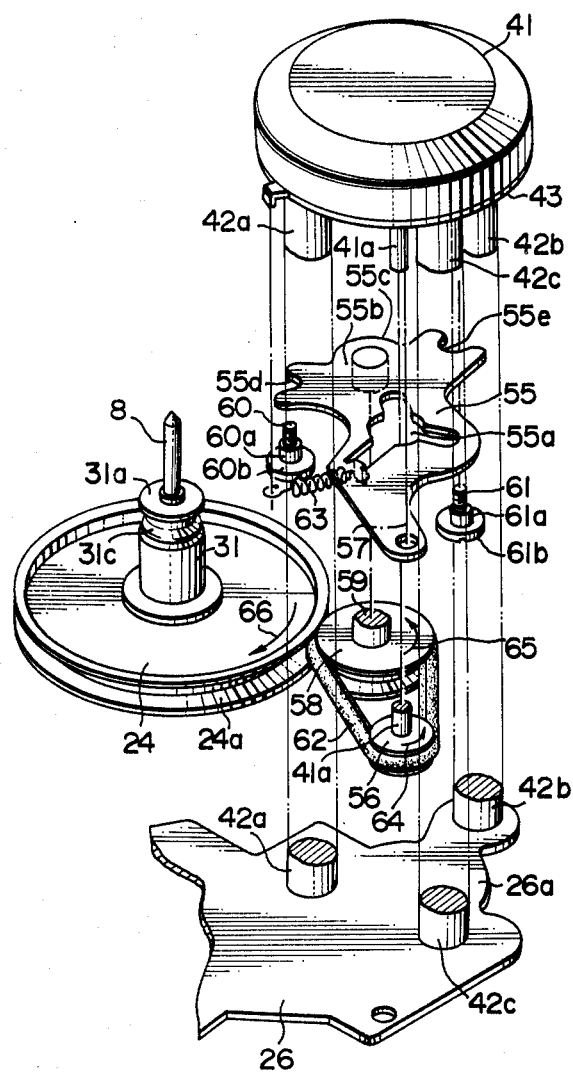
FIG. 7 is an exploded, perspective view of the idler support mechanism shown in FIG. 6.

In accordance with the invention, there is provided means for transmitting the drive from the motor to the flywheel which incorporates a belt in order to eliminate the disadvantages mentioned above. Referring to FIGS. 6 and 7, an embodiment of a transmission mechanism which incorporates a belt to drive the capstan will be described. As before, the mechanism comprises the flat miniature motor 41 which is mounted on the motor mouting plste 43. For the sake of brevity, the motor 41 is not shown in FIG. 6. The ouput shaft 41a of the motor 41 extends downwardly through an opening 55a which is centrally formed in an idler pulley mounting lever 55, and has an output pulley 56 having a peripheral V-shaped groove fixedly mounted on its free end. The lever 55 is rockably mounted on a pivot 57 which is fixedly mounted on the motor mounting plate 43, and its free end portion 55b is relieved to avoid abutment against the studs 42a to 42c while extending into the space directly below the mounting plate 43. A shaft 59 for mounting an idler pulley 58 is fixedly mounted on an extension 55c of the lever 55 and depends downwardly therefrom. A pair of notches 55d, 55e are formed on the opposite sides of the extension 55c, and located within these notches are the steps 60a, 61a of stepped screws 60, 61 which threadably engage the motor mounting plate 43 from below. In this manner, the free end portion 55b of the lever 55 rests on the heads 60b, 61b of the stepped screws 60, 61 on account of its gravity. Thus, a rocking motion of the lever 55 is permitted within the clearance formed between the notches 55d, 55e and the steps 60a, 61a. The idle pulley 58 is formed with a V-shaped groove which is engaged by an endless belt 62 having a rhombic section and which functions as a transmission element and also extends around the V-shaped groove in the output pulley 56 of the motor. The flywheel 24 which is integrally secured to the capstan 8 is also formed with a V-shaped groove 24a in its peripheral surface.

The lever 55 is urged to rotate counter-clockwise, as viewed in FIGS. 6 and 7, about the pivot 57 by a coiled tension spring 63 which extends between the lever 55 and the motor mounting plate 43, whereby the endless belt 62 having the rhombic section enters the groove 24a in the periphery of the flywheel 24, thus engaging it. When the motor 41 is set in motion under this condition, the drive therefrom is transmitted from the output pulley 56 to the flywheel 24 through the belt 62, thus driving the capstan 8. It will be seen that when the output pulley 65 of the motor 41 rotates counter-clockwise, as indicated by an arrow 64, for example, the idle pulley 58 is also rotated counter-clockwise through the belt 62, as indicated by an arrow 65, so that the flywheel 24 will rotate clockwise, as indicated by arrow 6, by the drive transmitted from the belt 62. In this manner, the flywheel 24 rotates in the opposite direction from the motor 41, so that a substantial cancellation of the moment of inertia can be achieved. With this arrangement, the provision of the single idle pulley 58 is sufficient, achieving a high transmission efficiency without increasing the space requirement. In addition, the endless belt 62 having the rhombic cross section, engages the V-shaped groove 24a of the flywheel 24 to prevent an upward movement of the capstan 8 which is integral with the flywheel 24, so that the thrust bearing assemblies which have been mentioned above in connection with the capstan 8 may be eliminated.

Figure 8:
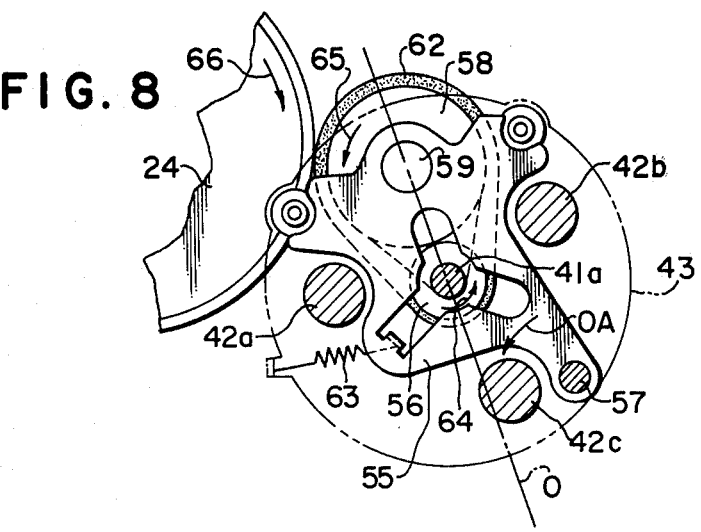
FIG. 8 is a top plan view of a further example of the idler support mechanism, with the motor being removed.

In the arrangement shown in FIGS. 6 and 7, the lever 55 is urged by the coiled tension spring 63 to rotate counter-clockwise about the pivot 57. In an alternative arrangement shown in FIG. 8, the pivot 57 of the lever 55 may be disposed to the right, as viewed in FIG. 8, of a line O joining the shaft 59 of the idle pulley 58 and the output shaft 41a of the motor so that the lever 55 is urged to rotate counter-clockwise about the pivot 57, as indicated by an arrow OA, as a result of the rotation of the pulley 58 and the belt 62, thus reducing the resilience required of the coiled spring 63.

In the capstan drive mechanism as described above, it is necessary that the periphery of the idler be maintained in proper abutting engagement with the periphery of the output pulley of the motor and the flywheel associated with the capstan in order to achieve an efficient transmission of the drive from motor to the capstan. However, the output pulley and/or flywheel is frequently skewed through slightly, depending on the manner of mounting the motor or the capstan. In particular, the motor is often mounted by using a vibration absorbing resilient member, so that the output pulley associated therewith tends to be skewed more strongly, thus resulting in an unbalanced abutting relationship between these members to cause a varying axial force applied to the idler, giving rise to the occurrence of wow or flutter as a result on non-uniform rotation thereof or increasing the load on the motor or power dissipation thereof.

Figure 9:
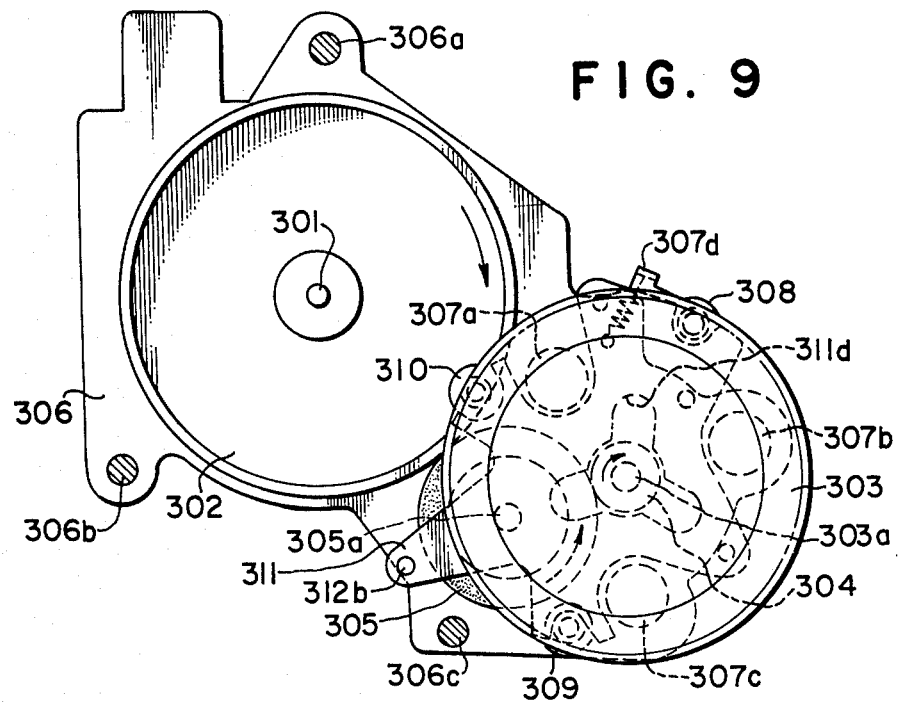
FIG. 9 is a top plan view of an additional example of the idler support mechanism which includes an adjustable idler support means.
Figure 10:
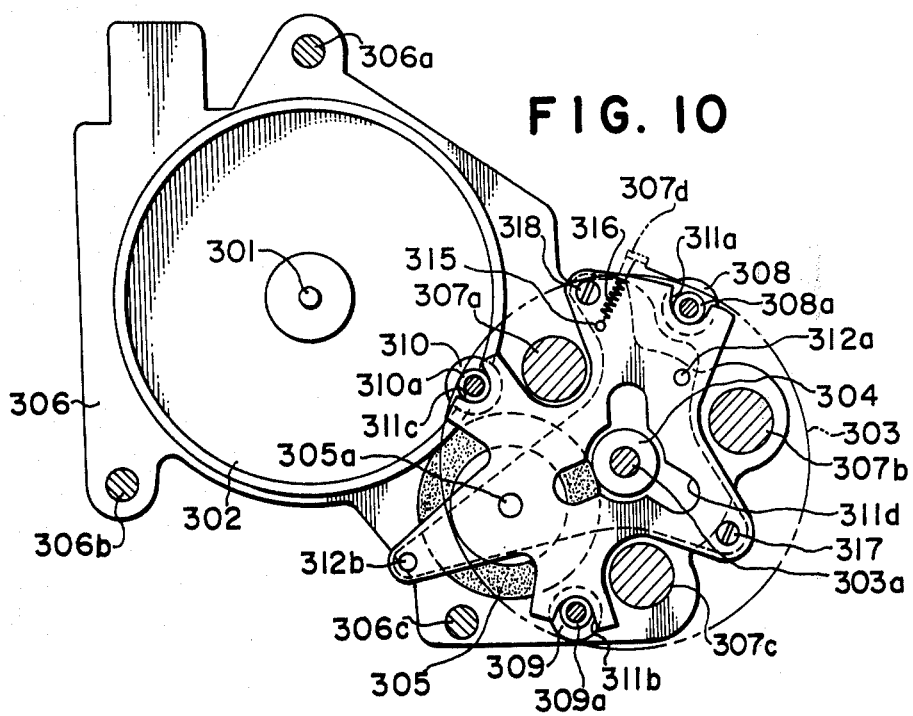
FIG. 10 is a similar plan view to FIG. 9, with the motor being removed.
Figure 11:
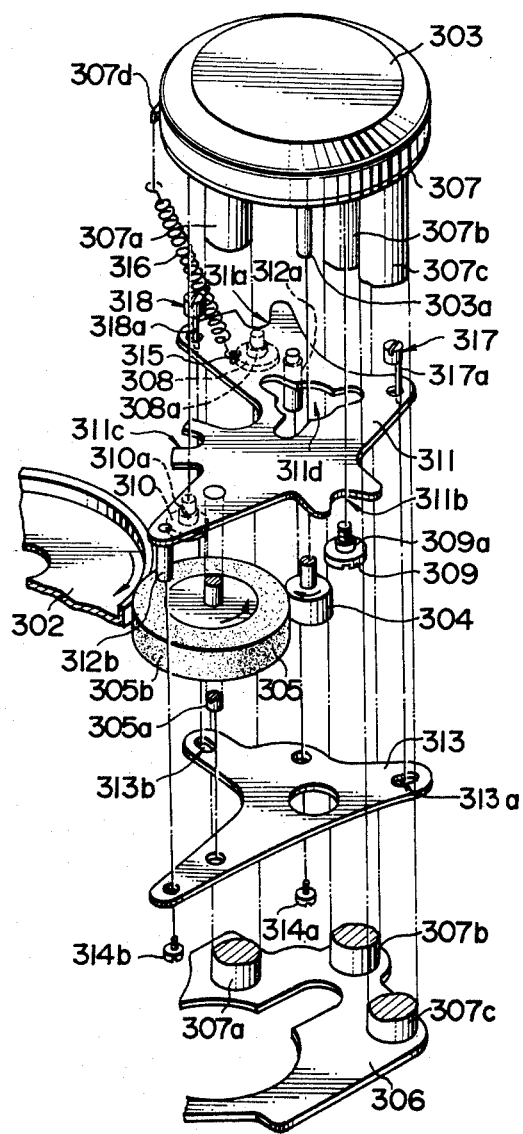
FIG. 11 is an exploded, perspective view of the idler support mechanism shown in FIG. 9.

FIGS. 9 to 12 show an embodiment of an idler support mechanism which includes means for adjusting a skew of an idler supporting shaft which is mounted on the idler support plate. Referring to FIGS. 9, 10 and 11, a capstan 301 and a flywheel 302 integral therewith are rotatably mounted on a support plate 306 (see FIGS. 9 and 10), which is secured to the stationary base plate (not shown) by means of studs 306a, 306b, 306c. A motor 303 is fixedly mounted on a mounting plate 307 (see FIG. 11), from which depends studs 307a, 307b, 307c which are fixedly mounted on the support plate 306. Three studs 308, 309, 310 are fixedly mounted on the mounting plate 307 and depend therefrom downwardly, and are formed with steps 308a, 309a, 310a which are loosely fitted in respective notches 311a, 311b, 311c formed in the periphery of an idler support plate 311, thus supporting the idler support plate 311 while permitting a limited movement thereof between the studs 308 to 310. The idler support plate 311 is centrally formed with an opening 31 through which an output shaft 303a of the motor extends downwardly, the output shaft 303a having a drive wheel 304 fixedly mounted on its free end. The idler support plate 311 has a pair of studs 312a, 312b fixedly mounted thereon, which depend therefrom to carry an idler adjusting plate 313, which is displaceably secured thereto by means of set screws 314a, 314b. Specifically, openings which receive the studs are of a greater diameter than the latter to permit their displacement therein. An idler 305 is formed of a resilient material such as rubber and has its shaft 305a rotatably supported by the idler support plate 311 and the idler adjusting plate 313. The idler 305 has its peripheral surface 305b maintained in abutting relationship against the drive wheel 304 associated with the motor 303 and the flywheel 302 associated with the capstan 301, respectively, by urging the idler support plate 311 toward a position intermediate the flywheel 302 and the drive wheel 304 by means of a coiled spring 315 which extends between a pin 315 fixedly mounted on the idler support plate 311 and a projection 307d on the motor mounting plate 307. Since the idler support plate 311 is movably supported, the idler 305 is free to engage both the drive wheel 304 and the flywheel 302, thus effectively transmitting the drive from the motor 303 to the latter. It is desirable that the line of action of the coiled spring 316 is in coincidence with or parallel to a bisector perpendicular to the line which joins the points of contact between the peripheral surface 305b of the idler 305 and the drive wheel 304 and the flywheel 302.

Figure 12:
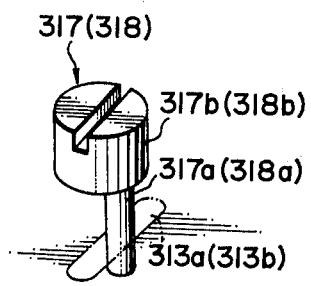
FIG. 12 is a perspective view, to enlarged scale, of an adjusting pin shown in FIGS. 9 to 11.

In the right- and left-hand arms, as viewed in FIG. 11, the idler adjusting plate 313 is formed with a position adjusting slot 313a which is elongate in a direction toward the shaft 305a of the idler 305, and also with a round hole 313b. The slot 313a and the hole 313b are engaged by shanks 317a, 318a of adjusting pins 317, 318 which are rotatably fitted into the idler supporting plate 311. As indicated in FIG. 12, the shanks 317a, 318a of the adjusting pins 317, 318 are located eccentric with respect to their bodies 317b, 381b, so that when these bodies 317b, 318b are turned, the shanks 317a, 318a bear against the edge of the slots 313a, 313b, thus causing a slight displacement of the idler adjusting plate 313 relative to the idler support plate 311 while maintaining a substantially parallel relationship therebetween.

During assembly, when the desired positional relationship between the flywheel 302, the drive wheel 304 and the idler 305 is to be established, the set screws 314a, 314b are loosely fitted to leave the idler adjusting plate 313 in a condition freely movable relative to the idler support plate 311, and then the adjusting pins 317, 318 are alternately turned to find an optimum position by observing a variation in the load on the motor or the occurrence of wow or flutter. When the optimum position is established, the set screws 314a, 314b may be crimped or caulked. A turning of the adjusting pins 317, 318 two times alternately will be usually sufficient to eliminate or minimize the thrust component of force applied to the idler 305, thus avoiding a non-uniformity of the rotation which would cause wow or flutter. While the adjusting pins have been described above as being caulked to the idler support plate 311, they may be threadably engaged therewith. With this arrangement, the positional relationship of the idler relative to the output wheel and the flywheel can be adjusted to an optimum condition in a simple manner.

Figure 13:
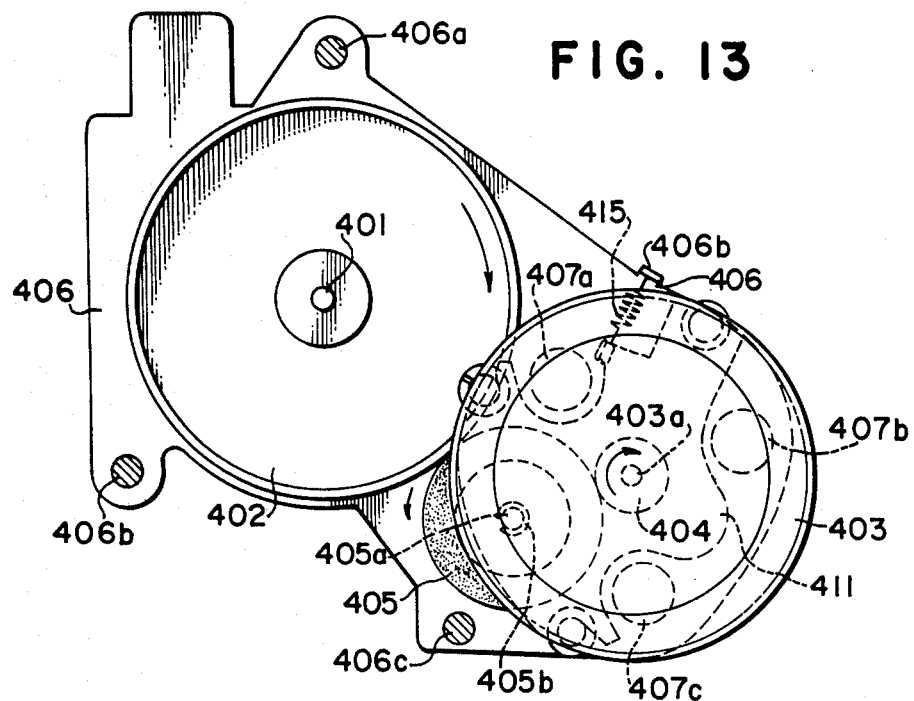
FIG. 13 is a top plan view of still another example of the idler support mechanism which includes an adjustable idler support means.
Figure 14:
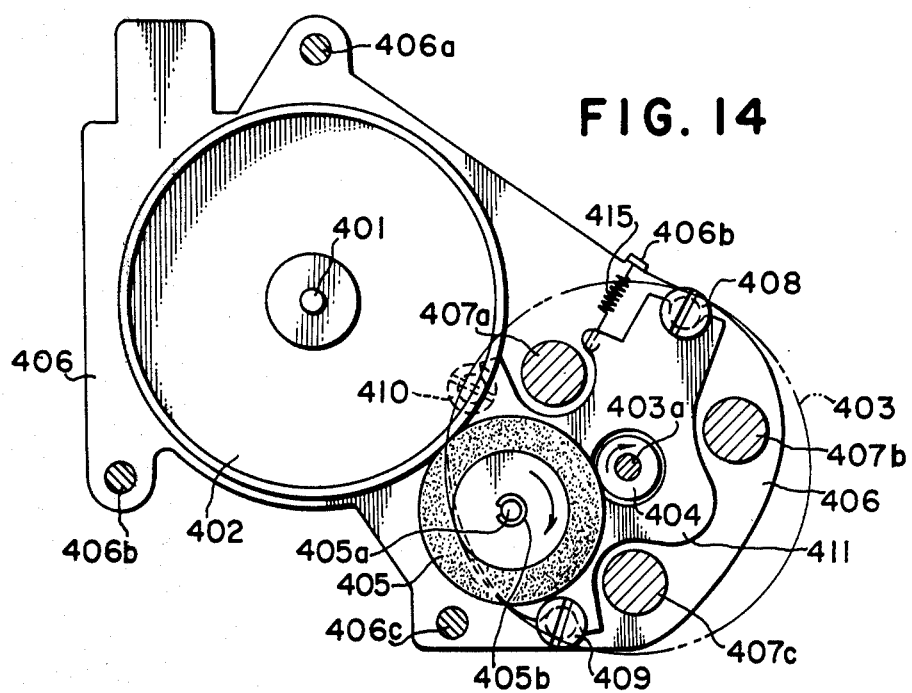
FIG. 14 is a plan view similar to FIG. 13, with the motor being removed.
Figure 15:
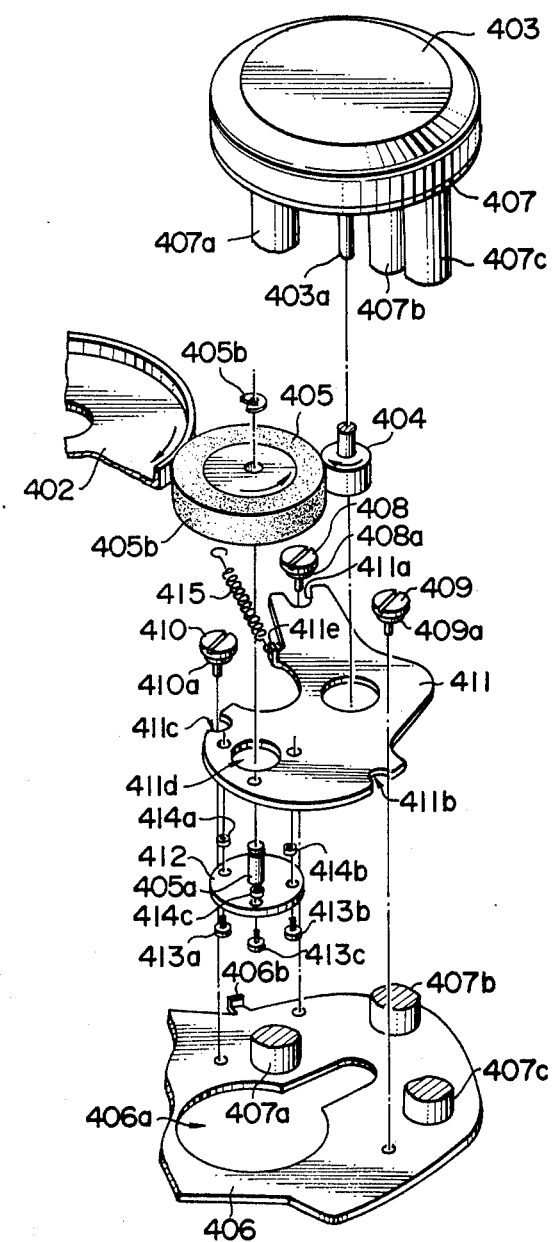
FIG. 15 is an exploded, perspective view of the idler support mechanism shown in FIG. 13.

FIGS. 13 to 15 shows another embodiment of the idler support mechanism which includes means for adjusting the idler supporting shaft. Specifically, a capstan 401 and a flywheel 402 which is integral therewith are rotatably mounted on a support plate 406 (see FIGS. 13 and 14), which is fixedly mounted on a stationary base plate by means of studs 406a, 406b, 406c.

A motor 403 is fixedly mounted on a mounting plate 407 (see FIG. 15), which is secured to the support plate 406 by means of studs 407a, 407b, 407c. Secured to the support plate 406 from above are headed screws 408, 409, 410 having steps 408a, 409a, 410a, respectively, which are loosely fitted in respective notches 411a, 411b, 411c formed in the periphery of an idler support plate 411 which is thus supported so as to be movable between the studs 407a to 407c and headed screws 408 to 410.

At its left-hand end, the idler support plate 411 is formed with an opening 411d, into which is fitted an idler supporting shaft 405a which is fixedly mounted on an idler adjusting plate 412. An idler 405 is formed of a resilient material such as rubber which is fitted over the supporting shaft 405a from above and is locked against withdrawal by means of a clamping member 405b. Adjusting screws 413a, 413b, 413c fitted with a resilient member such as a rubber sleeve 414a, 414b, 414c, respectively, are inserted into openings formed in the idler adjusting plate 412 from below, and then threadably engaged with the idler support plate 411. In this manner, the idler adjusting plate 412 is secured to the idler support plate 411 through the resilient members 414a, 414b, 414c. In a region opposite to the idler adjusting plate 412, the support plate 406 is formed with an opening 406a which is adapted to receive a tool. A coiled spring 415 extends between a projection 411e of the idler support plate 411 and a projection 406b of the support plate 406, thereby urging the idler support plate 411 toward a position intermediate the flywheel 402 and the drive wheel 404 to bring the peripheral surface 405b of the idler 405 into abutting engagement with these two members 402, 404. Since the idler support plate 411 is movably supported, the idler 405 itself is free to engage the drive wheel 404 and the flywheel 402, thus effectively transmitting the drive from the motor 403 to the flywheel 402. It is desirable that the line of action of the coiled spring 415 be in coincidence with or parallel to a bisector perpendicular to a line segment which joins the points of contact between the peripheral surface 405b of the idler 405 on the one hand and that the drive wheel 404 and the flywheel 402 on the other hand.

The adjustment for achieving a desired abutting engagement between the idler 405, the flywheel 402 and the drive wheel 404 is performed by inserting a tool such as screwdriver through the opening 406a in the support plate 406 to selectively turn the adjusting screws 413a, 413b, 413c so as to cause an expansion or contraction of the resilient members 414a, 414b, 414c to adjust a slight angular deviation of the shaft 405a of the idler 405 from the normal to the idler support plate 411 while utilizing suitable means such as galvanometer to observe the occurrence of wow or flutter or a variation in the load on the motor. The optimum position is determined where wow, flutter or the load on the motor is minimized.

With the idler adjusting means disclosed in the present embodiment, the abutting engagement between the drive wheel associated with the motor, the flywheel associated with the capstan and the idler can be very simply adjusted during or subsequent to the assembly, enabling a complete elimination of an axial component of the force on the idler which may give rise to a non-uniform rotation or an increase in the load on the motor.

2. Drive mechanism for the tape supply and take-up shafts

The purpose of this mechansim is to rotate one of the tape supply shaft 4 and the tape take-up shaft 5 (see FIG. 1) which are rotatably mounted on the stationary base plate 25 as the capstan 9 is driven, thus permitting a tape winding operation.

Figure 19:
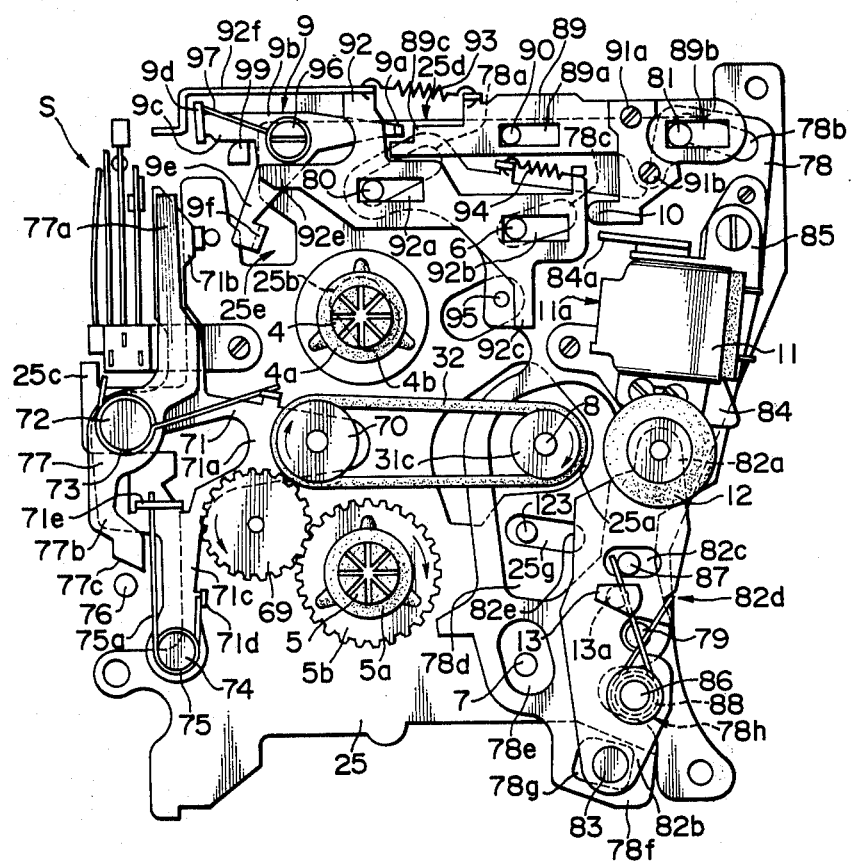
FIG. 19 is a top plan view of a stationary base plate which is fixed within a tape recorder and on which various actuating members and parts are disposed.
Figure 20:
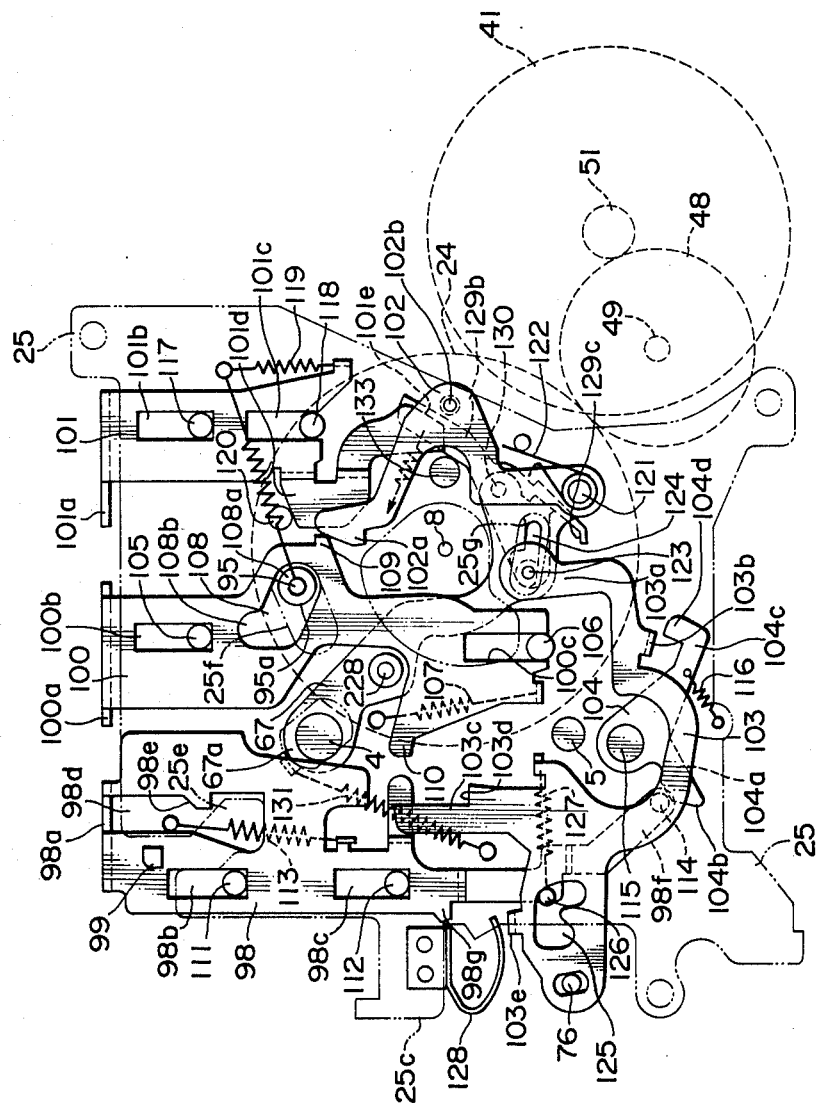
FIG. 20 is a plan view of various actuating members and parts mounted on the underside of the stationary base plate shown in FIG. 19, as viewed through the base plate.
Figure 21A:
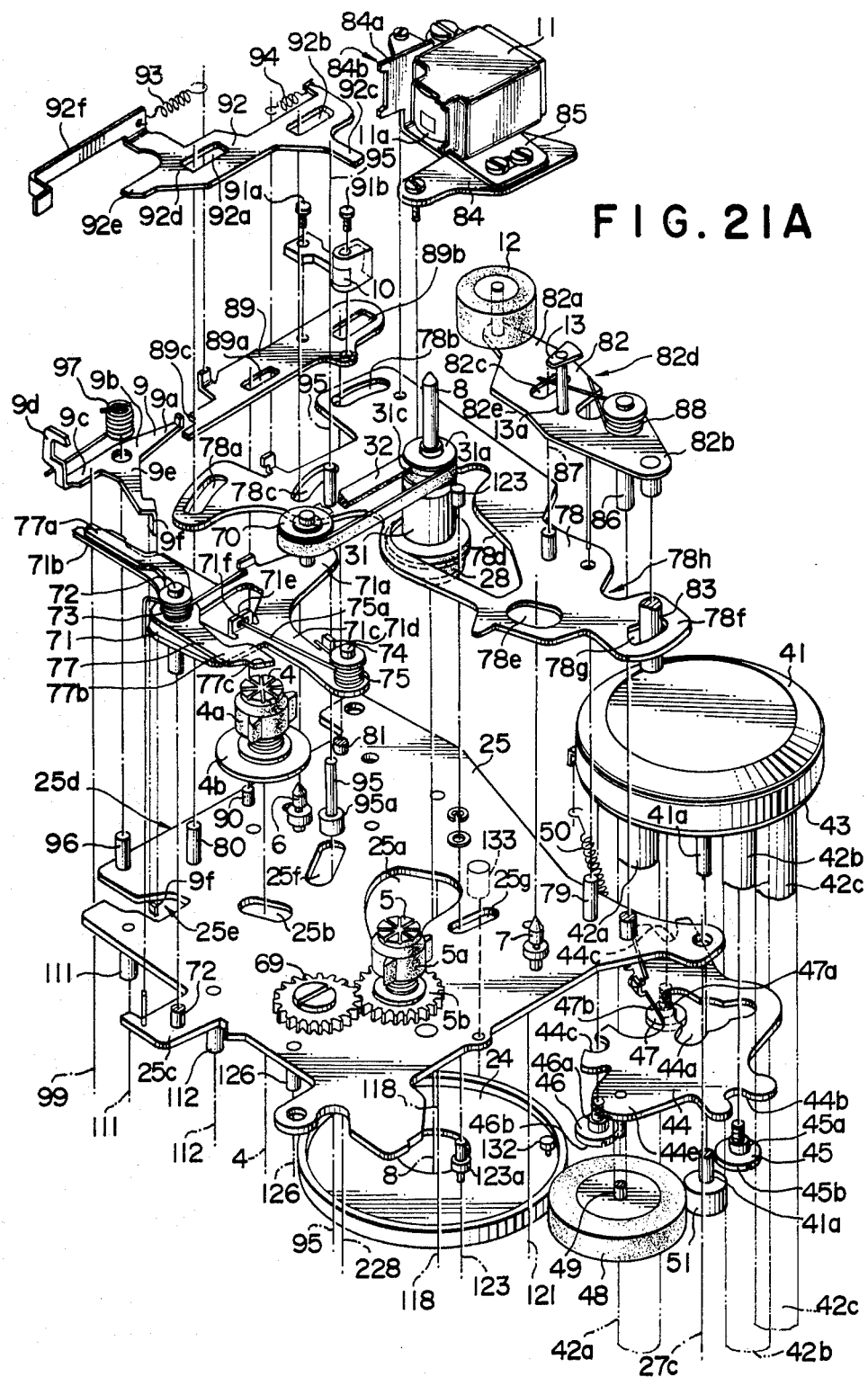

As indicated in FIGS. 19, 21A and 21B, the tape supply shaft 4 and the tape take-up shaft 5 are located centrally on the stationary base plate 25, somewhat displaced to the left, at positions which are symmetrical with respect to the capstan 8. Throughout the drawings which are related to the present embodiment, the stationary base plate 25 is shown in an orientation such that the illustrated left-hand edge is located opposite to the control panel 2d of the tape recorder 2, and various members and parts which are mounted on or above the stationary base plate 25 are shown as they are viewed from above. Other members and parts which are mounted on or below the underside of the base plate 25 are shown as viewed therethrough. Specifically, FIG. 19 shows the various members and parts mounted on the upside of the base plate 25 in plan view while FIG. 20 shows other members and parts mounted on the underside of the base plate 25 also in plan view, but as viewed through the base plate, FIGS. 21A and 21B are exploded perspective views of members and parts located on and under the base plate 25, respectively, even though certain parts are shown in both Figures.

Referring to FIGS. 19, 21A and 21B, the tape supply shaft 4 which is engaged by one of the tape hubs, 1b, of the tape cassette (see FIG. 1) is located on the base plate 25, and is rotatably mounted on a shaft 68 (see FIG. 21B) which is fixedly mounted on one arm of a tape end detecting lever 67 (see FIG. 21B) which is in turn pivotally mounted on the base plate 25 and located therebelow. As will be described later, the detecting lever 67 functions to stop the operation of the tape recorder 2 automatically by being rocked about its pivot as driven by the tape supply shaft 4 which is being pulled by the tape when the end of the tape is being reeled off the tape hub 1b is reached. The shaft 68 extends through an elongated opening 25b having a diameter greater than that thereof which is formed in the base plate 25 and rotatably carries the tape supply shaft 4 thereon. As is well known, the tape supply shaft 4 comprises an engaging portion 4a on which the tape hub 1b (see FIG. 1) of the tape cassette is fitted, a drive wheel 4b for driving the shaft 4, and a slip assembly (not shown) which is interposed between the drive wheel 4b and the engaging portion 4a. When a rotative force is transmitted to the drive wheel 4b during a tape rewind and review operation, the engaging portion 4a is driven through the slip assembly to rotate counter-clockwise, thus rotating the tape hub 1b in a direction to take up the tape thereon.

The tape take-up shaft 5 is located in the lower portion of the base plate 25 (as viewed in FIGS. 19, 21A, 21B), and the other tape hub 1c of the tape cassette is fitted on the shaft 5. The shaft 5 is rotatably mounted on a stationary shaft (not shown) which is fixedly mounted on the base plate 25 at a position symmetrical to the tape supply shaft 4 with respect to the capstan 8. As is well known, the tape take-up shaft 5 also comprises an engaging portion 5a on which the other tape hub 1c is fitted, a drive wheel 5b for driving the shaft 5, and a slip assembly interposed between the drive wheel 5b and the engaging portion 5a. During a recording, playback, rapid advance and queing operation, a rotative force is transmitted to the drive wheel 5b to rotate the engaging portion 5a clockwise through the slip assembly, thus rotating the tape hub 1c to take up the tape thereon. The drive wheel 5b is in the form of a gear which meshes with an idle gear 69 which is rotatably mounted adjacent to the gear 5b, and the rotative force is transmitted to the drive wheel 5b through the idle gear 69.

The transmission of the rotative force to the drive wheels 4b and 5b takes place through the endless V-belt 32 which is untrained around the pulley 31c integral with the capstan 8 and a pulley 70 which is located outwardly of the shafts 4, 5, the belt selectively engaging and driving the idle gear 69 or the drive wheel 4b.

The pulley 70 is journaled rotatably on a first arm 71a of a switching member 71 which extends toward the capstan 8. The switching member 71 is pivotally mounted at 72 on an extension 25c of the base plate 25. In addition to the first arm 71a, the switching member 71 includes a second arm 71b which extends in the upward direction, as viewed in FIG. 19, along the left-hand edge of the base plate 25, and a third arm 71c which extends in the opposite direction from the second arm 71b along the left-hand edge of the base plate 25. A spring 73 which has its one end engaged with the base plate 25 and its other end with the first arm 71a normally urges the switching member 71 to rock clockwise about the pivot 72 so that the outer surface of the V-belt 32 extending around the pulley 70 bears against the idle gear 69. If the capstan 8 is drivin in the clockwise direction, as indicated by an arrow under this condition, the rotative force is transmitted through the belt 32, idle gear 69 to the drive wheel 5b, causing the tape take-up shaft 5 to rotate in the clockwise direction which is a tape winding direction.

The third arm 71c of the switching member 71 has a stub shaft 74 fixedly mounted thereon, on which a torsion spring 75 is disposed, having its one end engaged with an upright piece 71d of the arm and its other end 75a extending toward the pivot 72 and having its free end engaged with a square slot 71f formed in an upright piece 71e. The purpose of the spring 75 is to provide a resilient switching action of the switching member 71. When the other end 75a of the spring 75 is engaged and forced by a pin 76, the switching member 71 will be rocked counter-clockwise about the pivot 72 against the resilience of the spring 73, changing the transmission of the rotative force from the capstan 8, from the idle gear 69 to the dirve wheel 4b. Since the pin 76 does not abut against the arm 71c directly, but urges it through the end 75a of the spring 75 at this time, the rocking motion of the other arms 71a, 71b will also be resiliently controlled when bringing the belt 32 into engagement the drive wheel 4b. When the belt 32 is thus changed, the rotative force from the capstan 8 is transmitted to the drive wheel 4b through the belt 32, whereby the tape supply shaft 4 rotates in the counter-clockwise direction.

Also at this time, the second arm 71b of the switching member 71 rocks counter-clockwise, as viewed in FIG. 19, to actuate a group of change-over switches (see FIG. 19) which are located adjacent thereto in order to change the speed of the motor 41. The group of the switches are controlled by a counter-clockwise rocking motion of the second arm 71b and one arm 77a of a switching lever 77 as will be described below. The speed of the motor 41 is increased during a tape rewind operation, a review operation and a rapid advance of the tape.

The switching lever 77 is pivotally mounted at 72 in overlapping relationship above the switching member 71, and functions to actuate the group of switches during a rapid advance of the tape. The switching lever 77 has one arm 77a which extends in parallel relationship with and above the second arm 71b, and also another arm 77b which extends outwardly of the third arm 71c and which has a beveled edge 77c at its free end. The beveled edge 77c is located adjacent to the pin 76, or thereabove when viewed in FIG. 19, and is moved by the pin 76 as the latter is moved toward the pivot 72 along the end 75a of the spring 75, whereby the switching lever 77 is rocked counter-clockwise about the pivot 72 to have its arm 77a actuating the group of switches S.

3-1. Record, playback and stop mechanisms

These mechanisms are adapted to enable or disable the erase head 10, record/playback head 11 and the pinch roller 12 mounted on the base plate 25 by means of individual actuating members below the base plate 25. Referring to FIGS. 19, 21A and 21B, a magnetic head support plate 78 on which the magnetic head 11 is carried is pivotally mounted on the pivot 79 which is fixedly mounted on the base plate 25 at a position toward the rear end thereof (or toward the right-hand end thereof as viewed in FIG. 19). The support plate 78 fans out toward the left-hand edge, as viewed in FIG. 21A, or toward the upper edge 25d as viewed in FIG. 19, and is formed, adjacent to its free end, with arcuate guide slots 78a, 78b, 78c which have their centers in alignment with the pivot 79. The slots 78a and 78b are engaged by stationary pins 80, 81, respectively, which are fixedly mounted on the base plate 25 while the remaining guide slot 78c is engaged by the positioning pin 6. These slots and the pins control a rocking motion of the support plate 78. Intermediate its ends, the support plate 78 is formed with an opening 78d which is substantially aligned with the opening 25a in the base plate 25. The capstan 8 and the sleeve 31 integral therewith extend through both openings 25a, 28d from below. The support plate is also formed with a relatively large opening 78e through which the other positioning pin 7 fixedly mounted on the base plate 25 extends. The opening 78e is large enough to prevent interference with a rocking motion of the support plate 78. In its tail end 78f, the support plate 78 is also formed with an opening 78g, which is engaged by a stub shaft 83 fixedly mounted on and depending from the tail end 82b of a pinch roller support plate 82 which is rockably disposed on the support plate 78. The stub shaft 83 constrains the extend of the rocking motion of the pinch roller support plate 82 relative to the support plate 78.

The magnetic head 11 is disposed on the head support plate 78 to the right of the capstan 8, as viewed in FIG. 19. Specifically, the head 11 is mounted on the support plate 78 by means of a pair of head mounting plates 84, 85 so that its active head surface 11a is directed toward the tape supply shaft 4. The lower mounting plate 84 is folded at right angles so as to have a vertical portion 84a which is formed with a tape guide 84b along its forward edge, and a horizontal portion which is secured to the support plate 78. The mounting plate 85 to which the magnetic head 11 is secured is mounted on the horizontal portion. The mounting plate 85 is constructed to permit an adjustment in elevation and horizontal attitude relative to the lower mounting plate 84 so that the elevation and azimuth of the magnetic head 11 relative to the tape can be adjusted.

The pinch roller support plate 82 is rockable about a pivot 86 which is secured to the base plate 25 and which extends through a notch 78h formed in the lateral edge of the support plate 78. The support plate 82 rotatably carries the pinch roller 12 on its free end 82a which extends toward the head 11. The pinch roller support plate 82 forms a twin lever together with the head support plate 78. Specifically, at a position toward the pinch roller 12, the pinch roller support plate 82 is formed with a guide slot 82c which extends in a direction parallel to the direction of rocking motion of the support plate 82 and which is engaged by a pin 87 fixedly mounted on the support plate 78. A torsion spring 88 is disposed on the free end of pivot 86, and its free ends are crossed before engaging its one end with the pin 87 and its other end bent around a notch 82d of the support plate 82 to engage the lateral edge of the support plate 78, thus causing the both support plates 82, 78 to rock integrally. However, when an inside edge 82e of the support plate 82 is moved in an outward direction by an actuating pin to be described later, only the support plate 82 is rocked clockwise about the pivot 86 against the bias applied, thus moving the pinch roller 12 away from the capstan 8. A shaft 13a is fixedly mounted on the support plate 82 and has a member 13 secured to its free end which prevents a withdrawal of a loaded cassette.

A support plate 89 for the erase head 10 is disposed on the free end of the head support plate 78. The support plate 89 is elongate, and is formed with a pair of guide slots 89a, 89b which are engaged by a pin 90, fixedly mounted on the base plate 25, and the above mentioned pin 81, respectively. The erase head 10 is mounted on the support plate 89 adjacent to the guide slot 89b, by means of set screws 91a, 91b. The support plate 89 is connected through a spring 93 with a main switch operating member 92 so as to move to the left, as viewed in FIG. 19, as the operating member 92 moves to the left, as viewed in FIG. 19, thus bringing the erase head 10 into abutting relationship with the magnetic tape during a recording operation. However, during operations other than a recording operation, a step 89c formed in the left-hand end of the support plate 89 bears against a first arm 9a of the lug detecting member 9 to be prevented from moving to the left as the operating member 92 moves to the left, thus blocking the movement of the erase head 10 into contact with the tape surface.

The main switch operating member 92 is disposed on the head support plate 78 at a position inwardly of and to the left of the erase head support plate 89, as viewed in FIG. 19, and is slidable in the same direction as the support plate 89. Specifically, it is formed with a pair of guide slots 92a, 92b which are respectively engaged by the guide pin 80 and the positioning pin 6, both fixedly mounted on the base plate 25. The operating member 92 is connected with the head support plate 78 through a spring 94 so as to be movable to the left as the support plate 78 rocks. However, the movement to the left of the operating member 92 is normally prevented by abutment of a laterally extending arm 92c, which extends therefrom toward the capstan 8, against a pin 95 which is secured to the head support plate 78. At its left-hand end 92d, the operating member 92 is integrally formed with a projection 92e which inhibits the depression of the record button 20 (see FIG. 2) during operations other than a recording operation. The operating member is also formed with a switch operating piece 92f which extends in parallel and spaced relationship from the projection 92e and which bears against a main switch contact in the group of switches S to close the main switch of the tape recorder as the operating member 92 moves to the left. The lug detecting member 9 which detects the presence or absence of lugs 1h, 1g (see FIG. 1) provided on the cassette for preventing an inadvertent erasure of a recorded tape is disposed above the projection 92e of the switch operating member 92, as viewed in FIG. 19. Referring to FIG. 21A, the lug detecting member 9 is a three arm member having its root portion 9b pivotally mounted on a hollow shaft 96 which is fixedly mounted on the base plate 25. The lug detecting member 9 has a first arm 9a which, as mentioned previously, extends toward the step 89c formed in the support plate 89, and a second arm 9c which extends in the opposite direction from the first arm 9a and having its free end bent at right angles to extend in the upward direction to form a lug detecting element 9d which is U-shaped, opening toward the base plate 25. As indicated in FIG. 1, the lug detecting element 9d extends into the cassette receiving station 2a of the tape recorder so as to be located opposite to one of the lugs, 1g, of the cassette loaded, thus detecting the presence or absence of the lug 1g as the lug detecting member 9 is rocked in response to the depression of the record button 20 (see FIG. 2).

Returning to FIGS. 19, 21A and 21B, the lug detecting member 9 includes a third arm 9e which extends inward of the base plate 25. The free end of the third arm 9e is bent toward the base plate 25 to form a blocking piece 9f which extends downwardly through a notch 25e formed in the base plate 25 to block the depression of the record button 20 when the absence of the lug 1g (or 1h) is detected. The lug detecting member 9 is urged to rock counter-clockwise about the hollow shaft 96 by a torsion spring 97 which is disposed thereon and having its one end secured thereto and its other end to the second arm 9c. However, normally, this rocking motion of the lug detecting member 9 is prevented by the engagement of the third arm 9c with a detent post 99 which is fixedly mounted on a record actuating member 98.

Referring to FIGS. 20 and 21B, disposed on the underside of the stationary base plate 25 are a record actuating member 98, a playback actuating member 100, a stop actuating member 101, a locking member 102 for locking the playback actuating member 100 in its playback position, the tape end detecting lever 67 mentioned above, a floating rod 103 (referred to hereinafter as FF operating member) which enables a rapid advance, queing, rewind and review operation, and a locking lever 104 associated with the FF operating member 103.

The individual actuating members 98, 100, 101 have their external ends extending beyond the base plate 25 and folded at right angles to form folded pieces 98a, 100a, 101a, to which are secured operating buttons 20, 21, 22 which are partly exposed outside the tape recorder. Specifically, the playback actuating member 100 is in the form of a slidable plate located centrally below the base plate 25 (as viewed in FIG. 20), and the playback button 21 is attached to its folded piece 100a as shown in FIG. 21B. The playback actuating member 100 is formed with a pair of elongate guide slots 100b, 100c which are spaced apart lengthwise or along the direction of its sliding movement, and which are engaged by pins 105, 106, respectively, which are fixedly mounted on and depend from the base plate 25. The playback actuating member 100 is urged to slide away from the base plate 25, by a coiled tension spring 107 which extends between the base plate 25 and the member 100. However, the playback actuating member 100 remains in its home position as a result of the engagement between the guide slot 100b and the pin 105.

Intermediate its ends, the playback actuating member 100 is formed with an actuating opening 108 which is elongate and extends initially in the direction of the sliding movement of the member 100 and then turns toward the head support plate 78. In the region of the base plate 25 which is located opposite to the actuating opening 108, the base plate 25 is formed with an elongate guide slot 25f which extends in the direction of rocking motion of the support plate 78. Thus, the actuating opening 108 and the guide slot 25f are in overlapping relationship, and extending into these openings 108, 25f is the lower portion of an actuating pin 95 which is fixedly mounted on the support plate 78, the top end of the pin 95 functioning to block a movement of the switch operating member 92. In the region which is located within the openings 108, 25f, the actuating pin 95 has a cylindrical flange 95a secured thereto, which normally bears against the end of the inclined portion 108a of the actuating opening 108 and also against the right-hand end, as viewed in FIG. 20, of the slot 25f. When the playback button 20 is depressed to slide the playback actuating member 100 along the base plate 25, the inclined portion 108a of the actuating opening 108 cams the flange 95a in a manner such that the pin 95 integral therewith moves from the right to the left, as viewed in FIG. 20, within the guide slot 25f. This movement of the pin 95 causes the head support plate 78 to rock counter-clockwise (see FIG. 23) about the pivot 79 to assume a playback mode. When the playback actuating member 100 has moved to its operative position, the flange 95a is located in the end 108b of the actuating opening 108 which is located nearer the playback button 21.

The record actuating member 98 and the stop actuating member 101 are both slidably located on the left- and right-hand sides, as viewed in FIG. 20, of the playback actuating member 100. As viewed in FIG. 20, the playback actuating member 100 is provided with a locking projection 109 on its right-hand edge and an unlocking projection 110 for the FF operating member 103 on its left-hand edge.

The record actuating member 98 is also in the form of a sliding plate which is slidable inward of the base plate 25, and is formed with a pair of elongate guide slots 98b, 98c which are spaced apart along and extend in the direction of its sliding movement, these slots being engaged by pins 111, 112 which depend downwardly from the base plate 25. The record actuating member 98 is urged to slide away from the base plate 25, by a coiled tension spring 113 which extends between the member 98 and the base plate 25. However, normally, this sliding movement is prevented by the abutment of the pins 111, 112 against the edge of the guide slots 98b, 98c, whereby the member 98 assumes a home position.

Intermediate its width, the record actuating member 98 is formed with a notched recess 98d in its end nearer the record button 20, and a projection 98e extends into the recess 98d for engagement with the blocking piece 9f of the lug detecting member 9. Toward its end nearer the record button 20 and on the left-hand side of the recess 98d, as viewed in FIG. 20, the actuating member 98 has the detent post 99 fixedly mounted thereon, which extends through the notch 25e formed in the base plate 25 to prevent a rocking motion of the lug detecting member 9 (see FIG. 19). An inner portion 98f of the actuating member 98 has a reduced width and extends in an oblique direction such that a lock pin 114 fixedly mounted on the free end thereof bears against a beveled edge 104b formed on the end of one arm 104a of a locking lever 104 which is pivotally mounted by pin 115 on the base plate 25. The locking lever 104 has another arm 104c which is formed with a hook end 104d, which is adapted to engage the FF operating member 103 to constrain its movement as the locking lever rocks. The locking lever 104 is urged to rock clockwise about the pivot 115 by a spring 116 which extends between the arm 104c and the base plate 25, but normally remains in its inoperative position as a result of the abutment of the lock pin 114 against the beveled edge 104b of the rocked lever 104. Intermediate the length of the left-hand edge, as viewed in FIG. 20, the record actuating member 98 is provided with a projection 98g, which also engages the FF operating member 103 to constrain its movement as the actuating member 98 slides inward onto the base plate 25.

The stop actuating member 101 which is disposed on the right-hand side, as viewed in FIG. 20, of the playback actuating member 100 is also formed as a sliding plate which is slidable inward onto the base plate 25. The member 101 is formed with a pair of elongate guide slots 101b and 101c (FIG. 20) which are spaced apart along and extend in the direction of its sliding movement, these guide slots being engaged by pins 117, 118 which are fixedly mounted on and depend downwardly from the base plate 25. A spring 119 extending between the member 101 and the base plate 25 urges the member 101 to slide away from the base plate 25, but such sliding movement is constrained by the abutment of the projection 101d thereof against a stop pin 120, whereby the member 101 normally assumes a home position. On the right-hand edge, as viewed in FIG. 20, of the inner end, the stop actuating member 101 is formed with a cam edge 101e which functions to rock the locking member 102 as the stop actuating member 101 is depressed inward.

The locking member 102 is pivotally mounted on a pivot 121 which is fixedly mounted on the base plate, and has an intermediate portion which is curved in a U-configuration and a free end portion extending toward the locking projection 109 associated with the playback actuating member 100 and which is formed with a hook 102a for engagement therewith. A pin 102b is fixedly mounted on and depends from the intermediate curved portion and is driven to cause a clockwise rocking motion of the locking member 102 about the pivot 121 as the stop actuating member 101 is depressed to cause its cam edge 101e to bear against the pin 102b. However, normally, the locking member 102 is urged by a torsion spring 122 disposed on the pivot 121 to rock counter-clockwise thereabout, whereby its free end remains stationary in abutment against the locking projection 109.

The FF operating member 103 extends across the inner ends of the record and playback actuating members 98, 100 and as viewed in FIG. 20, its left-hand end extends outside the base plate 25 where the pin 76 mentioned above is fixedly mounted so as to be operated upon by the operating button 28 disposed on the control panel 2d, as mentioned above in connection with FIG. 1.

Returning to FIGS. 20 and 21B, the FF operating member 103 is in the form of a floating rod having an intermediate portion which is curved in a U-configuration and has its right-hand end 103a extending to the vinicity of the pivot 121 of the locking lever 102. In the region adjacent to the right-hand end 103a, the base plate 25 is formed with an elongate guide slot 25g which extends in the direction of rocking motion of the pinch roller support plate 82 (see FIG. 19), and which is engaged by an actuating pin 123 fixedly mounted on the right-hand end 103a. The actuating pin 123 extends through the slot 25g and is located opposite to the inner edge 82e (see FIG. 19) of the pinch roller support plate 82. In addition, the actuating pin 123 also has a portion which depends downwardly from the right-hand end 103a for projection into an elongate slot 124 which is formed in the other arm 67b of the tape end detecting lever 67. In the region passing through the guide slot 25g, the actuating pin 123 has a flange 123a secured thereto, which assures against a rattling of the pin 123 as it moves within the slot 25g. The actuating pin 123 provides a pivot for the rocking motion of the FF operating member 103. Specifically, during a rapid advance and queing operation, the FF operating button 18 (see FIG. 1) is operated to move the pin 76 in the opposite direction from that in which the actuating members 98, 100, 101 are depressed. At this time, the FF operating member 103 rocks clockwise about the actuating pin 123 which functions as the pivot therefor.

To the right of the curved portion, as viewed in FIG. 20, the FF operating member 103 is provided with a folded piece 103b which is engaged by the hook end 104d of the locking lever 104. To the left of the curved portion, the member 103 is formed with a projecting arm 103c extending toward the record button 21 and which is provided with a step 103d on its lateral edge opposite to the playback actuating member 100 for engagement with the unlocking projection 110 of the playback actuating member 100. Toward the pin 76, the member 103 is formed with a guide slot 125 of an inverted U-configuration, as viewed in FIG. 20, which is engaged by a stationary pin 126 fixedly mounted on the base plate 25 for constraining the extent of movement of the operating member 103. A coiled tension spring 127 extends between the pin 126 and the operating member 103 to pull it to the left, as viewed in FIG. 20. However, the resulting movement of the member 103 is constrained by the abutment against the pin 126 of the right-hand edge of the guide slot 125, whereby the member 103 remains in its home position. At this time, the actuating pin 123 on its right-hand end 103a is located against the left-hand end of the guide slot 25g. In the region adjacent to the guide slot 125, and downwardly depending piece 103e is folded from the upper edge, as viewed in FIG, 20, of the member 103, and is adapted to bear against a curved return spring 128 attached to the projection 25c of the base plate as the member 103 rocks clockwise about the actuating pin 123. When the FF operating member 103 is no longer urged to rock, the spring 128 returns it to its steady state position. The depending piece 103e is engaged by the projection 98g of the record actuating member 98.

Referring to FIGS. 20 and 21B, the tape end detecting lever 67 is pivotally mounted on a pivot 228 fixedly mounted on the base plate at a position intermediate the record actuating member 98 and the playback actuating member 100. The detecting lever 67 includes one arm 67a on which is fixed the mounting shaft 68 for rotatably carrying the tape supply shaft 4 thereon and also another arm 67b in which is formed the elongate slot 124 engaged by the actuating pin 123. The elongate slot 124 has two portions, namely an elongate slot 124a which extends in the direction of rocking motion of the lever 67 about the pivot 228, and another elongate slot 124b which extends in the direction of movement of the actuating pin 123. An operation stop member 129 is pivotally mounted in the end of the arm 67b at 130, this member 129 being located under the arm 67b. The detecting lever 67 is urged to rock counter-clockwise about the pivot 228, by a spring 131 which extends between the arm 67a and the base plate 25. However, the resulting rocking motion is prevented by the abutment of the mounting shaft 68 against the inner edge of the slot 25b which is formed in the base plate 25. The tape supply shaft 4 rotatably mounted on the mounting shaft 68 assumes its given position when the shaft 68 remains stationary in this manner. The operation stop member 129 includes an arm 129d which is formed with an unlocking portion 129b which extends inside the pin 102b depending downwardly from the locking member 102, and another arm 129a which is provided with an abutment 129c formed by bending one lateral edge thereof downwardly. The abutment 129c is moved into the path of rotation of a pin 132 (see FIGS. 3, 4 and 16) fixedly mounted on the outer periphery of the flywheel 24 so as to be moved thereby as the detecting lever 67 rocks clockwise about the pivot 228. A spring 232 extends between the detecting lever 67 and the arm 129d to urge the operation stop member 129 to rock counter-clockwise about the pivot 130. However, this rocking motion is prevented by the abutment of the other arm 129d against a stop pin 133 which is fixedly mounted on the base plate 25.

3-2. Recording, playback and stop operations

A. Playback operation

A playback operation is enabled by loading a microcassette 1 into the cassette receiving station 2a (see FIG. 1) of the tape recorder 2, and depressing the playback button 21 (see FIGS. 2 and 21B). When the button 21 is depressed, the playback actuating member 100 slides inward onto the base plate 25 against the resilience of the spring 107, as guided by the pins 105, 106 in a manner illustrated in FIG. 22. Thereupon, the inclined portion of the opening 108 formed in the member 100 causes the pin 95 to be moved from right to left, as viewed in FIG. 22, within the guide slot 25f of the base plate 25, so that the head support plate 78 on which the pin 95 is fixedly mounted is guided by the guide pins 80, 81 and the positioning pin 6, while rocking counter-clockwise about the pivot 79 shown in FIG. 23. As it rocks, the magnetic head 11 carried thereon moves into the playback position, having its active head surface 11a located adjacent to the tape surface. As the head support plate 78 rocks into its operative position, the pinch roller support plate 82 which is connected therewith through the spring 88 also rocks counter-clockwise about the pivot 86, thus bringing the pinch roller 12 into its operative position in which it bears against the capstan 8 with the tape interposed therebetween.

Figure 23:
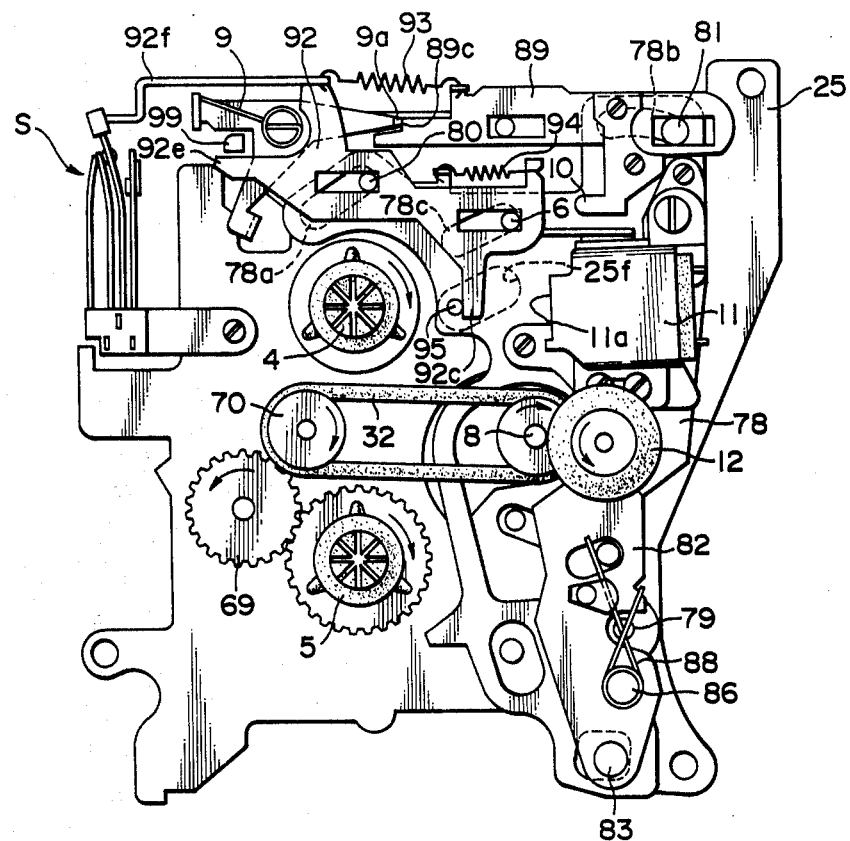

As the support plate 78 rocks, the pin 95 moves to the left, as viewed in FIG. 23, so that the switch operating member 92 which is connected with the support plate 78 through the spring 94 is allowed to follow the movement of the pin 95 with its arm 92c, thus moving to the left under the control guidance of the pins 80, 6. As it moves in this manner, the switch operating piece 92f closes the main switch contact contained in the group of the switches S, whereby the motor 41 is set in motion to energize the tape drive system. Thus, the capstan 8 cooperates with the pinch roller 12 to run the tape, taking up the tape from the tape hub associated with the tape supply shaft 4 to the other tape hub associated with the tape take-up shaft 5, and the tape moves past the active head surface 11a of the magnetic head 11 to perform a playback operation.

When the switch operating member 92 moves to its operative position shown in FIG. 23, the blocking piece 92e moves into a position below the detent post 99, as viewed in FIG. 23, which is fixedly mounted on the record actuating member 98, so that the engagement between the blocking piece 92e and the detent post 99 prevents the depression of the record button 20 and hence the sliding movement of the record actuating member 98 during the playback mode. Since the record button 20 cannot be depressed, the lug detecting member 9 cannot rock, so that if the switch operating member 92 moves, the erase head support plate 89 which is connected therewith through the spring 93 only bears against the first arm 9a of the lug detecting member 9 with its forward step 89c, but is prevented from movement to the left. As a consequence, the erase head 10 cannot be operated.

When the playback button 21 is depressed to the given position, the playback actuating member 100 moves through a given distance to place the tape recorder in a playback mode. When the playback actuating member 100 slides to the given position, the locking projection 109 engages the hook 102a of the locking member 102 when the pin 95 is located against the end 108b of the opening 108, whereby the playback actuating member 100 is locked in its operative position. Specifically, when the playback actuating member 100 has slid to its operative position, the locking member 102, as a result of its head being driven by the locking projection 109, once rocks clockwise about the pivot 121 against the bias applied thereto, and thereafter rocks counter-clockwise under the bias, whereby its hook 102a engages the locking projection 109 to prevent a returning movement of the playback actuating member 100 under the action of the spring 107, thus locking it in its operative position shown in FIG. 22.

B. Recording operation

Figure 24:
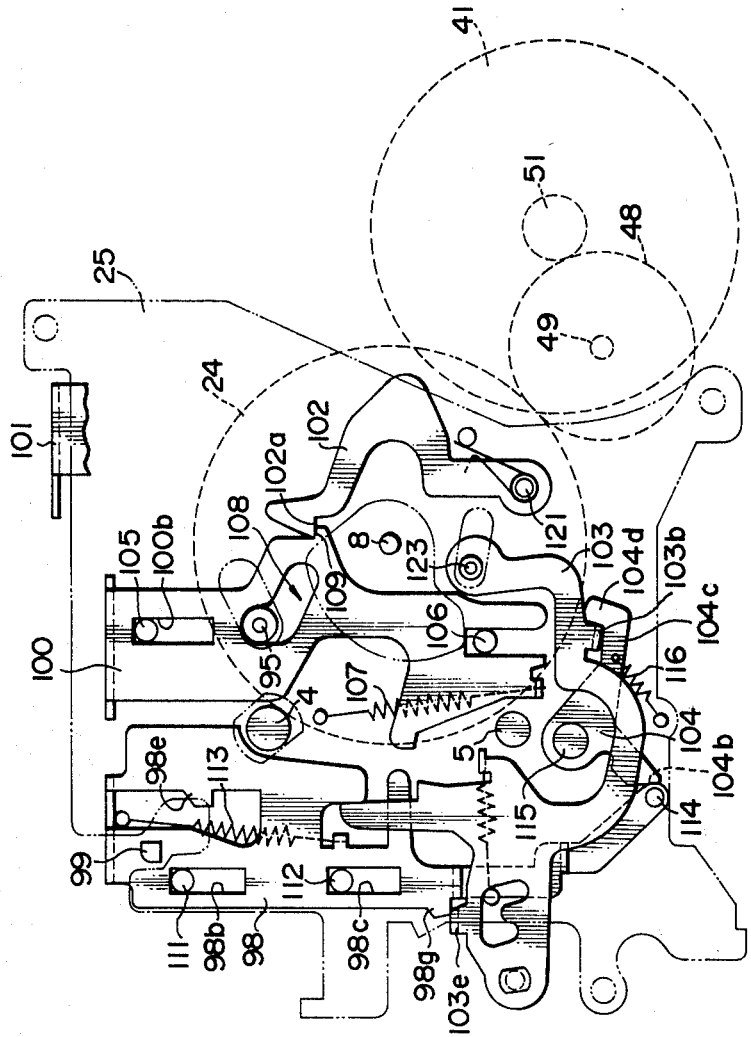
FIGS. 24 and 25 are fragmentary plan views, illustrating the operation of various parts during a record operation.
Figure 25:
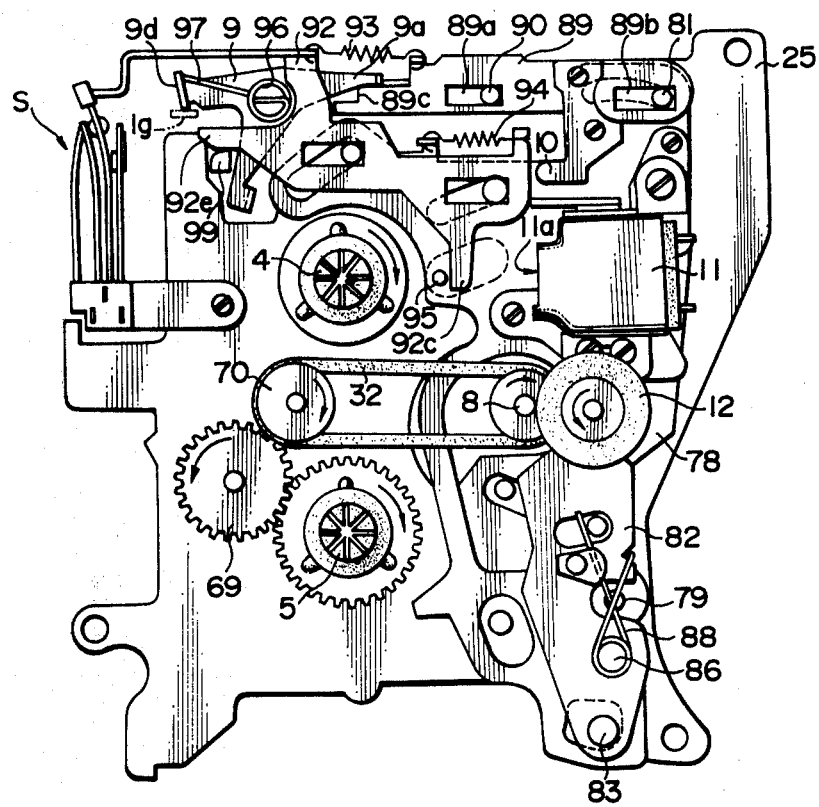
Figure 26:
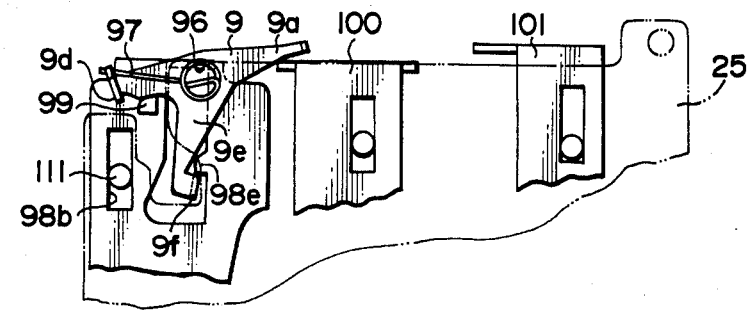
FIG. 26 is a fragmentary view of a detection mechanism which detects the presence or absence of a lug which is provided on the cassette to prevent an inadvertent erasure of a recorded tape.

A recording operation is enabled by loading a microcassette 1 into the cassette receiving station 2a (see FIG. 1) of the tape recorder 2, and then depressing the record and playback buttons 20, 21 either simultaneously or sequentially, with the record button 20 (see FIGS. 2 and 21B) depressed initially. When the record button 20 is depressed, the record actuating member 98 slides inward against the resilience of the return spring 113 while being guided by the pins 111, 112, as illustrated in FIG. 24. As it slides, the detent post 99 fixedly mounted thereon also moves inward, so that the lug detecting member 9 which has been prevented against rocking by the post 99 is freed to rock counter-clockwise about the hollow shaft 96 under the bias applied thereto, as illustrated in FIG. 25. The lug detecting portion 9d becomes effective to detect the presence or absence of the lug 1g (or 1h). As is well known, when a lug which is provided in a tape cassette for preventing an inadvertent erasure of a recorded tape is removed, no recording operation is possible on the tape. Thus, a recording on the cassette tape is only possible when the lug is present. When the lug detecting member 9d bears against the lug 1g to detect its presence, it prevents a further rocking motion of the lug detecting member 9. When the lug detecting member 9 rocks to a position in which the presence of the lug 1g is detected (shown in FIG. 25), the first arm 9a has moved to a position which is retracted from the path of movement of the step 89c of the erase head support plate 89.

The record actuating member 98 can slide to the position shown in FIG. 24 only when the presence of the lug 1g in the cassette 1 is detected. When it slides to this position, the lock pin 114 mounted on its free end bears against the beveled edge 104b of the locking lever 104 to cause it to rotate counter-clockwise about the pivot 115 against the bias applied thereto, whereby the hook end 104d on its other arm 104c engages the folded piece 103b of the FF operating member 103, thus preventing its inward movement. At this time, the projection 98g of the record actuating member 98 engages the depending piece 103e from the FF operating member 103, thus preventing its upward movement, as viewed in FIG. 24. As a consequence, when the record actuating member 98 establishes a record mode, the FF operating member 103 is prevented from movement in any direction. This means that an operation of the FF operating button 18 (see FIG. 1) is disabled during a record mode of the tape recorder in order to avoid an inadvertent rapid advance, rewind, queing or review operation during this mode.

When the record actuating member 98 has moved to its operative position, a record mode of the tape recorder is completed by depressing the playback button 21 to move the playback actuating member 100 to its operative position. When the playback button 21 is depressed either simultaneously or with a certain time delay with respect to the depression of the record button 20, those parts which are associated with the operation of the playback actuating member 100 are operated in the same manner as mentioned above under the paragraph (A), and the respective parts achieve the operative positions shown in FIGS. 24 and 25. Hence, such operation of various parts will not be described specifically, except that the erase head support plate 89 which is connected with the switch operating member 92 through the spring 93 moves to the left, as viewed in FIG. 25, as the switch operating member 92 moves to the left, as viewed in FIG. 25, since the first arm 9a of the lug detecting member 9 is retracted from the path of movement of the step 89, thus bringing the erase head 10 to its operative position for abutment against the tape to erase unwanted signals therefrom.

When the playback actuating member 100 assumes its operative position during a record mode, the detent post 99 moves inward onto the base plate 25 as a result of the sliding movement of the record actuating member 98 to its operative position. Since the blocking piece 92e is located above the detent post 99, as viewed in FIG. 25, as a result of the movement of the switch operating member 92 to the left, when the playback actuating member 100 is rocked in its playback mode position by the locking member 102, returning movement of the member 98 under the action of the return spring 113 is prevented by the engagement of the detent post 99 with the blocking piece 92e. As a consequence, the record actuating member 98 is also locked in its operative position in association with the playback actuating member 100 being locked in its operative position. Thus, the buttons 20, 21 may be released without fear of causing a resetting operation thereof.

The above description deals with a recording operation when the lug 1g is present. When the lug 1g (or 1h) is removed from the tape cassette 1, the depression of the record button 20 is automatically inhibited. An inhibit mechanism which functions in this manner is constituted by the projection 98e formed on the record actuating member 98 and the blocking piece 9f which is formed on the folded free end of the third arm 9e of the lug detecting member 9. When the lug 1g is absent, the lug detecting portion 9d is not engaged by anything, so that the lug detecting member 9 rocks counter-clockwise about the hollow shaft 96 through an increased angle as the record actuating member 98 is moved inward. As it rocks, the blocking piece 9f on its third arm 9e moves into the path of movement of the projection 98e of the record actuating member 98 and engages therewith, thus inhibiting a sliding movement of the record actuating member 98 to its operative position. As a consequence, when the lug is absent, the depression of the record button 20 is automatically inhibited. Damage to the inhibit mechanism is avoided if it is attempted to depress the record button 20 with an increased force, since the members 9, 98 are interrelated to interact with each other.

C. Stop operation

When the tape recorder is in a playback mode or record mode as illustrated in FIGS. 22 and 23 and FIGS. 24 and 25, respectively, such operation can be stopped by depressing the stop button 22 (FIGS. 2 and 21B).

Figure 27:
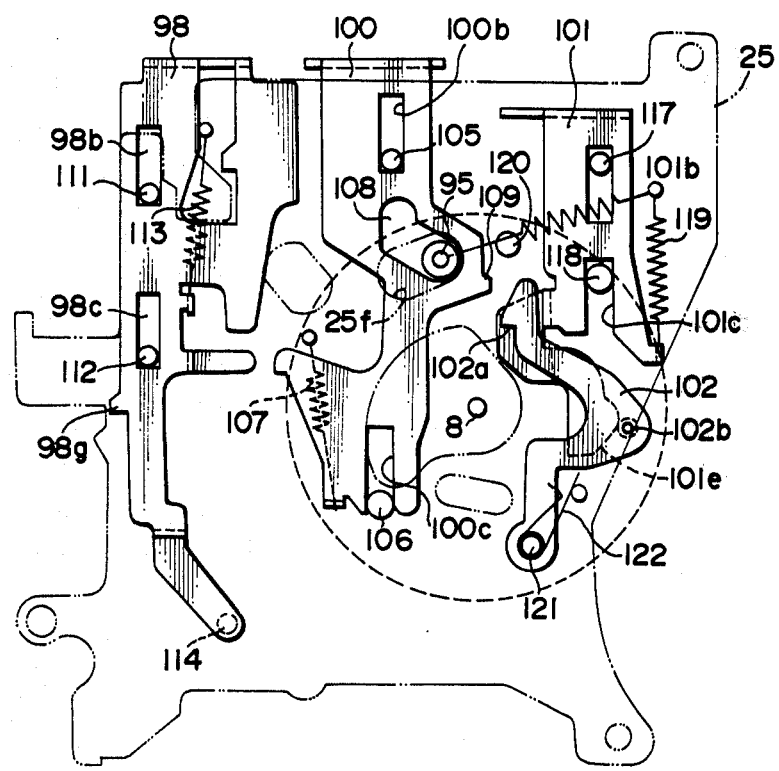
FIG. 27 is a plan view, illustrating the operation of various parts when the operation of the recorder is to be stopped.

When the stop button 22 is depressed, the stop actuating member 101 is guided by the pins 117, 118 to slide inward against the resilience of the return spring 119, as illustrated in FIG. 27. As it slides, the cam edge 101e formed on its free end cams the depending pin 102b extending from the locking member 102 to cause the latter to rock clockwise about the pivot 121 against the bias applied thereto. As it rocks, the hook 102a of the locking member 102 is moved away from the projection 109 of the playback actuating member 100, whereby the playback actuating member 100 which is maintained in its locked position by the engagement between the hook 102a and the projection 109 is unlocked or released. Upon this release, the playback actuating member 100 returns to its initial position under the resilience of return spring 107. As it returns, the inclined portion of the opening 108 causes the pin 95 to be moved from left to right, as viewed in FIG. 27, within the guide slot 25f, so that the head support plate 78 on which the pin 95 is fixedly mounted rotates in the opposite direction about its pivot 79. In addition, the pinch roller support plate 82 and the switch operating member 92 also return to their initial position as the support plate 78 returns to its initial position. Thus, the magnetic head 11 is moved away from the tape and the pinch roller 12 from the capstan 8. The returning movement of the switch operating member 92 opens the main switch to deenergize the motor 41.

When the tape recorder is in its record mode, the returning movement of the switch operating member 92 to its initial position unlocks the engagement between the blocking piece 92e and the detent piece 99, so that the record actuating member 98 is returned to its initial position under the resilience of the return spring 113. When the member 98 returns to its released position, the locking lever 104 also returns to its initial position by following the returning movement of the lock pin 114 under the resilience of the spring 116, whereby the engagement between the projection 98g and the folded piece 103e is released, removing all of the constraints on the FF operating member 103 (see FIGS. 20 and 21B).

In this manner, the depression of the stop button 22 returns the individual actuating members which are in their record or playback mode to their initial positions shown in FIGS. 19 and 20. When the stop button 22 is released, the stop actuating member 101 is returned to its initial position shown in FIG. 20 under the resilience of the return spring 119.

D. Rapid advance, queing, rewind and review operations

These operations are performed by selectively moving the FF operating buttom 18 in various directions.

a. Rapid advance

Figure 28:
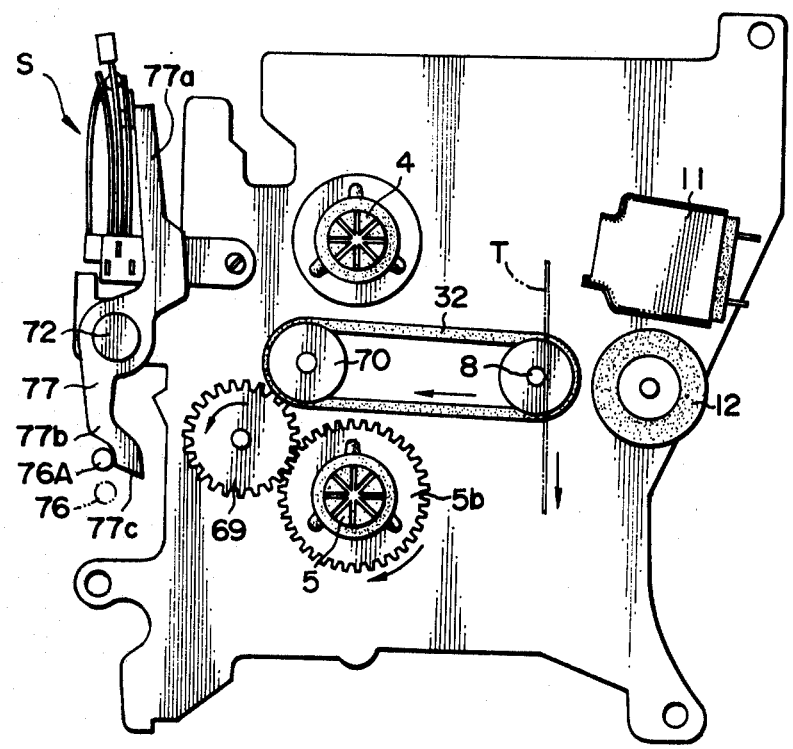
FIGS. 28 and 29 are plan views, illustrating the operation of various parts during a rapid advance of the tape.
Figure 29:
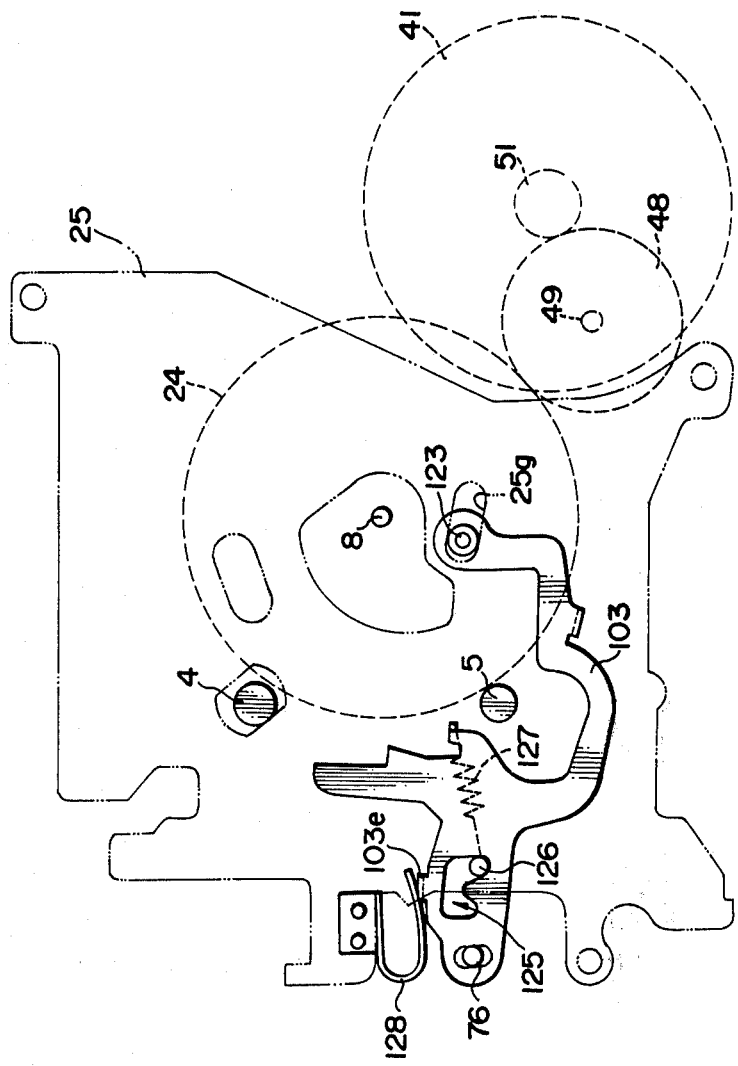

This operation is performed by moving the FF operating button 18 to the left, as viewed in FIG. 1, along the front control panel 2d shown in FIG. 1. As the FF button 18 is moved to the left, the pin 76 fixedly mounted on the FF operating member 103 moves toward the pivot 72 fixedly mounted on the base plate 25, as shown in FIGS. 28 and 29. As indicated in FIG. 29, this movement of the pin 76 takes place by a rocking motion of the operating member 103 about the actuating pin 123. Since the member 103 rocks clockwise about the actuating pin 123 functioning as the pivot during such movement of the pin 76, the stationary pin 126 will be located against the lower end of the right-hand branch of the guide slot 125, as viewed in FIG. 29. During the clockwise rocking motion of the member 103, the folded piece 103e presses against the incurved return spring 128. When the pin 76 is displaced from the position shown in phantom lines to the position 76A shown in solid line (see FIG. 28), the pin bears against the beveled edge 77c formed in the end of the arm 77b of the switching lever 77 to cause it to rock counter-clockwise about the pivot 72, whereupon its arm 77a closes a pair of switch contacts in the group S which is used to energize the motor 41 to rotate at an increased speed. In this manner, the tape drive system comprising the capstan 8, belt 32, pulley 70, and idle gear 69 causes the tape take-up shaft 5 to rotate at an increased speed, whereby the tape hub mounted on the shaft 5 rotates at an increased speed to take up the tape T from the tape hub which is mounted on the tape supply shaft 4.

b. Queing operation

Figure 30:
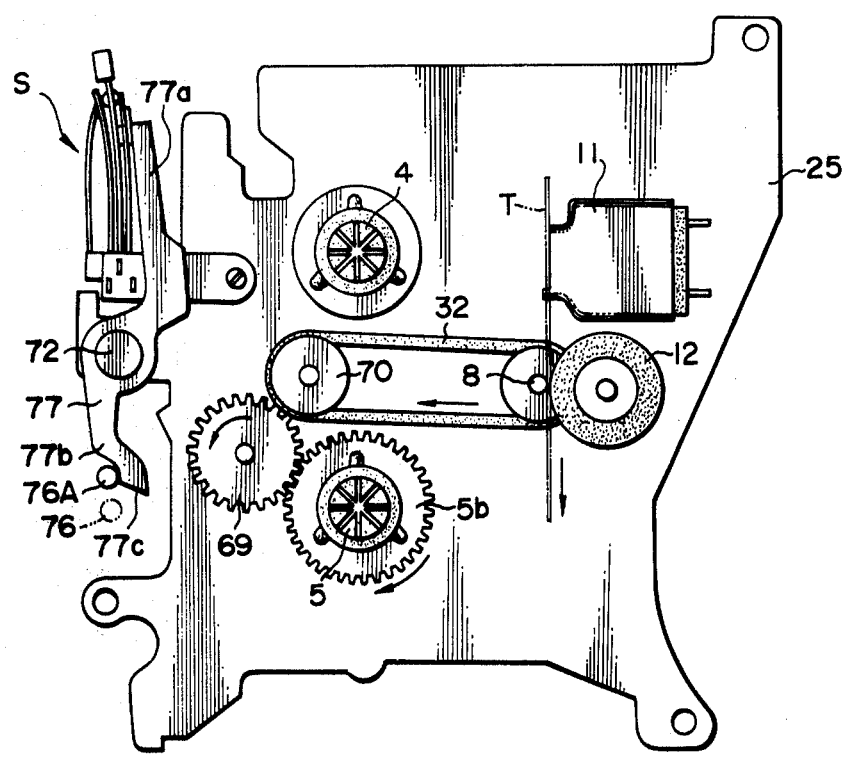
FIG. 30 and 31 are plan views, illustrating the operation of various parts during a queing operation.
Figure 31:
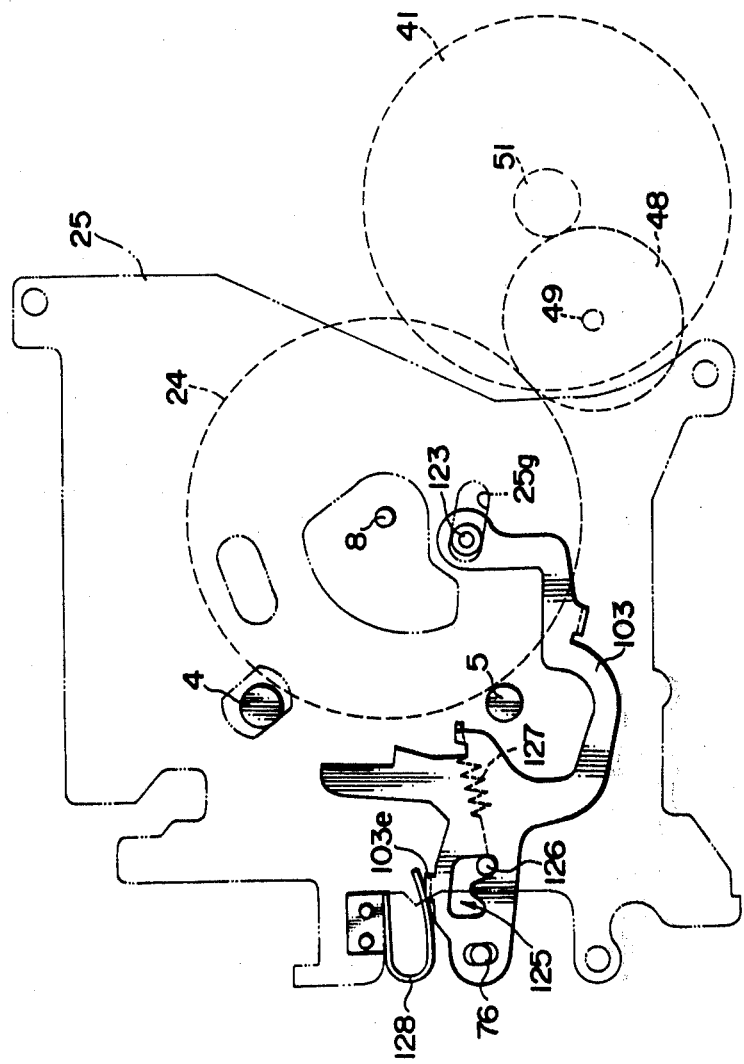

This operation is enabled by initially establishing a playback mode of the tape recorder as described above in connection with FIGS. 22 and 23, and then operating the FF operating button 18 in the similar manner as mentioned under the immediately preceding paragraph (a). Specifically, when the FF operating button 18 is moved to the left, as viewed in FIG. 1, along the front control panel 2d, the FF operating member 103 is rocked clockwise about the actuating pin 123, as shown in FIG. 31, and when the pin 76 is displaced, the switching lever 77 is caused to rock in the counter-clockwise direction as shown in FIG. 30 to close a pair of switch contacts which energize the motor 41 causing it to rotate at an increased speed, thus providing a rapid advance of the tape T. Since the tape T runs while bearing against the head 11, a queing operation is achieved.

c. Tape rewind

The rewind operation is achieved by initially depressing the FF operating button 18 inward into the front control panel 2d and then moving it to the left, as viewed in FIG. 1, along the panel 2d. When the button 18 is depressed, the pin 76 fixedly mounted on the FF operating member 103 (see FIGS. 32 and 33) moves from its position shown in phantom lines to the position 76B shown in solid line (see FIG. 32), whereby the pin 76 presses against the end 75a of the spring 75 associated with the switching member 71 to move it inwardly onto the base plate 25.

Figure 33:
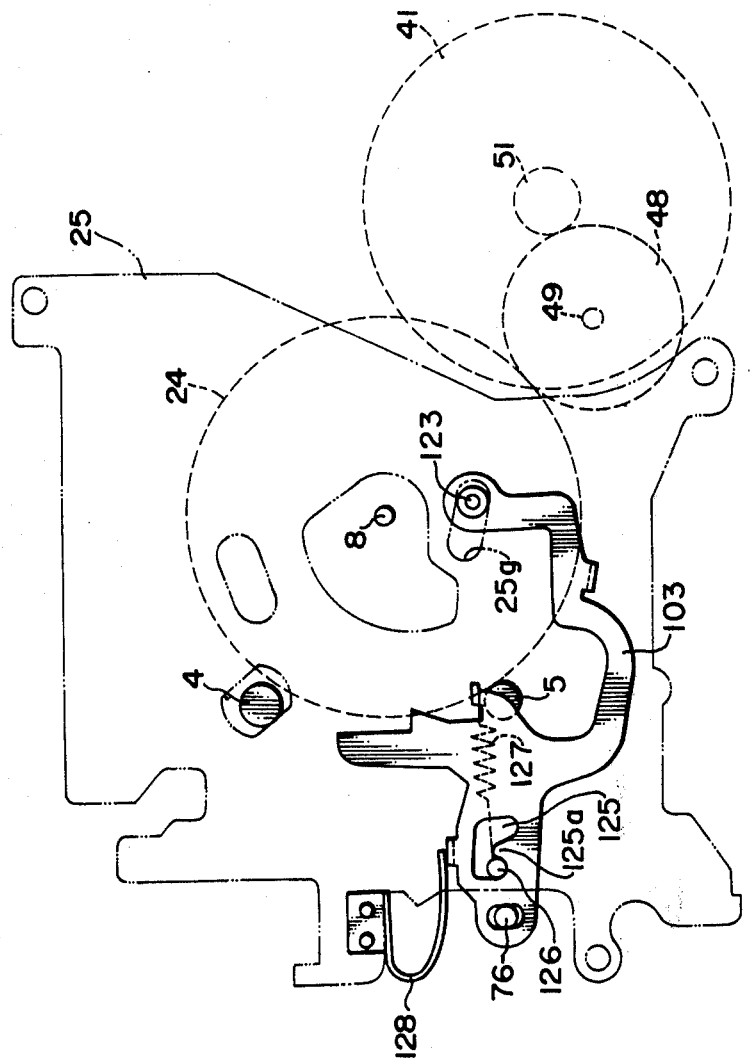

As the pin 76 moves inward in this manner, the FF operating member 103 moves to the right below the base plate 25, as viewed in FIG. 33, so that the actuating pin 123 moves to the right within the guide slot 25g in the base plate 25 until the right-hand end thereof is reached. Subsequently, when the button 18 is moved to the left along the panel 2d, the FF operating member 103 will be rocked clockwise about the actuating pin 123, whereby the stationary pin 126 located within the guide slot 125 will be positioned against the lower end, as viewed in FIG. 33, of the left branch of the guide slot 125. The FF operating member 103 is rocked in its operative position in this manner and maintaines this position if the button 18 is released since the resilience of the tension spring 127 causes the stationary pin 126 to bear against a projection 125a which is formed to extend into the guide slot 125.

Figure 32:
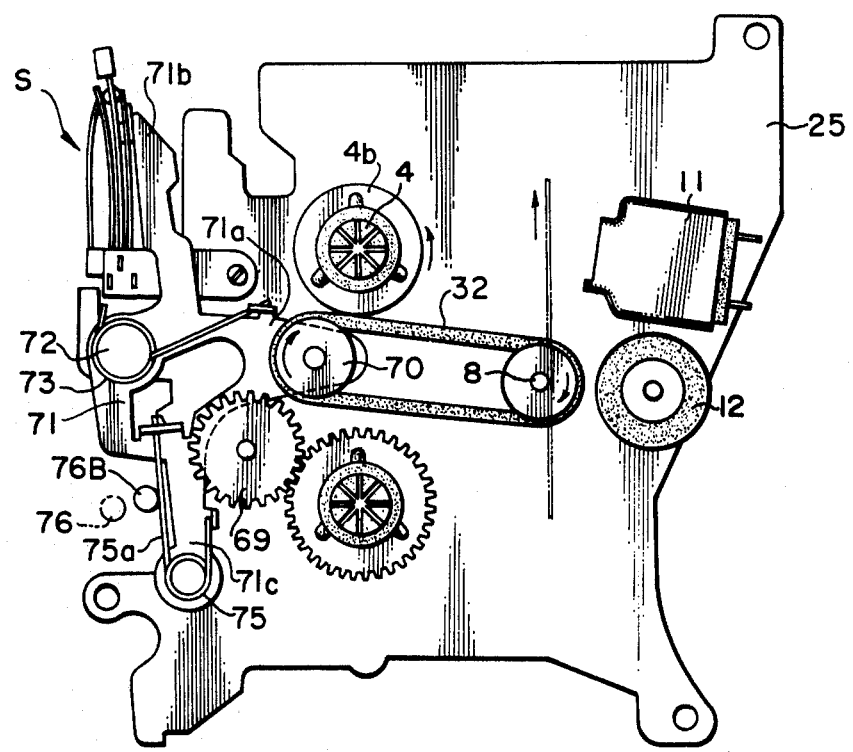
FIGS. 32 and 33 are plan views, illustrating the operation of various parts during a rewind operation.

The switching member 71 rocks counter-clockwise about the pivot 72 against the bias applied thereto, as shown in FIG. 32, since its third arm 71c is urged by the pin 76 through the spring 75a. As it rocks, its second arm 71b closes a pair of switches in the group S which ultimately causes rotation of the motor 41 at an increased speed. Also, when the switching member 71 rocks counter-clockwise, the pulley 70 mounted on the first arm 71a also rocks counter-clockwise about the pivot 72, whereby the belt 32 which is trained over this pulley 70 is moved away from the idle gear 69 and into contact with the drive wheel 4b associated with the tape supply shaft 4. Thus, the tape drive is formed by the capstan 8, belt 32 and the tape drive wheel 4b. Since the idle gear is not included in this drive system, the tape supply shaft 4 will be rotated in the opposite direction from that of its rotation during a tape supplying operation, thus enabling a tape rewind.

d. Review operation

Figure 22:
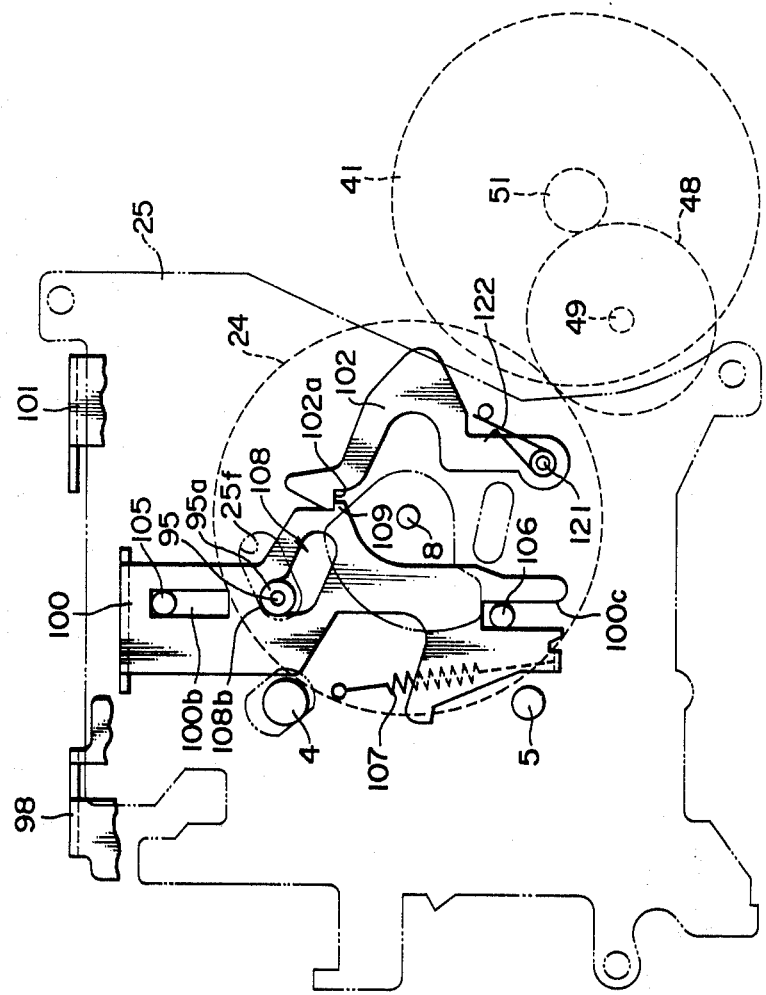
FIGS. 22 and 23 are fragmentary plan views, illustrating the operation of various parts during a playback operation.
Figure 34:
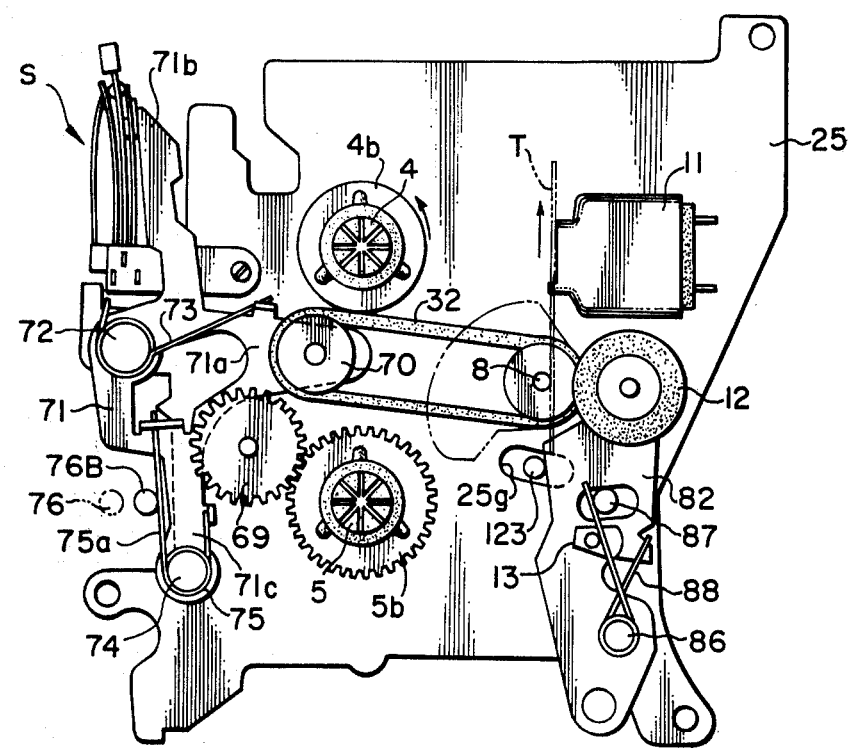
FIGS. 34 and 35 are plan views, illustrating the operation of various parts during a review operation.
Figure 35:
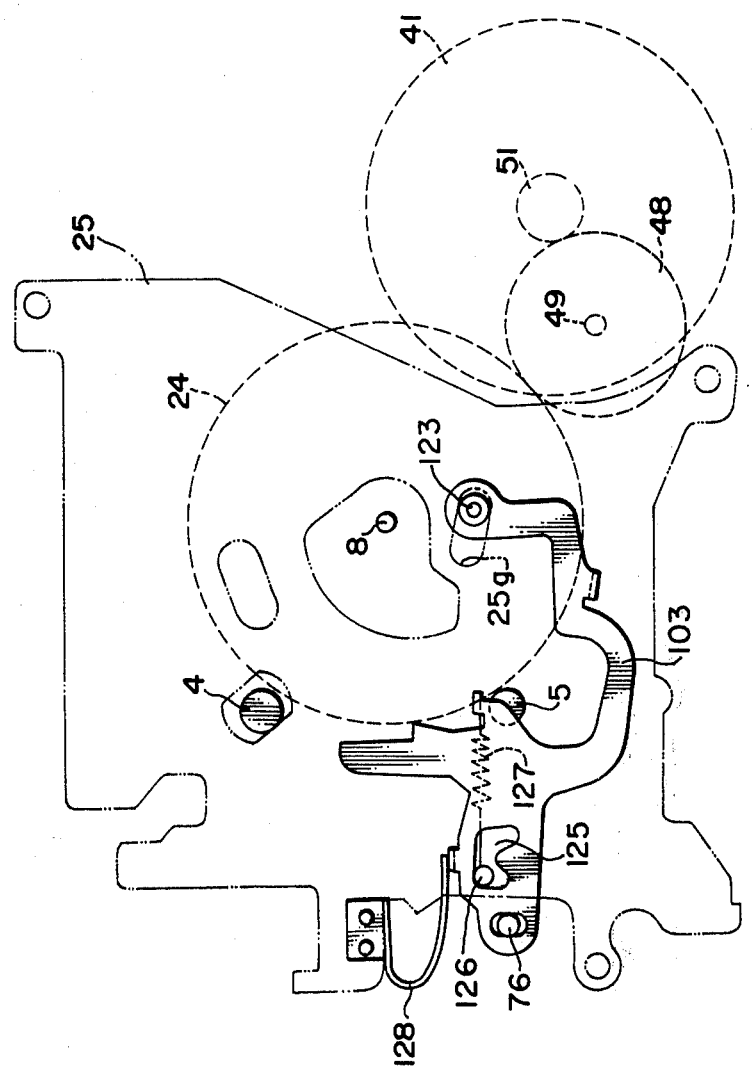

A review operation is established by initially establishing a playback mode of the tape recorder as shown in FIGS. 22 and 23, and then depressing the FF operating button 18 (see FIG. 1). As the button 18 is depressed, the switching member 71 will be rocked counter-clockwise about the pivot 72, as shown in FIGS. 34 and 35, and the FF operating member 103 will move to the right, as viewed in FIG. 35, onto the base plate 25, performing a similar operation to that mentioned above under the paragraph (c). However, in the present instance, since the tape recorder is in its playback mode, the movement of the FF operating member 103 to the right causes the top end of the actuating pin 123 to urge the inside of the support plate 82 for the pinch roller 12 outwardly, whereby the pinch roller support plate 82 is rocked clockwise about the pivot 86 against the bias applied thereto, as shown in FIG. 34, moving the pinch roller 12 away from the capstan 8. As a consequence, the tape T being rewound is engaged only by the head 11, thus enabling a review operation.

Figure 36:
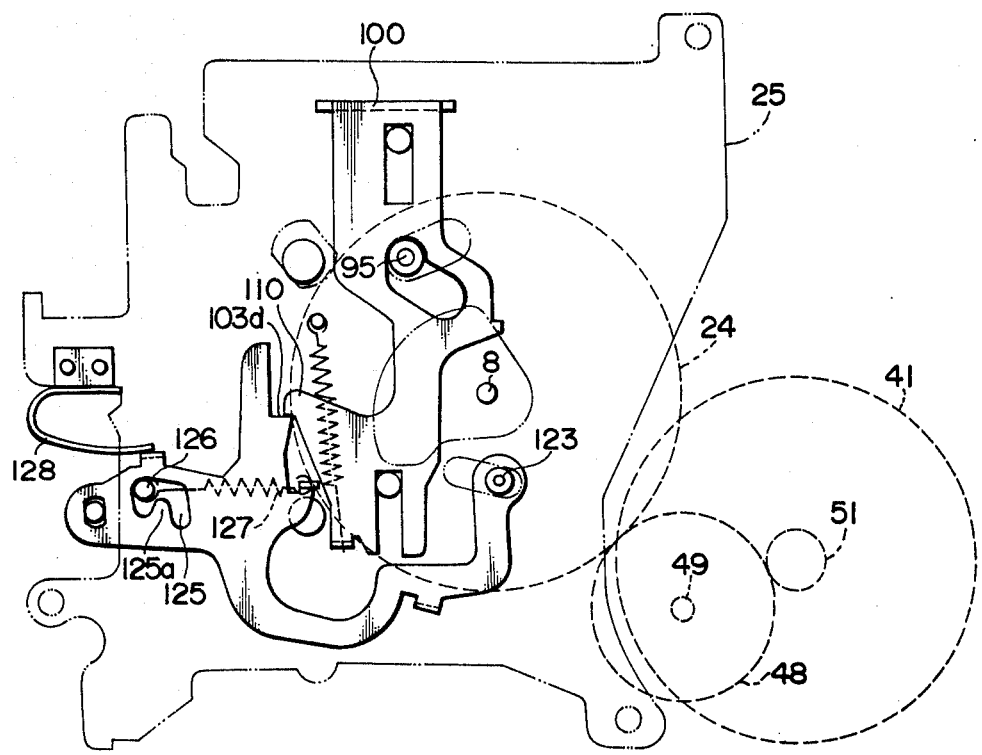
FIG. 36 is a plan view, illustrating the unlocking of the tape rewind by the playback button.

From the foregoing description, it will be appreciated that the rapid advance, queing, rewind and review operation is performed by the operation of the single floating member, namely, the FF operating member 103. It is one of the features of the present tape recorder that the FF operating member 103 which is locked in its operative position during the tape rewind, as mentioned above under the paragraph (c), is unlocked by the depression of the playback button 21. Specifically, in the tape recorder described above, the FF operating member 103 is locked in its operative position as shown in FIGS. 32 and 33 during the tape rewind operation. Though the member 103 can be unlocked by moving the FF operating button 18 (see FIG. 1) to the right, as viewed in FIG. 1, to return the FF operating member 103 under the resilience of the tension spring 127, it can be simply unlocked by the depression of the playback button 21. As indicated in FIG. 36, when the playback button is depressed to slide the playback actuating member 100, the unlocking projection 110 formed on the member 100 engages the step 103d in the FF operating member 103 to cause the member 103 to rock counter-clockwise about the actuating pin 123, whereby the engagement between the projection 125a and the stationary pin 126 is unlocked. Thereupon, the FF operating member 103 is free to return to the left, as viewed in FIG. 36, under the resilience of the spring 127.

4. Automatic stop mechanism

Figure 38:
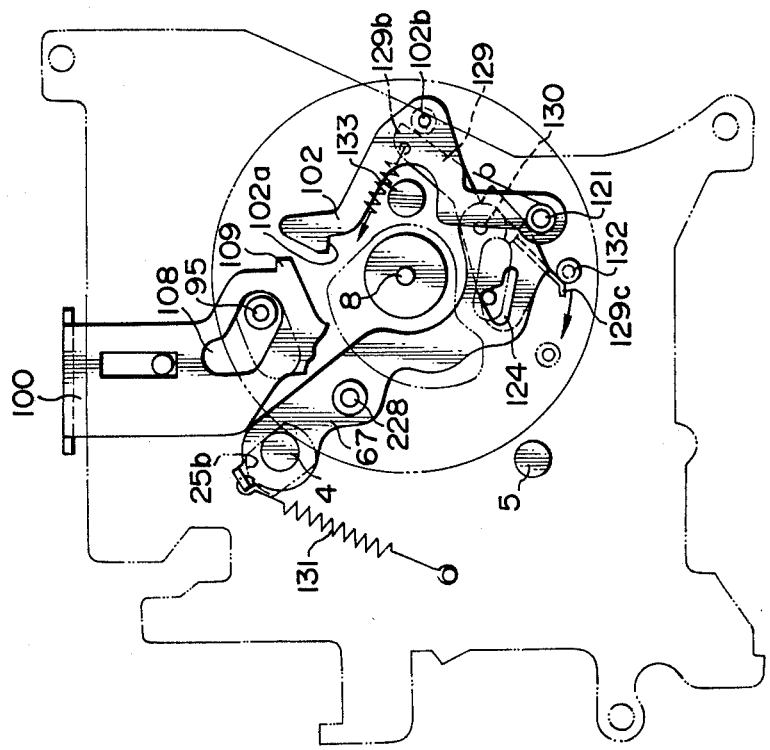
FIGS. 37 and 38 are plan views, illustrating the operation of the automatic stop mechanism according to the invention.
Figure 37:
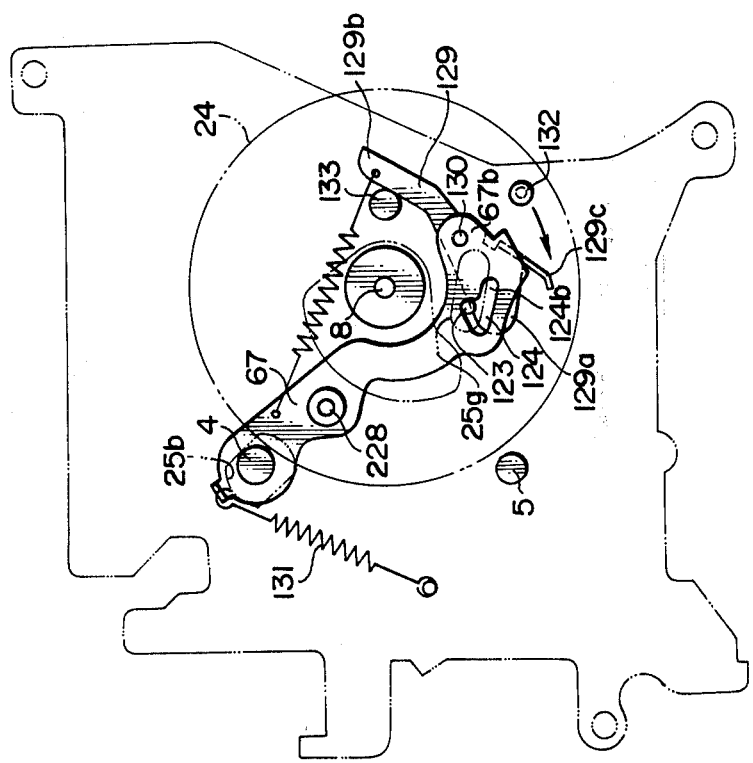

This mechanism automatically stops the operation of the tape recorder by automatically detecting that a tape end is reached during a recording or playback operation. Specifically, when a tape end is reached during a recording or playback operation, the tape hub 1b (see FIG. 1) to which the tape end is secured will be pulled in the direction of the tape feed by the action of the tension in the tape. As the hub 1b is pulled, the tape supply shaft 4 on which it is fitted will be rocked clockwise about the pivot 228 within the opening 25b formed in the base plate 25, as illustrated in FIGS. 37 and 38. As the shaft 4 rocks, the tape end detecting lever 67 will be rocked clockwise about the pivot 228 against the bias applied thereto, whereupon the operation stop member 129 which is pivotally mounted at 130 on the other arm 67b thereof will be rocked counter-clockwise about the pivot 130 while maintaining its arm 129d in abutment against the stop pin 133. As a result, the abutment 129c on the member 129 will move into the path of rotation of the pin 132 which is fixedly mounted on the flywheel 24 (see FIG. 37).

When the flywheel 24 rotates under this condition, which rotation is limited to one revolution at most, the pin 132 will abut against the abutment 129c of the operation stop member 129, and moves the abutment 129c as the pin rotates. Thereupon, the operation stop member 129 is rocked clockwise about the pivot 130 against the bias applied thereto, whereby the unlocking portion 129b formed on its arm 129b will bear against the pin 102b on the locking member 102, causing the member 102 to rock clockwise about the pivot 121 against the bias applied thereto. As the member 102 rocks, the hook 102a thereof is disengaged from the projection 109 on the playback actuating member 100, whereby the member 100 will return to its initial position in the same manner as mentioned above in connection with the stop operation illustrated in FIG. 27. In this manner, the record or playback mode is unlocked to automatically stop the operation of the tape recorder. When the pin 132 bears against the abutment 129c of the operation stop member 129 to cause it to rock clockwise about the pivot 130 to thereby automatically stop the operation of the tape recorder, and moves away from the abutment 129c, the operation stop member 129 will return to its initial position under the action of its own bias.

A miniature cassette tape recorder which includes the automatic stop mechanism as mentioned above may be combined with another electroacoustic instrument, for example, a radio set to interrupt the operation of the radio set when the operation of the tape recorder is stopped, by employing as a power switch thereof a switch which is opened and closed by the automatic stop mechanism as the playback actuating member is operated upon. Such an example will be described below with reference to FIGS. 39 to 49.

Figure 39:
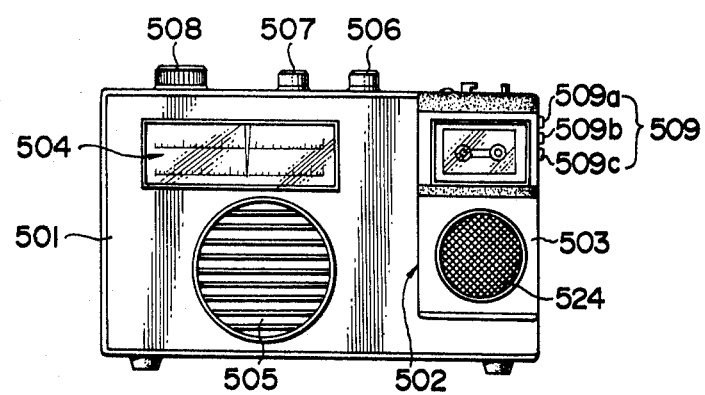
FIG. 39 is a front view of the cassette tape recorder according to the invention as it is coupled with an elctroacoustic instrument which is shown in the form of a radio set.

Referring to FIG. 39, a radio set 501 is shown as being provided with a recess 502 into which a tape recorder 503 is detachably mounted. On its front panel, the radio set 501 includes a turning dial window 504 and a grille 505 for a loudspeaker contained therein. The radio set is shown as having a power switch controlling knob 506, a volume control 507 and a tuning knob 508.

Figure 42:
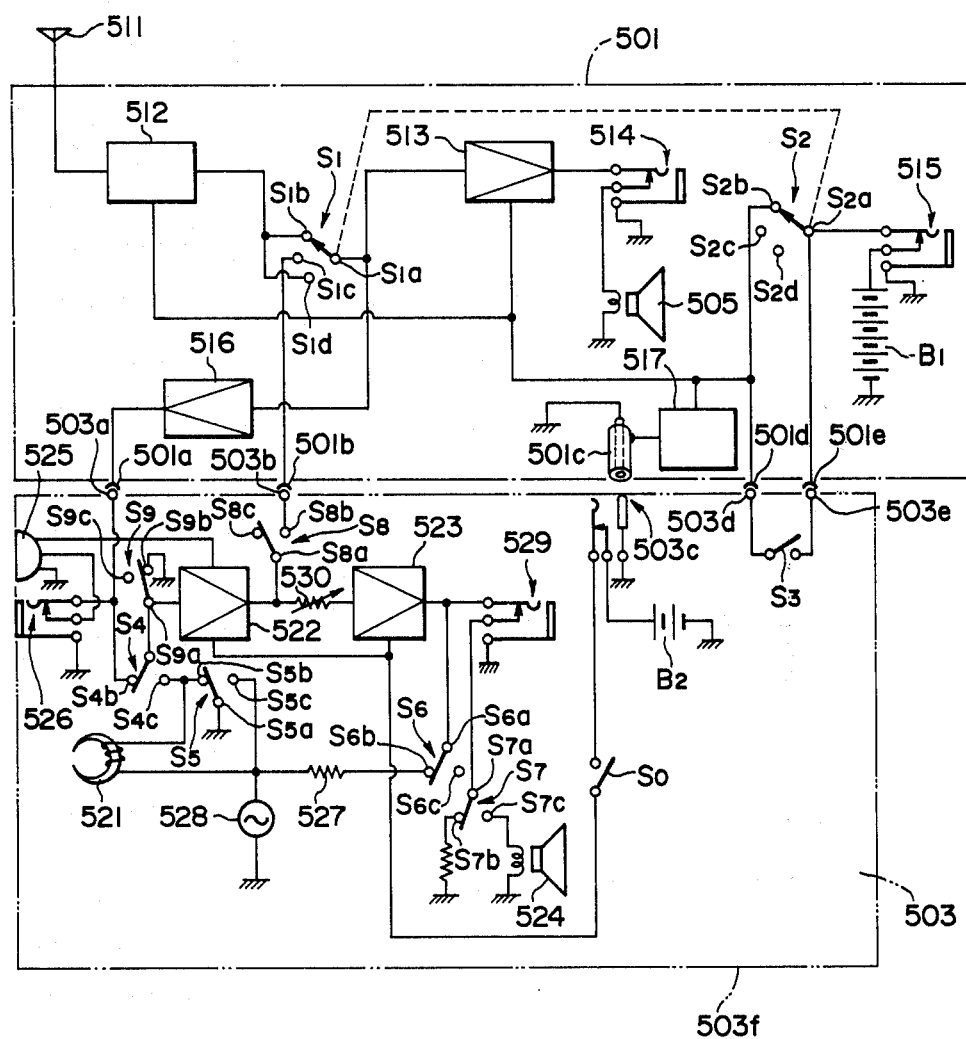
FIG. 42 is a circuit diagram of an exemplary electrical circuit is formed by the radio set and the tape recorder shown in FIG. 39 when they are coupled together; f

The radio set 501 includes an electrical circuit which is schematically shown in FIG. 42. The circuit arrangement is conventional in that a voltage signal intercepted by an antenna 511 is fed to a circuit 512 which includes a tuner, an intermediate frequency amplifier and a detector. The circuit 512 converts a received signal into an audio signal, which is supplied through a switch $S_1$ to an audio amplifier 513, the output of which is connected through an earphone jack 514 with a loudspeaker 505. The radio set 501 is shown as internally housing a power source $B_1$ such as a battery which is connected through a jack 515 and a power switch $S_2$ to feed the various circuits contained therein. The power switch $S_2$ is shown as ganged with the switch $S_1$ and can be operated by the knob 506. When the radio set 501 is used alone, the movable contacts $S_1a$, $S_2a$ of the switches $S_1$, $S_2$ are thrown to stationary contacts $S_1b$, $S_2b$, respectively. When the amplifier 513 contained in the radio set 501 is utilized to amplify the reproduced output from the tape, the movable contacts $S_1a$, $S_2a$ are thrown to stationary contacts $S_1c$, $S_2c$. In this instance, a switch $S_3$ which is operatively associated with the record/playback operating mechanism, to be described later, of the tape recorder 503 is closed, whereby the source $B_1$ feeds both the radio set 501 and the tape recorder 503. When recording a signal intercepted by the radio set 501 or it is mixed with a signal from another source, the movable contacts $S_1a$, $S_2a$ of the switches $S_1$, $S_2$ are thrown to stationary contacts $S_1d$, $S_2d$, respectively. Again the switch $S_3$ is closed so that the power source $B_1$ feeds both the radio set 501 and the tape recorder 503. The tape recorder 503 internally houses its own power source $B_2$, which is disconnected when it is physically coupled with the radio set 501 so as to permit the power source $B_1$ housed within the radio set 501 to feed the tape recorder 503. This is because the power source $B_1$ house within the radio set 501 usually has a greater capacity than the power source $B_2$ contained in the tape recorder 503, and hence it is advisable to utilize the power source $B_1$ when the tape recorder 503 is coupled with the radio set 501.

A plurality of connection terminals 501a to 501e are provided in the recess 502 of the radio set 501 for electrical connection with corresponding parts of the tape recorder 503. These include an output connection terminal 501a for applying part of the signal intercepted by the radio set 501 to a record input terminal 503a of the tape recorder, a connection terminal 501b for applying a reproduced output from the tape recorder 503 to the amplifier 513 of the radio set 501, a connection terminal 501c for connection of the power source $B_1$ in the radio set 501 to the electrical circuit of the tape recorder 503, and a pair of connection terminals 501d, 501e which are connected with the switch $S_3$ internally housed within the tape recorder 503. The electrical connection of these terminals to the circuits of the radio set 501 is as follows: The connection terminal 501a is connected through an amplifier 516 to the input terminal to the amplifier 513. The amplifier 516 functions to amplify and apply the signal intercepted to the record input terminal 503a of the recorder 503, but prevents a passage of a signal from a microphone 525 of the tape recorder 503 when a mixed recording is desired in order to prevent a hauling which might occur if the output from the microphone 525 is applied to and amplified by the amplifier 513 in the radio set 501. The connection terminal 501b is connected with the stationary contact $S_1$ of the switch $S_1$. The connection terminal 501c is formed as a plug, which is connected with the power source $B_1$ of the radio set 501 through a constant voltage circuit 517 and the switch $S_2$. The connection terminal 501d is connected with the stationary contact $S_2b$ of the power switch $S_2$, while the connection terminal 1e is connected with the movable contact $S_2a$ of the power switch $S_2$.

The tape recorder 503 includes a plurality of connection terminals 503a to 503e (see also FIG. 41) which mate with the respective connection terminals 501a to 501e of the radio set 501. It will be readily appreciated that the terminals 503a to 503e mate with and electrically connect with the respective terminals 501a to 501e when the tape recorder 503 is mounted on the mounting recess 502 of the radio set 501.

FIG. 42 also shows an exemplary electrical circuit which forms the tape recorder 503. Specifically, the electrical circuit of the tape recorder 503 is shown in a block indicated in phantom lines, and principally comprises a record/playback head 521 (see FIG. 40), amplifiers 522, 523, a loudspeaker 524 (see FIG. 40), an internally housed microphone 525 (see FIG. 40) and a jack 526 for connection with an external microphone (see FIG. 40). It also includes change-over switches $S_4$ to $S_9$. As shown, the switches $S_4$ to $S_7$ have a respective movable contact $S_4a$ to $S_7a$, which is thrown to one stationary contact $S_4b$ to $S_7b$, respectively, during a recording operation. In this position of the switches $S_4$ to $S_7$, when there is an input signal to be recorded from an external microphone, not shown, which is connected with the jack 526 or from the internal microphone 525, it is applied through the stationary contact $S_4b$ of the switch $S_4$ to the amplifier 522, amplified by the amplifiers 522 and 523 and fed through the stationary contact $S_6b$ of the switch $S_6$ and a series resistor 527 to the magnetic head 521 to be recorded on the magnetic tape. It is to be noted that the head 521 is also supplied with a bias from an oscillator 528 during this recording operation.

During a playback mode, the movable contacts $S_4a$ to $S_7a$ of the switches $S_4$ to $S_7$ are thrown to the other stationary contacts $S_4c$ to $S_7c$, whereby an output signal reproduced from the tape by the magnetic head 521 is applied to the amplifier 522, amplified by the amplifiers 522 and 523 and fed to the loudspeaker 524 through the earphone jack 529. A volume control 530 is shown connected between the amplifiers 522 and 523. Normally, the electric circuit within the tape recorder 503 is fed from the power source $B_2$ through the terminal 503c formed as a jack and through the main switch $S_0$. The switches $S_0$ and $S_3$ are closed as a playback button 509b (see FIGS. 39 and 41) is depressed, and are opened when an auto stop mechanism to be described later is activated. The tape recorder additionally includes a record button 509a, and a stop button 509c.

The electrical connection of the connection terminals 503a to 503e with the internal circuit within the tape recorder will now be described. The connection terminal 503a is connected with an output terminal of the internal microphone 525 and the jack 526. The connection terminal 503b is connected with the output terminal of the amplifier 522 through the change-over switch $S_8$, which when its movable contact $S_8a$ is thrown to its stationary contact $S_8b$, conducts the reproduced output from the tape to the amplifier 513 of the radio set 501 through the switch $S_1$. However, the movable contact $S_8a$ of the switch $S_8$ is normally thrown to its stationary contact $S_8c$. The connection terminals 503d, 503e are connected across the switch $S_3$, which is closed when the playback button 509b is depressed and remains closed during the operation of the tape recorder 503, but is opened by the auto stop mechanism to be described later when the tape running is terminated, thereby eliminating the need for a timer which is usually provided for disabling the operation of the radio set 501. The switch $S_3$ is sometimes referred to as a sleep switch for disconnecting the power source from both the radio set 501 and the tape recorder 503 when the tape running is terminated, thus functioning as a kind of timer. The connection terminal 503c is formed as a jack adapted to mate with the connection terminal 501c of the radio set 501 which is formed as a plug, and when the terminal 503c is connected with the terminal 501c, the internal power source $B_2$ is automatically disconnected.

In the electrical circuit of the tape recorder 503, the movable contact $S_9a$ of the switch $S_9$ is connected with the input terminal of the amplifier 522. As will be described later, the switch $S_9$ is operated as the playback button 509b is depressed, and its movable contact is thrown to the grounded terminal $S_9b$ when the button 509b is not depressed, but is changed to an isolated contact $S_9c$ when the button is depressed. When the playback button 509b is not depressed, the input to the amplifier 522 is short-circuited to the ground through the switch $S_9$ in order to prevent unpleasant noises, which result from a rotation of the motor at an increased speed during a rapid advance or rewind mode, from being picked up by the head 521, amplified by the amplifier 522 and given off by the loudspeaker 505 when the tape recorder is used alone.

Figure 40:
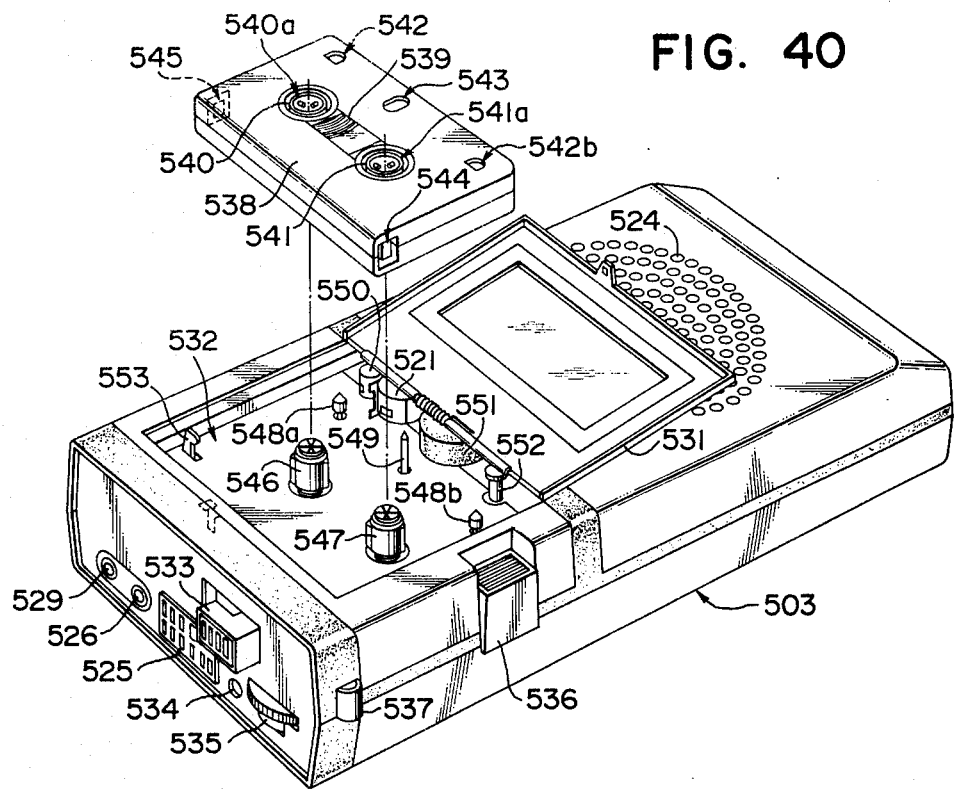
FIG. 40 is a perspective view of only the cassette tape recorder shown in FIG. 39.
Figure 41:
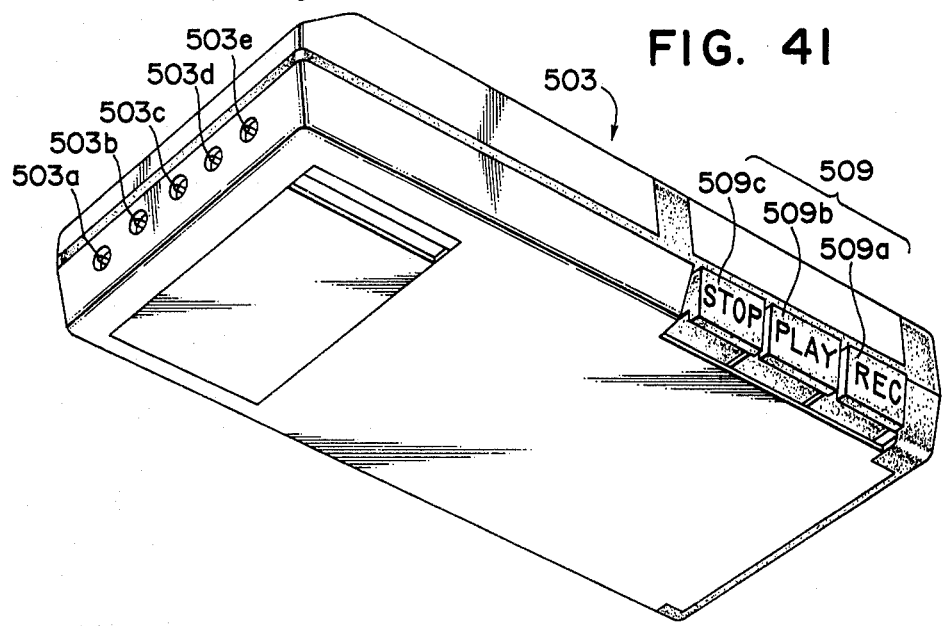
FIG. 41 is a perspective view of the cassette tape recorder shown in FIG. 39, as viewed from the bottom thereof, illustrating the electrical terminals thereon.

The physical construction of the tape recorder 503 according to the invention will now be described. FIGS. 40 and 41 are perspective views, as the tape recorder 503 is viewed from its top and bottom sides. In FIG. 40, the top plate of the tape recorder 503 is formed with a cassette receiving opening 532 which is provided with a movable cover 531, and a loudspeaker grille 524. On its front panel, or on the left-hand end plate thereof, as viewed in FIG. 40, there are arranged the earphone jack 529, the jack 526 for connection with an external microphone, a meshed opening for the internally housed microphone 525, a control knob 533 which is used to control a tape operation such as a rapid advance, rewind, queing and review operation, and a display window 534 which indicates a record operation, as well as a volume control 535. On its right-hand sidewall, as viewed in FIG. 40, the tape recorder 503 is also provided with an ejection knob 536 for opening or closing the cover 531, and a fitting 537 for passing a sling therethrough. On its left-hand sidewall, or on the right-hand sidewall as viewed in FIG. 41, the tape recorder 503 is provided with record button 509a, playback button 509b and stop button 509c. On its rear end plate, or on the left-hand end plate as seen in FIG. 41, the tape recorder is provided with the connection terminals 503a to 503e which are adapted to be connected with the connection terminals 501a to 501e provided on the part of the radio set 501, as mentioned previously.

Returning to FIG. 40, a tape cassette 538 is adapted to be loaded into the cassette receiving chamber defined by the window 532 in the tape recorder 503. The cassette 538 internally houses a pair of tape hubs 540, 541 on which a magnetic tape 539 is disposed. These tape hubs have axial bores 540a, 541a which are exposed through both the top and bottom surfaces of the cassette casing. Adjacent to its one end, which is away from the front end plate of the tape recorder, as viewed in FIG. 40, the cassette 538 is formed with a pair of positioning apertures 542a, 542b adjacent to its lateral sides, as well as a capstan aperture 543 which is centrally located. These apertures extend through the both the upper and lower side plates of the cassette casing. The cassette 538 is provided with a pair of lugs 544, 545 in its lateral sidewalls adjacent to its front end, these lugs being provided so that they prevent a subsequent recording operation on the tape contained therein when either one of them is removed.

Provided in the bottom of the cassette receiving chamber defined by the window 532 are a tape supply shaft 546 and a tape take-up shaft 547 which engage and drive the tape hubs 540, 541 of the cassette 538, as well as a pair of pins 548a, 548b for fitting engagement with the positioning apertures 542a, 542b and a capstan 549 which fits in the capstan aperture 543. Disposed adjacent to the rearward end of the cassette receiving chamber, or toward the right-hand end thereof, as viewed in FIG. 40, are an erase head 550, the magnetic head 521 mentioned above, a pinch roller 551 which is adapted to cooperate with the capstan 549, and a tape guide pin 552 respectively arranged in the sequence named, from left to right. In addition, a lug detecting lever 553 is located within the cassette receiving chamber at a position such that it cooperates with one of the lugs when the cassette 538 is loaded into the cassette receiving chamber.

Figure 43:
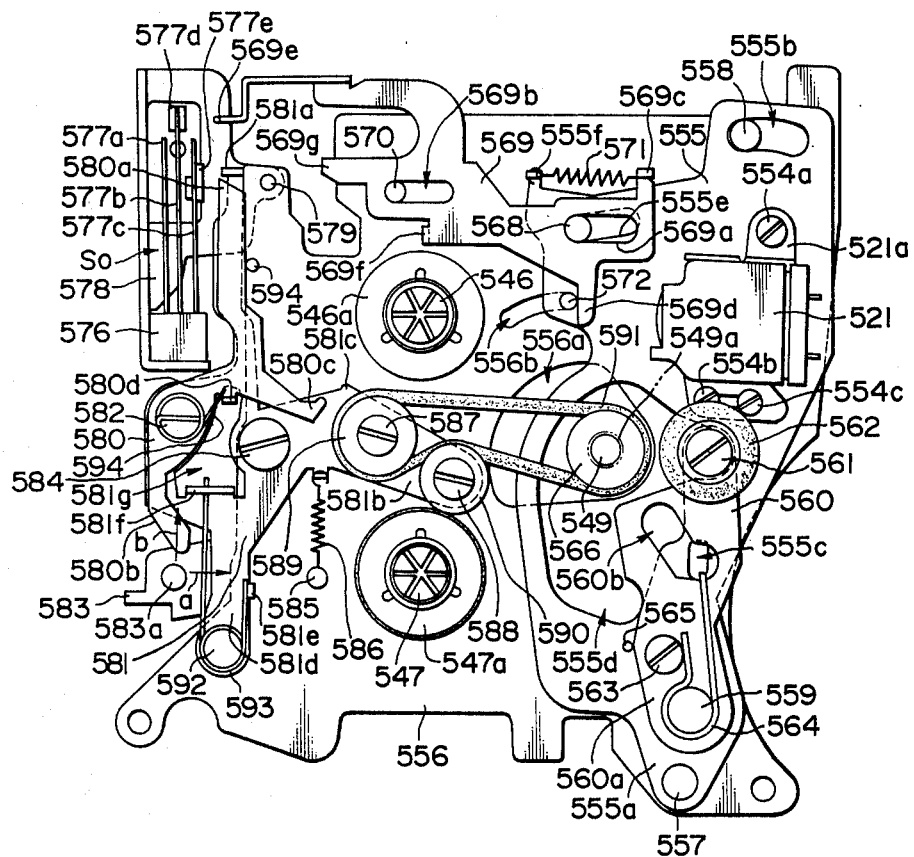
FIG. 43 is a plan view, illustrating various components disposed on the stationary base plate of the cassette tape recorder shown in FIG. 39.
Figure 48:
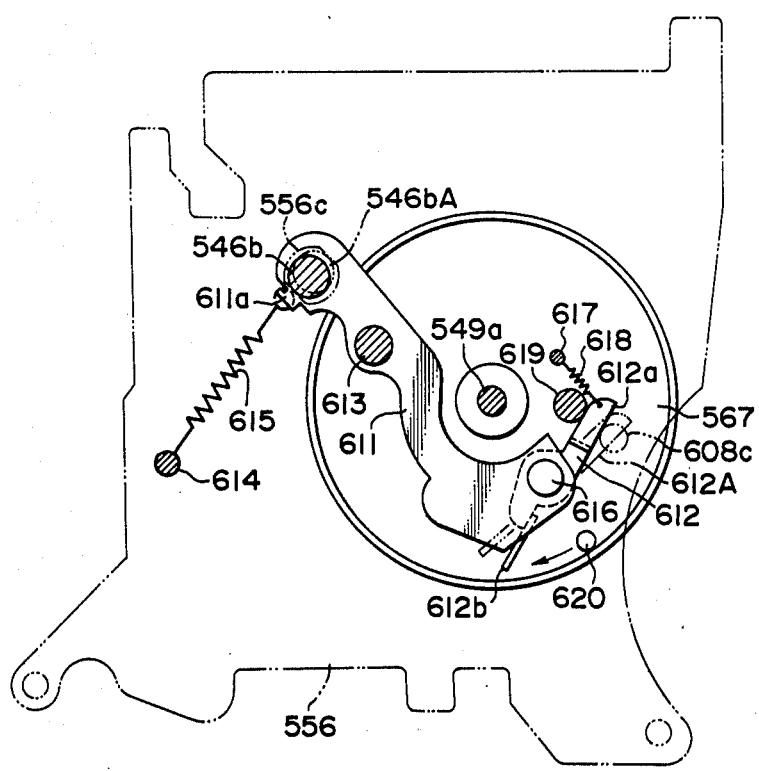

Referring to FIG. 43, the magnetic head 521 is secured to a mounting member 521a which is in turn mounted on a magnetic head support lever 555 by means of three set screws 554a, 554b, 554c. The support lever 555 has its one end 555a pivotally mounted on a pivot 557 which is fixedly mounted on a base plate 556. At its free end, it is formed with an arcuate slot 555b which is centered about the pivot 557 and which is engaged by a pin 558 fixedly mounted on the base plate 556. Fixedly mounted on the end 555a of the support lever 555 is a stud 559 on which one end 560a of a pinch roller support lever 560 is pivotally mounted. The lever 560 has a shaft 561 fixedly mounted on its free end, which shaft rotatably carries a pinch roller 562. The lever 560 is centrally formed with a slot 560b for exposing an opening 555c formed in the support lever 555. A set screw 563 is fixedly mounted on the end 560a of the lever 560, and a torsion spring 564 is disposed on the stud 559 and has its one end bearing against the set screw 563 and its other end engaged with the edge of the slot 555c. In this manner, the torsion spring 564 urges the support lever 560 to rock counter-clockwise about the stud 559 for resiliently connecting it with the support lever 555. The extent of angular movement of the lever 560 is constrained by a stop pin 565 which is fixedly mounted on the lever 555. The pinch roller 562 is located in opposing relationship with the capstan 549, which is pivotally mounted, as shown at 549a, integrally with a pulley 566 on a support plate, not shown. The pivot 549a extends through a slot 555d formed centrally in the support lever 555 and through a slot 556a formed centrally in the base plate 556 to the underside of the latter, where it has a flywheel 567 fixedly mounted thereon, as illustrated in FIG. 48. The flywheel 567 is operatively connected with a motor, not shown, through a drive system, also not shown.

In FIG. 43, the head support lever 555 has a left-hand extension in which an arcuate slot 555e centered about the pivot 557 is formed and is engaged by a pin 558 which is fixedly mounted on the base plate 556. The pin 568 slidably engages an elongate slot 569a formed in the rear end, or in the right-hand portion, as viewed in this Figure, of a switch pressure plate 569, and is also formed with another elongate slot 569b in its forward portion which extends in the same direction as the slot 569a and which is engaged by a pin 570 fixedly mounted on the base plate 556, whereby the switch pressure plate 569 is slidable in the horizontal direction or to the right or left, as viewed in this Figure. At its rear end, the switch pressure plate 569 is provided with a projection 569c, which is engaged by one end of a coiled spring 571, the other end of which engages a projection 555f extending from the left-hand extension of the support lever 555, whereby the plate 569 and the lever 555 are resiliently connected together. At its rear end, the plate 569 is also formed with a projection 569d, which bears against a pin 572 fixedly mounted on the lever 555, under the resilience of the coiled spring 571. The pin 572 extends through the arcuate slot 556b and through a slot 573a formed in a playback actuating member 573 (see FIG. 44) which is mounted on the underside of the base plate 556, and is engaged by one end of a coiled spring 575, the other end of which is secured to a pin 574 fixedly mounted on the underside of the base plate 556, thus urging the support lever 555 to rock clockwise about the pivot 557, as viewed in FIG. 43.

In FIG. 43, the forward end of the switch pressure plate 569 is provided with an engaging portion 569e which is formed by bending from the plane thereof and which is located opposite to the main switch $S_0$ fixedly mounted in the upper left-hand corner of the base plate 556. Specifically, the main switch $S_0$ comprises a resilient stationary blade 577a, a resilient movable blade 577b having an increased length and a resilient movable blade 577a of a reduced length, all disposed from left to right in the sequence named and secured to an insulating support plate 576, which is fixedly attached to a mounting member 578, which is in turn secured to the base plate 556 by a set screw 579. The movable blades 577b, 577c are each provided with an insulating pad 577d, 577e, respectively. The engaging portion 569e of the switch pressure plate 569 is located opposite to the pad 577d.

Disposed in opposing relationship with the pad 577e on the movable blade 577c of the main switch $S_0$ are an engaging portion 580a of a rapid advance lever 580 and an engaging portion 581a of a rewind lever 581. The rapid advance lever 580 is pivotally mounted on a stud 582 which is fixedly mounted centrally on the rewind lever 581, and is formed with an abutment 580b at its other end, which is located opposite to a pressure pin 583a fixedly mounted on a tape running control lever 583. The tape running control button 533 (see FIG. 40) is secured to the left-hand end of the lever 583, and when the button 533 is operated, the lever 583 can be displaced in the directions indicated by arrows a and b from the reference position shown in FIG. 43.

The rewind lever 581 is pivotally mounted on a stud 584 which is fixedly mounted on the base plate 556, and is urged to rotate clockwise about the stud 584, by a coiled spring 586 which extends between a portion thereof to the right of the stud 584 and a pin 585 fixedly mounted on the base plate 556. The lever 581 includes a rightwardly extending arm 581b which fixedly carries a pair of spaced shafts 587, 588, on which a pair of pulleys 589, 590 are rotatably mounted. An endless belt 591 extends around the pulley 589 and the pulley 566 associated with the capstan 549, and the pulley 590 bears against the belt 591 from the outside thereof. The tape supply shaft 546 and the tape take-up shaft 547 are rotatably mounted in the central portion of the base plate 556, as spaced apart vertically, and are operatively associated with driven wheels 546a, 547a, respectively. In the position shown in FIG. 43, the pulley 590 is maintained in abutment against the driven wheel 547a associated with the tape take-up shaft 547 under the resilience of the coiled spring 586. A shaft 546b which rotatably carries the driven wheel 546a is fixedly mounted on a tape end detecting lever 611 shown in FIG. 44, while a shaft, not shown, which rotatably carries the driven wheel 547a, is mounted on the base plate 556.

The rapid advance lever 580, rewind lever 581 and switch pressure plate 569 are each provided with a braking release arm 580c, a braking release projection 581c and a braking release arm 569f, respectively, which function to disengage a braking member, not shown, which engages the tape supply shaft 546 during the tape running. The switch pressure plate 569 has a leftwardly extending arm 569g which functions to lock the record button 509a (see FIG. 41) when it is depressed. The rewind lever 581 includes an arm 581d which extends leftwardly and downwardly, as viewed in FIG. 43, and which is provided with a stud 592 on which a torsion spring 593 is disposed. The spring 593 has its one end engaged with a tab 581e folded from the plane of the arm 581d and its other end engaged with a tab 581ff which is also folded from the plane of the lever 581 in the left-hand portion thereof. The torsion spring 593 serves to buffering the pressure exerted by the pin 583a on the tape running control lever 583 as it is depressed in the direction of the arrow a. The rewind lever 581 is formed with a slot 581g from which the tab 581f is formed. In the region opposite to the tab 581f and the slot 581g, the rapid advance lever 581 is provided with a tab 580d which is folded from the plane thereof and which is engaged by one end of a torsion spring 594 disposed on the stud 582. The other end of the spring 594 is secured to the left-hand end of the rewind lever 581, which is thus urged to rotate clockwise about the stud 582. The extent of its rotation is limited by the abutment of the engaging portion 580a against a stop 594 which is fixedly mounted on the base plate 556.

Figure 44:
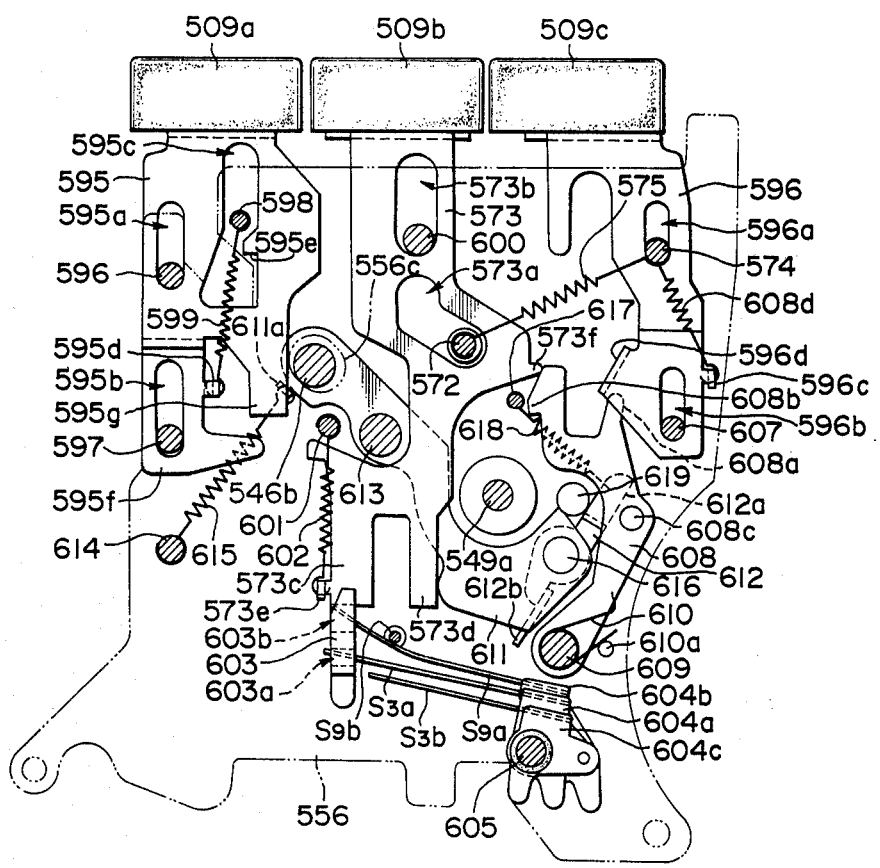
FIG. 44 is a plan view of various components disposed on the underside of the stationary base plate on the tape recorder shown in FIG. 39, as viewed through the base plate.

FIG. 44 shows various members and parts which are mounted on the underside of the base plate 556, as viewed therethrough. In this Figure, the record button 509a, playback button 509b and stop button 509c are fixed to the top end of a record actuating member 595, playback actuating member 573 and stop actuating member 596, respectively. The record actuating member 595 is formed with a pair of spaced, vertically extending elongate slots 595a, 595b, which are engaged by pins 596, 597, respectively, fixedly mounted on the base plate 556, thus supporting the member 595 in a slidable manner. The record actuating member 595 is also formed with another elongate slot 595c, which is engaged by a pin 598 fixedly mounted on the base plate 556. A coiled spring 599 extends between the pin 598 and a tab 595d folded from the lower portion thereof to urge the member 595 to slide in the upward direction. A detent projection 595e is formed on the right-hand edge of the elongate slot 595c for cooperation with a control mechanism, not shown, which is associated with the lug detecting lever 553 (see FIG. 40) to determine and whether the button 509a may be allowed to be depressed or should be prevented from being depressed. At its lower end, the record actuating member 595 is formed with a pair of spaced actuating arms 595f, 595g, which when the button 509a is depressed together with the playback button 509b, operate on an actuating mechanism and switches, not shown, to permit a recording operation and to activate the erase head 550 (see FIG. 40).

The playback actuating member 573 is formed with an elongate slot 573a which initially extends vertically and then in an oblique direction toward the right-hand side, and is also formed with a vertically extending elongate slot 573b. The slot 573a is engaged by a pin 572 which is mounted on the head support lever 555 while the slot 573b is engaged by a pin 600 fixedly mounted on the base plate 556, thus supporting the member 573 in a slidable manner. At its lower end, the playback actuating member 573 is formed with a pair of arms 573c, 573d, and a coiled spring 602 extends between a tab 573e folded from the left-hand side of the arm 573c and a pin 601 fixedly mounted on the base plate 556, thus urging the member 573 to slide in the upward direction.

Figure 45:
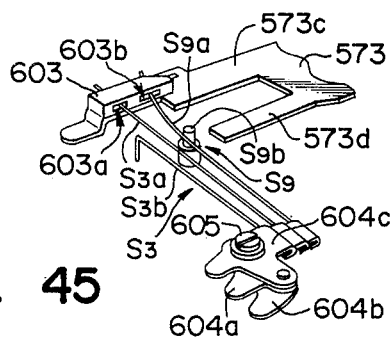
FIG. 45 is a perspective view of a switch shown in FIG. 44.

As indicated in FIG. 45, an insulating member 603 having a pair of slots 603a, 603b formed therein is secured to the end of the arm 573c, and the resilient movable blade $S_3a$ of the switch $S_3$ and the resilient movable blade $S_9a$ of the switch $S_9$ (see FIG. 42) are fitted into these slots 603a, 603b, respectively. These blades $S_3a$, $S_9a$ a as well as the resilient stationary blade $S_3b$ of the switch $S_3$ are secured to mounting members 604a, 604b, 604c, which are secured to the base plate 556 by means of a set screw 605, with insulating washers interposed therebetween. In the position shown in FIG. 44 in which the playback button 509b is not depressed, the blade $S_9a$ of the switch $S_9$ is in contact with the terminal $S_9b$ which is formed by a grounded pin fixedly mounted on the base plate 556, thus connecting the input terminal of the amplifier 522 (see FIG. 42) to the ground as mentioned previously. The blades $S_3a$, $S_3b$ of the switch $S_3$ are spaced apart in the position shown in FIG. 44, and therefore the switch $S_3$ is open.

Referring to FIG. 44, the stop actuating member 596 is formed with a pair of spaced, vertically extending elongate slots 596a, 596b, which are engaged by the pin 574 and another pin 607, both fixedly mounted on the base plate 556, thus supporting the member 596 in a slidable manner. On its right-hand edge, the lower portion of the member 596 is provided with a tab 596c which is folded from the plane thereof, and a coiled spring 608d extends between the tab 596c and the pin 574, thus urging the member 596 to slide in the upward direction. On its left-hand edge, the lower portion of the member 596 is provided with an abutment 596d which is also formed by folding from the plane thereof. A detent lever 608 has an engaging portion 608a disposed in opposing relationship with the abutment 596d. The detent lever 608 is pivotally mounted on a stud 609 fixedly mounted on the base plate 556, and a torsion spring 610 is disposed on the stud 609 and has its one end engaged with the detent lever 608 and its other end engaged with a pin 610a fixedly mounted on the base plate 556, thus urging the lever 608 to rock counter-clockwise about the stud 609. At its free end, the detent lever 608 is formed with a detent portion 608b, which is located in opposing relationship with a projection 573f formed on the right-hand edge of the playback actuating member 573. Centrally, the detent lever 608 has a pin 608c fixedly mounted thereon which bears against an engaging portion 612a (see FIG. 48) of an operating piece 612 of a tape end detecting lever 611.

Referring to FIG. 48, the tape end detecting lever 611 is pivotally mounted on a stud 613 which is fixedly mounted on the base plate 556. The lower end of the shaft 546b which rotatably carries the driven wheel 546a associated with the tape supply shaft 546 and extending through a slot 556c formed in the base plate 556 is secured to the left-hand end of the lever 611, as viewed in FIG. 48. A coiled spring 615 extends between a tab 611a foled from the plane of the lever 611 adjacent to this end and a pin 614 fixedly mounted on the base plate 556, and urges the lever 611 to rotate counter-clockwise about the stud 613. In this manner, the shaft 546b is maintained in abutment against the left-hand, lower edge of the opening 556c. At its other end, the lever 611 has a stud 616 fixedly mounted thereon which rotatably carries the operating piece 612, the engaging portion 612a of which is maintained in abutment against a pin 619 fixedly mounted on the base plate 556, under the action of a coiled spring 618 which extends between the engaging portion 612a and a pin 617 fixedly mounted on the base plate 556. The other end of the operating piece 612 is formed with another engaging portion 612b, which is located on the path of rotation of a pin 620 fixedly mounted on the flywheel 567 adjacent to the periphery thereof. It is to be noted that the flywheel 567 is located below the tape end detecting lever 611, as viewed through the base plate 556.

The mechanical operation of the tape recorder 503 will now be described assuming that the playback button 509b is depressed. Since the record 509a is depressed together with the playback button 509b to enable a recording operation, the operation occurring when it is depressed will be similar to that which occurs when only the playback button 509b is depressed, and hence will not be described. FIGS. 40 to 45 show the inoperative condition of the tape recorder 503. When the tape cassette 538 is loaded into the cassette receiving chamber defined by the window 532 under this condition, and the playback button 509b depressed, the playback actuating member 573 is moved downward against the resilience of the coiled spring 602, whereby its detent portion 573f will be locked by the detent portion 608b of the detent lever 608. Under this condition, the movable blade $S_9a$ of the switch $S_9$ is moved away from the stationary terminal $S_9b$ to disconnect the connection of the amplifier 522 (see FIG. 42) with the ground. The movable blade $S_3a$ of the switch $S_3$ is moved into contact with the stationary blade $S_3b$ to close it, whereby the electrical power circuit of the ratio set 501 is completed.

Figure 46:
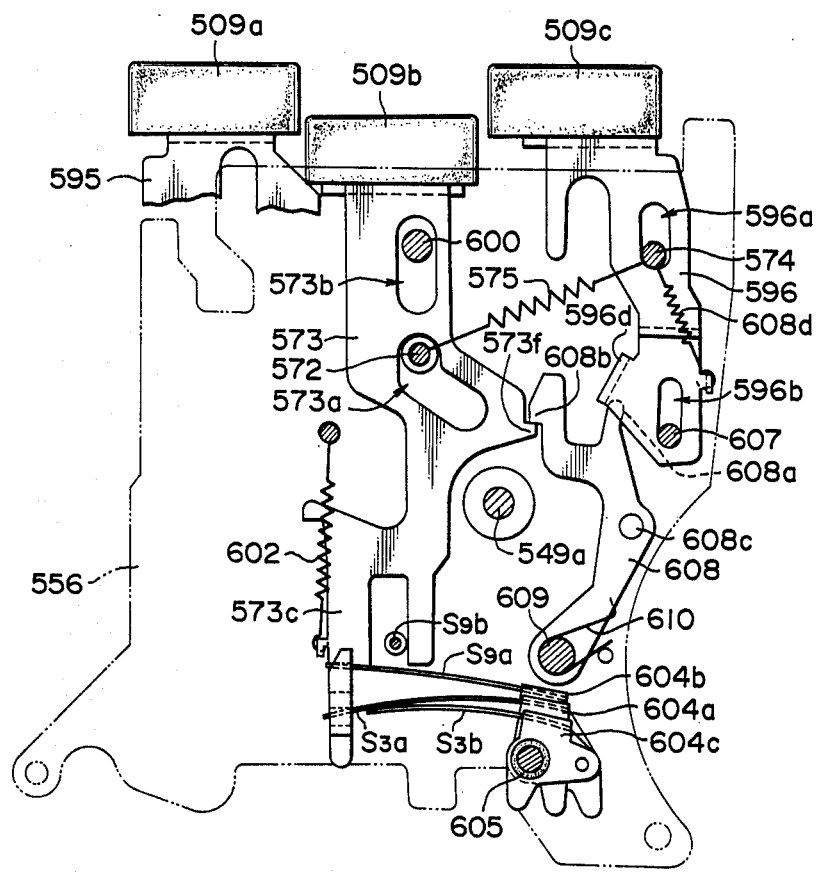
FIGS. 46 to 49 are plan views, illustrating the operation of components shown in FIGS. 43 and 44.
Figure 47:
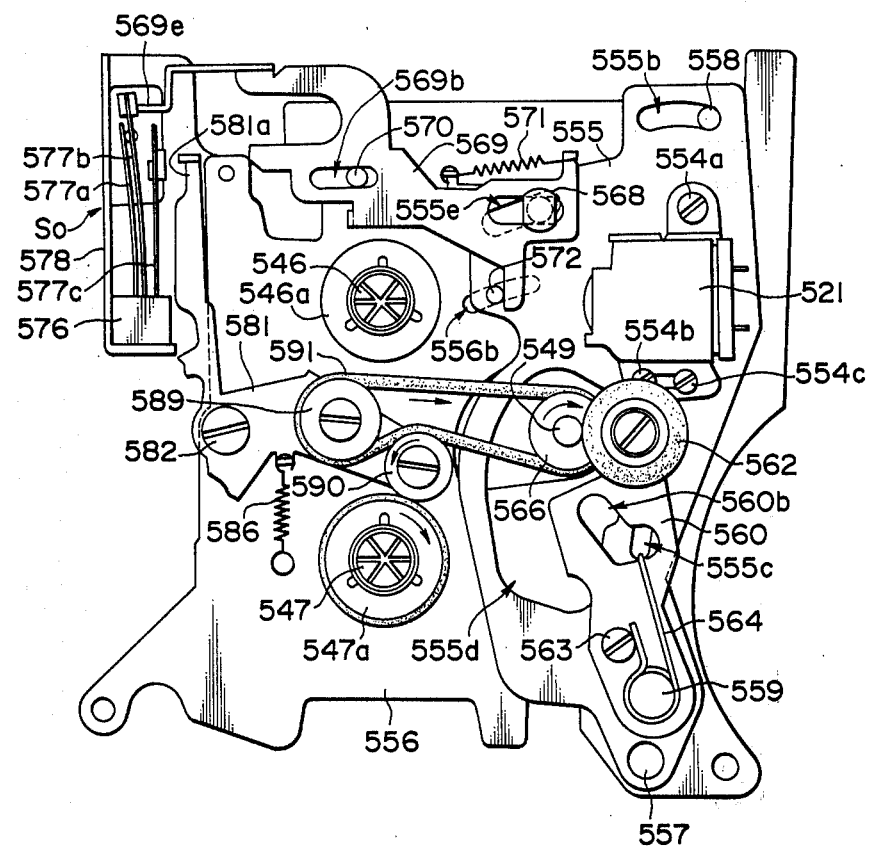

When the playback actuating member 573 moves to the position shown in FIG. 46, the pin 572 on the head support lever 555 is cammed by the right-hand, inclined edge of the slot 573a in the manner 573, sliding to the left within the slot 556b (see FIG. 43) against the resilience of the coiled spring 575, with consequence that the head support lever 555 rotates counter-clockwise about the stud 557, as shown in FIG. 47, bringing the head 521 into abutment against the magnetic tape 539 contained in and exposed through the tape access window in the tape cassette 538 and also bringing the pinch roller 562 into abutment against the capstan 549 with the tap 539 disposed therebetween. The displacement of the lever 555 causes the switch pressure plate 569 to be moved to the left, whereby its engaging portion 569e causes the movable blade 577b to be moved into contact with the stationary blade 577a of the main switch $S_0$ to close it, thus completing the electrical power circuit of the tape recorder 503. Thereupon, the capstan 549 is driven by a motor, not shown, to rotate in the direction indicated by an arrow, and cooperates with the pinch roller 562 to feed the tape 539 at a uniform rate. The rotation of the capstan 549 is transmitted to the tape take-up shaft 547 through the pulley 566, endless belt 591, pulley 590 and driven wheel 547a, whereby the tape hub 541 is driven by the shaft 547 to take up the tape 539 as it is fed by the cooperation of the capstan 549 and the pinch roller 562. During the running of the tape 539, the head 521 reads recorded information therefrom, and supplies it to the electrical circuit shown in FIG. 42 for processing and reproduction.

When the full length of the tape 539 has been fed in this manner, the tape hub 540 and the tape supply shaft 546 are pulled by the tension in the tape 539, causing the tape end detecting lever 611 (see FIG. 44) to rotate clockwise about the stud 613. In this manner, the shaft 546b is moved into abutment against the upper, right-hand edge of the opening 556c, as indicated by phantom line 546bA (FIG. 48). When the lever 611 assumes such position, the operating piece 612 which previously maintained the engaging portion 612b outside the path of rotation of the pin 620 on the flywheel 567 now functions to place it on this path of rotation of the pin 620. As a consequence, as the flywheel 567 rotates, the pin 620 thereon moves the engaging portion 612b of the operating piece 612 so as to rotate it clockwise about the stud 616. In this manner, the operating piece 612 is displaced to the position 612A shown in phantom lines in FIG. 48, moving the pin 608c on the detent lever 608 to rotate the latter clockwise about the pivot 609 and thus disengaging the detent portion 608b from the engaging portion 573f of the playback actuating member 573, as shown in FIG. 48. Thereupon, the playback actuating member 573 returns from the position shown in FIG. 46 to its original or inoperative position shown in FIG. 44 under the resilience of the coiled spring 602, and associated members including the head 521 are also returned to their original positions, terminating the entire operation of the tape recorder 503. The playback actuating member 573 can also be returned to its original position during the running of the tape 539 by the depression of the stop button 509c (see FIG. 46), which causes the stop actuating member 596 to be moved downward, whereby its abutment 596d bears against the engaging portion 608a of the detent lever 608 to cause it to rotate clockwise in the same manner as mentioned above.

When the playback actuating member 573 is returned to its original position, the switch $S_3$ is opened as shown in FIG. 44, so that not only the electrical circuit of the tape recorder 503 but also the electrical circuit of its cooperating radio set 501 is disconnected from the power source, thus completely interrupting the operation thereof. In the prior art practice, there has been no automatic stop mechanism which acts to disconnect the mating instrument from its associated power source. However, with the present invention, the automatic stop mechanism functions to disconnect their mating instrument from its power source, thus eliminating the generation of noises and the undesirable power dissipation.

Figure 49:
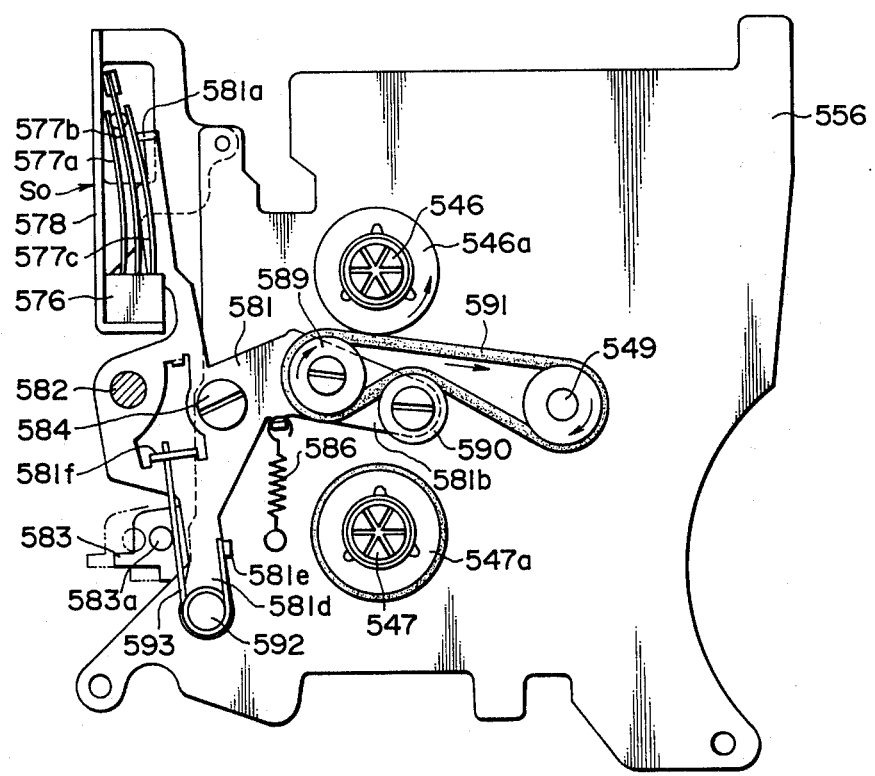

In the inoperative condition illustrated in FIG. 43, the tape running control lever 583 may be operated to move the pin 583a in the direction of the arrow a, whereby the rewind lever 581 rotates counter-clockwise about the stud 584 to move the pulley 590 away from the driven wheel 547a associated with the tape take-up shaft 547 and to bring it into engagement against the driven wheel 546a associated with the tape supply shaft 546, as illustrated in FIG. 49. Simultaneously, the engaging portion 581a of the lever 581 presses against the movable blade 57c of the main switch $S_0$ so as to bring all of the blades 577c, 577b, 577a into electrical contact with each other. This establishes a rotation of the motor at a higher rate, causing a rewind of the tape 539 onto the tape hub 540 at a higher rate. The tape running control lever 583 may be operated to move the pin 583a in the direction of the arrow b, whereby the rapid advance lever 580 rotates counter-clockwise about the stud 582 to achieve a full closure of the main switch $S_0$ with its portion 580a in the similar manner. Thereupon, the motor is rotated at a higher rate, causing the tape take-up shaft 547 to rotate at a higher rate to take up the tape 539 onto the tape hub 541 at a higher rate. In the present tape recorder 503, the switch $S_9$, which is interlocked with the playback button 509b, short-circuits the input terminal to the amplifier 522, so that unpleasant motor noises cannot be given off by the loudspeaker 524 of the tape recorder, thus enabling a quiet and smooth rapid advance and rewind operation.

What is claimed is:

1. A cassette tape recorder for use with a tape cassette internally housing a magnetic tape having its opposite ends secured to a pair of tape hubs which are rotatably dispoed within the cassette; the recorder comprising a tape end detecting lever having an arm on which a tape supply shaft is mounted for engagement with a tape supply hub, and pivotally mounted on a stationary base plate within the tape recorder for rocking motion under the tension in the tape when an end of the tape being fed is reached; an operation stop member pivotally mounted on another arm of the tape end detecting lever and having an abutment on its one end and a portion on its other end which unlocks a locking member for a playback actuating member; a pin fixedly mounted adjacent to the periphery of a flywheel which drives a capstan at uniform rate for cooperation with its associated pinch roller to feed the tape; and means for normally maintaining the tape end detecting lever at a given position in which the tape supply shaft is properly located relative to a tape take-up shaft, thereby maintaining the abutment of the operation stop member retracted from the path of rotation of the pin and maintaining said portion of the operation stop member away from the locking member, a rocking motion of the tape end detecting lever as the tape end is reached being effective to move the abutment of the operation stop member into the path of rotation of the pin, which thereupon bears against the abutment to rock the operation stop member so that said portion thereof unlocks the locking member to reset the playback actuating member.

2. A cassette tape recorder according to claim 1 in which the tape end detecting lever is disposed in overlapping relationship with the base plate in a manner such that the tape supply shaft mounted on one arm thereof extends through a slot formed in the base plate so as to extend in a direction parallel to the direction of rocking motion of the lever.

3. A cassette tape recording according to claim 1 in which the tape end detecting lever is urged by a spring in a direction opposite from the direction in which it rocks as the tape end is reached, the spring urging the lever into abutment against the edge of a slot formed in the base plate, thereby normally maintaining the tape supply shaft at a given position relative to the tape take-up shaft.

4. A cassette tape recorder according to claim 1 in which the abutment of the operation stop member comprises a folded piece extending toward the upper surface of the flywheel.

5. A cassette tape recording according to claim 1 in which the operation stop member is normally urged in a manner such that the abutment thereon rocks in a direction opposite from the direction of rotation of the flywheel, the resulting rocking motion of the operation stop member being normally prevented by abutment of the unlocking portion against a stop pin fixedly mounted on the base plate.

6. A cassette tape recorder for use with a tape cassette internally housing a magnetic tape having its opposite ends secured to a pair of tape hubs which are rotatably disposed within the cassette, the recorder comprising a playback actuating member and a record actuating member associated with a playback button and a record button, respectively, and adapted to be moved into respective operative positions as the associated button is depressed; a locking member for engaging and locking the playback actuating member in its operative position as the latter is moved into its operative position; a magnetic head support plate carrying a magnetic head and a pinch roller thereon and pivotally mounted for rocking motion to bring the heads and the pinch roller into respective operative positions as the playback actuating member is moved to its operative position; a detent post on the record actuating member; and a switch operating member extending in a direction perpendicular to the direction of movement of the record and playback actuating members and pivotally mounted for engagement with the detent post on the record actuating member which has moved to its operative position as the held support plate rocks for locking the record actuating member in its operative position.

7. A cassette tape recorder according to claim 6 in which the playback and record actuating members are disposed in overlapping relationship and slidably relative to the underside of a stationary base plate within the recorder; both of said members having an outer end which extends outwardly beyond the base plate and to which the externally exposed playback and record button are respectively secured.

8. A cassette tape recorder according to claim 6 in which the record actuating member places the tape recorder in a record mode as it is moved to its operative position by the depression of the record button, the record actuating member forming, together with a lug detecting member which includes a lug detecting portion and a blocking piece and which is pivotally mounted on a stationary base plate within the tape recorders so as to rock as the record actuating member is moved toward its operative position, a detection assembly which detects the presence or absence of a lug which is provided on the part of a tape cassette for preventing an inadvertent erasure of a recorded cassette tape, whereby a movement of the record actuating member to its operative position is permitted when the lug detecting member has detected the presence of the lug to interrupt its rocking motion at an intermediate position while a movement of the record actuating member to its operative position is prevented by a movement of the blocking piece into a path of movement of the record actuating member as a result of a further rocking motion of the lug detecting member when the lug is absent.

9. A cassette tape recorder according to claim 8 in which the lug detecting member comprises a three arm member having a first arm which controls a movement of an erase head to its operative position, a second arm which extends in the opposite direction from the first arm and having the lug detecting portion formed at its free end, and a third arm which extends substantially parallel to the direction of movement of the record actuating member and having a folded piece at its free end which forms the blocking piece.

10. A cassette tape recorder according to claim 9 in which the lug detecting member is urged to rock in a direction so that the third arm moves into the path of movement of the record actuating member, but is normally prevented from such rocking motion by abutment of the second arm against the detent post on the record actuating member, a rocking motion of the lug detecting member being permitted when the detent post moves as the second arm moves to follow a movement of the detent post.

11. A cassette tape recorder according to claim 6 in which the switch operating member moves to close a main switch in an electrical circuit of the tape recorder as the head support plate rocks to the operating position.

12. A cassette tape recorder according to claim 6 in which the locking member which locks the playback actuating member is its operative position is disengaged from the playback actuating member in response to a rocking motion of a stop actuating member which is moved to its operative position by the depression of a stop button.

13. A cassette tape recorder according to claim 12 in which the stop actuating member is mounted on a stationary base plate within the recorder so as to move in the same direction as the playback and record actuating members.

14. A cassette tape recorder according to claim 12 in which when the stop actuating member disengages the locking member from the playback actuating member, the playback actuating member is reset as are all of its associated members, thus interrupting the operation of the tape recorder.

15. A cassette tape recorder for use with a tape cassette internally housing a magnetic tape having its opposite ends secured to a pair of tape hubs which are rotatably disposed within the cassette, the recorder comprising an FF operating member having an operating button attached thereto so as to be capable of both a rocking motion and a sliding motion relative to a stationary base plate within the tape recorder; a switching lever mounted for rocking motion as the operating button is operated to rock the FF operating member for closing a switch which is adapted to energize a tape drive motor at an increased speed, thereby rotating the tape take-up shaft at an increased rate to provide a rapid tape advance; a switching member mounted for rocking motion as the operating button is operated to rock the FF operating member for closing the switch which is adapted to energize the tape drive motor at an increased speed and for transmitting the drive from the motor to a drive wheel associated with the tape supply shaft, thereby rotating the tape supply shaft in a tape rewind direction at an increased rate; means for moving a pinch roller away from its associated capstan in response to a sliding movement of the FF operating member initiated by an operation of the operating button during a playback mode of the tape recorder; and means for momentarily maintaining the FF operating member in a tape rewind position which is reached by an initial sliding movement thereof, followed by a rocking motion thereof when the tape remains at rest, whereby a rocking motion of the FF operating member establishes a rapid tape advance, a sliding movement of the FF operating member establishes a tape rewind, a rocking motion of the FF operating member during a playback mode establishes a queing operation and a sliding movement of the FF operating member during a playback mode establishes a review operation.

16. A cassette tape recorder according to claim 15 in which the FF operating member is disposed in overlapping relationship with the underside of a stationary base plate within the tape recorder so as to be capable of a sliding movement in a direction substantially perpendicular to the direction of movement of playback and record actuating members, the FF operating member extending outwardly beyond the base plate and having an outer end which is exposed externally of the tape recorder and to which the FF operating button is attached.

17. A cassette tape recorder according to claim 16 in which an inner end of the FF operating member which extends below the base plate has a pin fixedly mounted thereon which extends through an elongate guide slot formed in the latter, the FF operating member being formed with an inverted U-shaped slot having an elongate base which is engaged by a depending pin which is fixedly mounted on the base plate, whereby a rocking motion and a sliding motion of the FF operating member is permitted.

18. A cassette tape recorder according to claim 17 in which the pin fixedly mounted on the inner end of the FF operating member is located adjacent to a pinch roller support plate which is disposed on the base plate to rock the pinch roller support plate so that a pinch roller carried thereon may be moved away from a capstan in response to a sliding movement of the FF operating member during a playback mode.

19. A cassette tape recorder according to claim 17 in which the sliding movement of the FF operating member is limited by the engagement between the pin on its inner end and the slot of the inverted U-configuration, the rocking motion of the FF operating member taking place about the pin and being limited by the U-shaped slot.

20. A cassette tape recorder according to claim 17 in which the FF operating member is normally urged to move in a direction away from the base plate, by a coiled tension spring extending between the pin fixedly mounted on the base plate and extending through the inverted U-shaped slot and the FF operating member, such movement of the FF operating member being limited by the engagement between the pin and the inverted U-shaped slot.

21. A cassette tape recorder according to claim 17 in which the FF operating member includes an arm extending therefrom which is moved into a path of movement of the record actuating member when the FF operating member slides in a direction mearer the base plate, and also includes a step which is moved into a path of movement of the playback actuating member when the FF operating member slides in a direction nearer the base plate.

22. A cassette tape recorder according to claim 17 in which the FF operating member is momentarily maintained in a position which is reached by an initial sliding movement followed by a rocking motion thereof, by the engagement of an outer branch of the inverted U-shaped slot with the pin fixedly mounted on the base plate.

23. A cassette tape recorder according to claim 22 in which the FF operating member is unlocked from the position which is reached by an initial sliding movement followed by a rocking motion thereof, by the playback record actuating member which bears against the step formed in the FF operating member as such actuating member moves.

24. A cassette tape recorder according to claim 15 in which the switching member comprises a T-shaped three arm member which is pivotally mounted on a stationary base plate within the tape recorder, and includes a first arm which extends in a direction toward an intermediate position between the tape supply shaft and the tape take-up shaft and which rotatably carries a drive transmission pulley on its free end, a second arm having an actuating portion formed at its free end which actuates a switch for causing a tape drive motor to rotate at an increased speed, and a third arm which is formed with an engaging portion which is engaged and moved by a pin fixedly mounted on the FF operating member.

25. A cassette tape recorder according to claim 24 in which the switching member is normally urged to rotate in a direction such that the pulley on the first arm causes an endless belt disposed therearound into engagement with an idler gear for transmission of a drive to the tape take-up shaft, but in which when the engaging portion on the third arm is caused to rock about its pivot against the bias applied thereto by the FF operating member which slides, the pulley on the first arm causes the belt to be moved away from the idle gear and into engagement with a drive wheel associated with the tape supply shaft, thus causing the tape supply shaft to be rotated in the opposite direction.

26. A cassette tape recorder according to claim 15 in which the switching lever is disposed over the switching member and is pivotally mounted in concentric manner with the latter, and includes an arm which extends over the second arm of the switching member and having an actuating portion formed at its free end which actuates a switch for causing a tape drive motor to rotate at an increased speed, and another arm which extends in the opposite direction from the first mentioned arm and in a direction parallel to the third arm of the switching member, the free end of said another arm of the switching lever being formed with a beveled edge which is moved by a pin fixedly mounted on the FF operating member to rock the switching lever about the pivot as the FF operating member rocks.

27. A cassette tape recorder for use with a tape cassette internally housing a magnetic tape having its opposite ends secured to a pair of tape hubs which are rotatably disposed within the cassette, and including a capstan and a cooperating pinch roller to feed the tape, one end of the capstan being rotatably carried by a stationary bearing, and the capstan being integrally provided with a flywheel; characterized by the provision of at least one thrust bearing ball which bears against the surface of the flywheel which is removed from said one end of the capstan, and means for resiliently urging the thrust bearing ball against said surface of the flywheel.

28. A cassette tape recorder according to claim 27 in which at least one thrust bearing ball is located in substantial axial alignment with the point of engagement between the pinch roller and the capstan, thus preventing the capstan from being skewed by the pressure applied by the pinch roller.

29. A cassette tape recorder according to claim 27 in which said means for urging the thrust bearing ball comprises a hollow cylindrical body having its one end secured to a stationary base plate within the tape recorder and having its other end extending toward said surface of the flywheel, a member received within the cylindrical body for abutting against the ball, a spring for applying a pressure to the abutting member, and screw means threadably engaging said one end of the cylindrical body.

30. A cassette tape recorder according to claim 29 in which the screw means adjusts the pressure exerted by the thrust bearing ball against the flywheel.

31. A cassette tape recorder for use with a tape cassette internally housing a magnetic tape having its opposite ends secured to a pair of tape hubs which are rotatably disposed within the cassette, and including a capstan and a cooperating pinch roller to feed the tape, the capstan being integrally provided with a flywheel through which it is driven; characterized by the provision of an idler located intermediate the flywheel and an output wheel associated with a motor, the idler being connected with the output wheel through an endless belt, either the idler or the endless belt being brought into abutment against the flywheel to rotate the latter in a direction opposite from the direction of rotation of the output wheel.

32. A cassette tape recorder according to claim 31 in which both the idler and the output wheel are each formed with a V-groove in its periphery which is engaged the endless belt having a rhobic cross section.

33. A cassette tape recorder according to claim 31 in which the flywheel is formed with a V-groove in its periphery, which is engaged by the endless belt having a rhombic cross section and extending around the idler.

34. A cassette tape recorder for use with a tape cassette internally housing a magnetic tape having its opposite ends secured to a pair of tape hubs which are rotatably disposed within the cassette, and including a capstan for feeding the tape at uniform rate, the capstan being integrally provided with a flywheel through which it is driven; characterized by the provision of an idler disposed intermediate the flywheel and an output wheel associated with a motor for transmitting the drive from the motor to the flywheel, and an idler support plate rotatably carrying the idler and capable of a limited movement within an extent defined by the confines of the motor.

35. A cassette tape recorder to claim 34 in which the idler support plate is rockable within said extent and is urged in a direction to cause the idler into abutting engagement with both the flywheel and the output wheel associated with the motor.

36. A cassette tape recorder according to claim 34 in which the idler support plate is movable within said extent and is urged to cause the idler into abutting engagement with both the flywheel and the output wheel associated with the motor.

37. A cassette tape recorder according to claim 36 in which the idler support plate is urged by a coiled tension spring.

38. A cassette tape recorder according to claim 34 in which the idler has a supporting shaft which is supported by the idler support plate at its one end and supported by an idler adjusting plate at its other end, the idler adjusting plate being fixedly attached to the idler support plate, the orientation of the idler supporting shaft being adjusted by a fine displacement of the idler adjusting plate in a direction substantially parallel to the idler support plate.

39. A cassette tape recorder according to claim 38 in which the idler adjusting plate is formed with a position adjusting slot into which is fitted an eccentric shank of an adjusting pin which is rotatably fitted into the idler support plate, the shank bearing against the edge of the slot so as to cause a displacement of the idler adjusting plate.

40. A cassette tape recorder according to claim 34 in which the idler has a supporting shaft which is supported at its one end by an idler adjusting plate which is mounted on the idler support plate with resilient member interposed therebetween so that the resilient member may be expanded or compressed in a direction substantially perpendicular to the plane of the idler support plate to provide a fine tilting of the idler adjusting plate, thereby adjusting the orientation of the idler supporting shaft.

41. A cassette tape recorder according to claim 40 in which the resilient member comprises a rubber sleeve.

42. A miniature cassette tape recorder for use with a miniature tape cassette internally housing a magnetic tape having its opposite ends secured to a pair of tape hubs which are rotatably disposed within the cassette, and including a plurality of terminals for electrical connection with another electroacoustic instrument, and an automatic stop mechanism for automatically interrupting the operation of both the tape recorder and said another instrument when a tape end is reached, characterized by the provision of a switch which is operated as a record/playback button is operated, the switch being connected through the terminals so as to be connected as a power switch in the power supply circuit of said another electroacoustic instrument when the tape recorder is connected therewith.

43. A miniature cassette tape recorder according to claim 42 in which the record/playback button is reset to its initial position when the operation of the tape recorder is interrupted and when the automatic stop mechanism is actuated.

44. A miniature cassette tape recorder according to claim 42 in which the switch is opened when the record/playback button is reset to its initial position.

45. A miniature cassette tape recorder according to claim 42 in which the switch comprises a movable contact formed of an electrically conductive wire.

46. A cassette tape recorder for use with a tape cassette internally housing a magnetic tape having its opposite ends secured to a pair of tape hubs which are rotatably disposed within the cassette; the recorder comprising a drive pulley integral and concentric with a capstan, a freewheel rotatably mounted on a rewind lever which is rockably mounted on a stationary base plate within the tape recorder, an endless drive belt extending around the drive pulley and the freewheel, an idle pulley located intermediate the endless belt and a tape take-up shaft and rotatably mounted on the rewind lever, the idle pulley bearing against the endless belt so that the endless belt is operatively connected with a drive wheel on the tape take-up shaft during the running of the tape in a forward direction, and means for causing the endless belt to bear against a tape rewind shaft to directly drive it for rotation when the rewind lever is switched to a rewind mode.

* * * * *